United States Patent [19]
Dufton

[11] 3,749,844
[45] July 31, 1973

[54] STORED PROGRAM SMALL EXCHANGE WITH REGISTERS AND SENDERS

[75] Inventor: John Peter Dufton, Ontario, Canada
[73] Assignee: GTE Automatic Electric Laboratories Incorporated, Northlake, Ill.

[22] Filed: Oct. 27, 1971
[21] Appl. No.: 192,828

[52] U.S. Cl. ....... 179/18 ES, 179/18 EB, 179/18 FH
[51] Int. Cl. .............................................. H04q 3/54
[58] Field of Search .................... 179/18 EB, 18 ES, 179/18 FH

[56] References Cited
UNITED STATES PATENTS

| | | | |
|---|---|---|---|
| 3,385,931 | 5/1968 | Lucas et al. | 179/18 EB |
| 3,558,829 | 1/1971 | Aro et al. | 179/18 ES |

*Primary Examiner*—Thomas W. Brown
*Attorney*—K. Mullerheim et al. and Theodore C. Jay, Jr.

[57] ABSTRACT

The dialing registers and the senders each include control circuits for operating independently of the central processor for functions such as line supervision, receiving and storing a plurality of digits in the registers, and outpulsing a plurality of digits from the senders. There is a pool of dialing registers, a separate pool of senders, and in addition a separate pool of automatic number identifications (ANI) units; each of which has a plurality of stores which are treated as temporary memory with addresses which are a part of the same set of addresses used for accessing the main memory. Stored program control in the central processor is used to select an idle register, idle sender, and idle ANI unit for a call as required, to supply instructions to the selected units, to analyze dialed digits stored in the dialing register, path selection for connections to the dialing registers and the senders, and other functions. Upon initiation of a call, the calling line equipment number is placed in one of the stores of the selected dialing register, and if later analysis of the dialed digits in that register indicates an outgoing call with a sender required, an idle sender is selected, the calling line number is transferred thereto, and the identity of the sender is placed in the store of the dialing register. If automatic number identification is required an ANI unit is also selected and the identity of the sender placed in a store thereof. All transfer of information among the dialing registers, the senders and the ANI units is via a load bus and a store bus.

20 Claims, 25 Drawing Figures

INVENTOR
J. PETER DUFTON
BY Bernard E. Franz
ATTORNEY

PATENTED JUL 31 1973 3,749,844

SHEET 05 OF 24

ANI STORE #1

PATENTED JUL 31 1973 3,749,844

SHEET 14 OF 24

DIAL PULSE AND MULTIFREQ. SIGNAL CONTROL

MAIN PROGRAM BLOCK DIAGRAM

ANI CALL FOR SERVICE

STORED PROGRAM SMALL EXCHANGE WITH REGISTERS AND SENDERS

BACKGROUND OF THE INVENTION

1. Field of the Invention

This invention relates to apparatus for the control of registers and senders, and also automatic number identification units, in communication switching system with a stored program central processor.

2. Description of the Prior Art

Common control type automatic exchanges have many known arrangements for the registers and senders. Several of the possible arrangements for marker controlled exchanges are illustrated in U.S. Pat. No. 3,445,605. The simplest arrangement is to provide a plurality of combined register-sender units, each of which has complete independent control equipment for all of its required functions. In general cases however, where the number of calls utilizing the sender is limited relative to the entire number of calls handled, it is economically undesirable that all the registers employed be designed also to function as a sender. Therefore many common control switching systems provide a separate pool of senders. However in that case a connecting arrangement is required between the registers and senders, which is a complicating factor. It is possible to simplify the connecting arrangement by providing that the register and the sender transfer information via a common unit such as the marker, but this introduces disadvantages such as the difficulty of economically using the storage capacity of the units.

In the systems using stored program controlled central processors, the tendency has been to provide extremely simplified digit receivers and senders at the terminals of the switching network for connection to calling lines and outgoing trunks respectively, circuit to provide the state of the digit storage and control functions in the central processor and its memory. This approach requires a large electrically alterable temporary memory and a sophisticated high speed processor to enable it to provide all of the functions in real time as required. While such a processor and memory may be justified for a large exchange, it is economically unattractive for small exchanges.

Automatic number identification has been provided in the prior art by arrangements which include a number network and bus system connected for the sleeve conductors at the line terminals to detectors, as shown for example in the Bell System Technical Journal, Vol. 37, No. 5 (September 1958), pages 1295–1318. Other arrangements such as that shown in the combination of U.S. Pat. Nos. 3,284,574 and 3,301,963 provide a translator in which a portion of the digits of the dialed number are used as an address for identifying a word in the memory, with the contents of that word providing the equipment number which is supplied to the markers to establish a connection to the called line; and for ANI the translator is used in reverse to make an associative search, scanning to find the word containing the equipment number of the calling line, and using the address of that word to identify the directory number.

SUMMARY OF THE INVENTION

An object of this invention is to provide an efficient and economical arrangement of registers and senders and the control thereof for a small stored program exchange. Another object is to provide for automatic number identification incorporated in the same efficient and economical arrangement.

According to one feature of the invention, the dialing registers, the senders, and the automatic number identification units are provided as separate equipments in separate pools, with each of these equipments having its own storage apparatus organized as stores with individual addresses, the equipments are interconnected only via common data bus connections to all of these stores and to the central processor, a register and a sender are associated for a call by placing an address identity of one in a store of the other, and data is transferred from the dialing register to the associated sender by addressing a store of the register to read the data into the central processing unit, and then addressing the sender to write the data into the store of the sender.

According to another feature of the invention, the calling line equipment number is placed into a store of the selected dialing register, dialed digits are received and stored in the dialing register independently of the central processing unit, the dialing register calls for the service of the central processing unit which analyzes the dialed digits, and if a sender is required selects an idle one, takes the calling line equipment number identity from the store of the dialing register and places it into a store of the sender, and places an address identity of the sender into a store of the dialing register, and digit loading means controlled by the central processing unit takes dialed digits from a store of the dialing register and places them into a store of the associated sender.

Further according to the invention, if an automatic number identification unit is required for a call an idle one is selected, and an identity of the associated sender is placed into a store of the selected ANI unit, the ANI unit obtains the service of the central processing unit to determine the calling line directory number, and when the sender requires the calling line number for outpulsing it obtains the service of the central processing unit to transfer the calling number digits.

An advantage of the arrangement of the registers and senders, as well as an ANI units, is that it provides efficient use of the stores for the various digits and the identification for associating these equipments together.

Other objects and features of the invention will be apparent from the following detailed description.

CROSS-REFERENCE TO RELATED APPLICATIONS

This invention is related to Small Exchange Stored Program Switching System by R. W. Duthie and R. M. Thomas disclosed in U.S. Pat. No. 3,487,173 issued Dec. 30, 1969. The memory arrangement of the system, and particularly the storage readout circuits SR for reading from temporary memory stores is disclosed in the U.S. Pat. No. 3,587,070 issued June 22, 1971 to R. M. Thomas for a Memory Arrangement Having Both Magnetic-Core and Switching-Device Storage with a Common Address Register hereinafter referred to as the Memory Arrangement patent. A U.S. patent application Ser. No. 51,256 filed June 30, 1970, now U.S. Pat. No. 3,618,015 issued Nove. 2, 1971 by H. P. Homonick for Apparatus for Discriminating Between Errors and Faults, hereinafter referred to as the Fault Buffer application, discloses circuit details of some of the logic circuits shown herein by functional block diagrams. The switching network is disclosed in U.S. patent application Ser. No. 54,138 filed July 18, 1970, now U.S. Pat. No. 3,624,305 issued Nov. 30, 1971 by G. Verbaas for a Communication Switching Network Hold and Extra Control Conductor Usage, hereinafter referred to as the Switching Network application. Some of the apparatus disclosed herein is covered by the following U.S. patent applications: Ser. No. 102,414 filed Dec. 19, 1970 by J.P. Dufton and B.G. Hallman for Computer having Associative Search Apparatus; Ser. No. 102,462 filed Dec. 29, 1970 by J.P. Dufton and J.H. Foster for Shift Apparatus for Small Computers; Ser. No. 102,413 filed Dec. 29, 1970 by R. M. Thomas and B. G. Hallman for Indirect Addressing Apparatus for Small Computer; Ser. No. 122,492 filed Mar. 9, 1971, now U.S. Pat. No. 3,678,197 issed July 18, 1972 by R. B. Panter et al. for Dial Pulse Incoming Trunk and Register Arrangement; and Ser. No. 142,649 filed May 12, 1971 now U.S. Pat. No. 3,703,708 issued Nov. 21, 1972 by J.H. Foster for a Memory Arrangement in a Central Processor.

DETAILED DESCRIPTION

Figure 1:
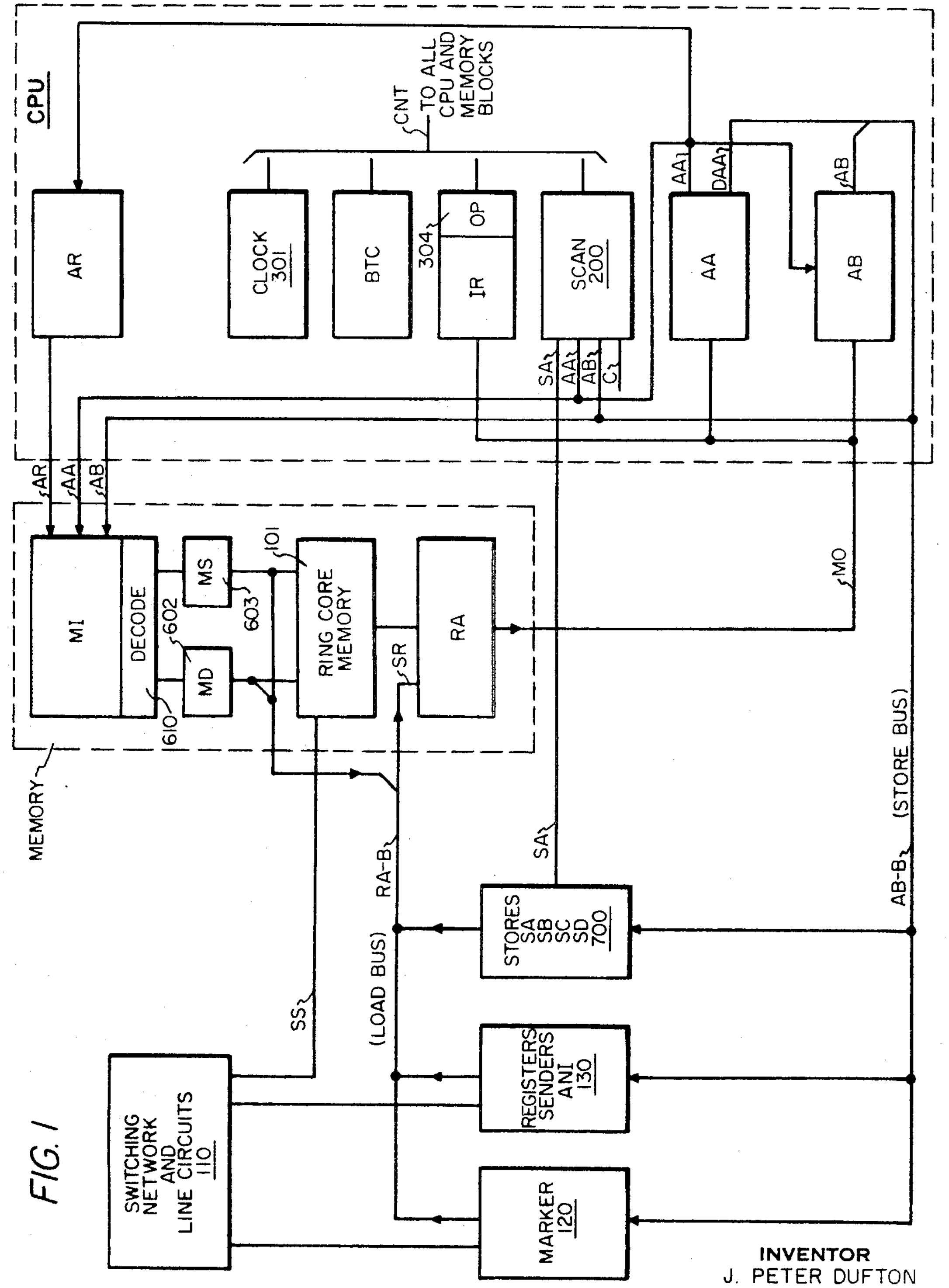
FIG. 1 is a block diagram of a telephone switching system, showing particularly the central processing unit, the memory, and subsystems which include temporary memory registers.

As shown in the block diagram of FIG. 1, the data processing system includes a memory and a central processing unit CPU. The central processing unit includes a clock 301 for supplying the basic timing signals, a bit time counter BTC which supplies the signals for the operation cycle for each instruction, an instruction register IR with an operation code (OP) decoder 304 which supplies the operation code for controlling the logic circuits, accumulator registers AA and AB, an address register AR and a SCAN unit 200.

The memory subsystem comprises basically a ring-core memory 101, with a memory input register MI having decoding circuits 610 for supplying input signals to memory drivers 602 and memory switches 603, and output read amplifiers RA. Storage registers (SA, SB, SC and SD) 700 may be considered to be part of the central processing unit, and are connected to the memory drivers and memory switches, and to read amplifiers to form a portion of the temporary memory for the system.

The data processing system forms part of a telephone switching system to control a switching network and line circuits 110. A marker 120 contains register forming part of the temporary memory of the system, and has circuits for controlling the switching network 110. The system also includes registers, senders and ANI (Automatic Number Identification) units 130 which also include registers forming part of the temporary memory, and have connections to the switching network 110.

Figure 6:
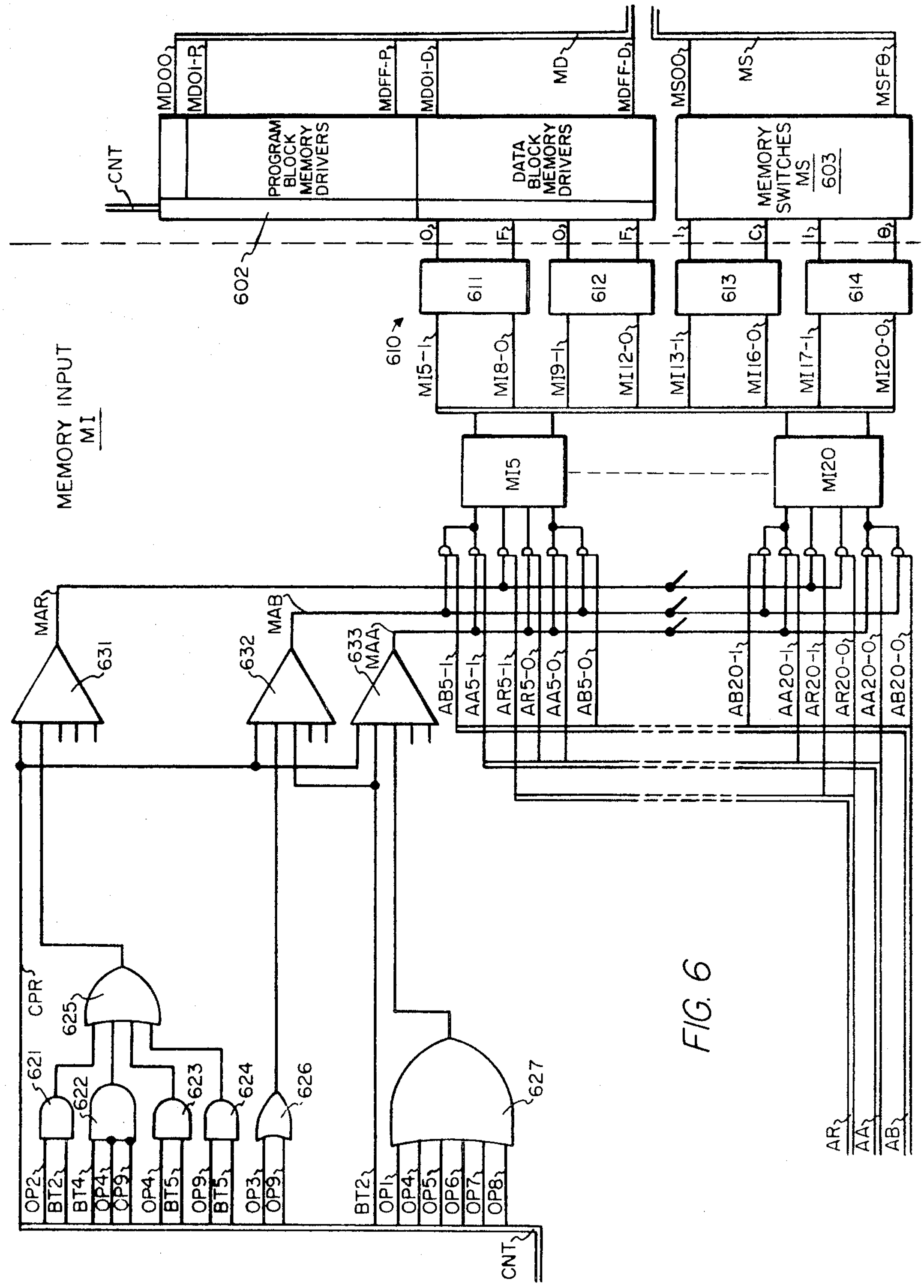
Figure 7:
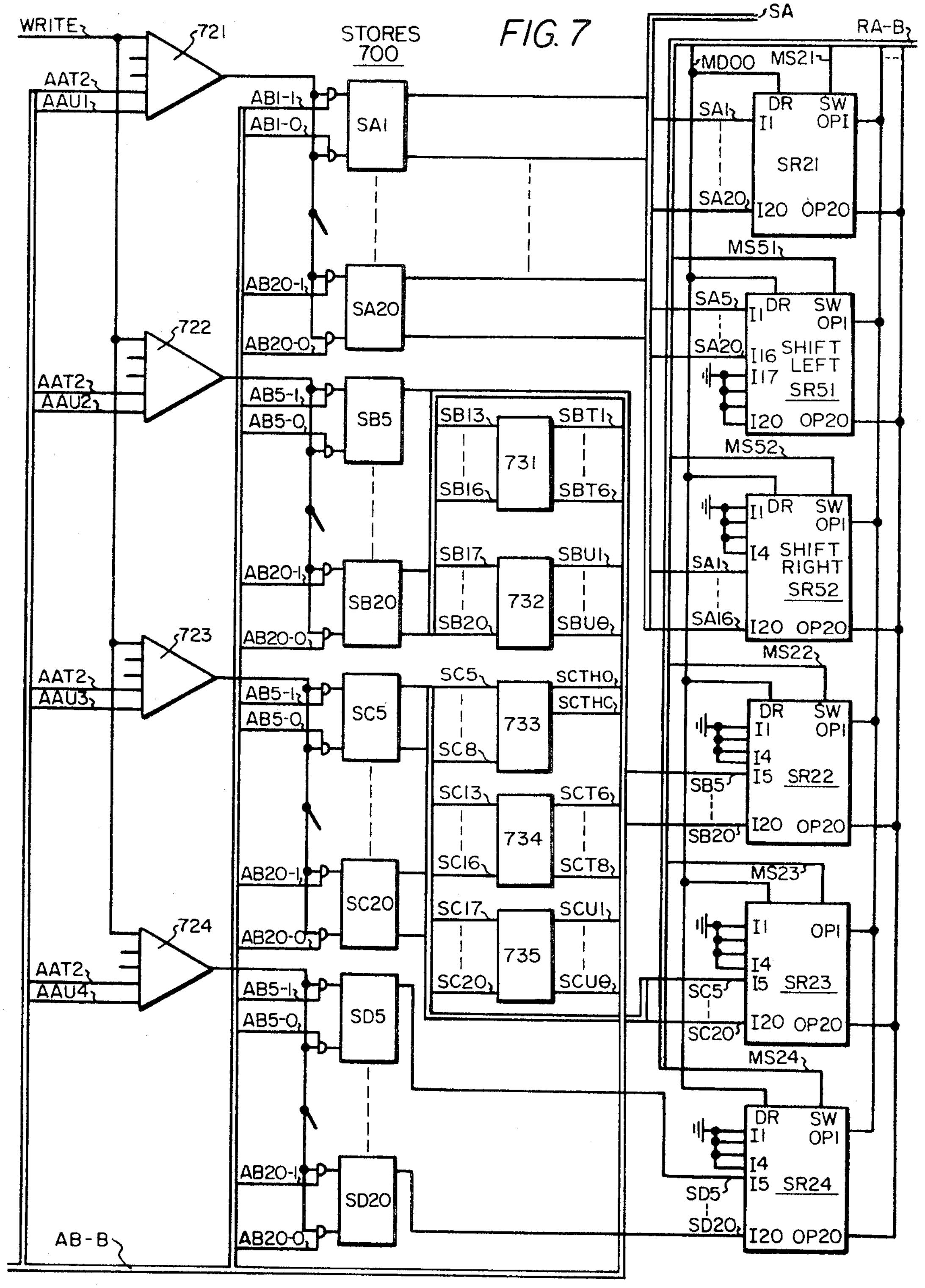

The arrangement shown in FIG. 1 represents a modification of the Small Exchange Stored Program Switching System disclosed in said Duthie et al. patent. In that patent the central processing unit is shown in FIGS. 6 and 7. The clock 301, bit time counter BTC and instruction register 303 with decoder 304 shown herein correspond to the clock 601, bit time counter 602, instruction register flip-flops IR1-4 and OP code decoder 605 shown in the patent. The address register AR corresponds to the current address counter comprising flip-flops CAC5-20 in the patent. The accumulator AA herein replaces the memory output register flip-flops MOR1-20 and the address portion IR5-20 of the instruction register of the patent. The accumulator AB herein corresponds generally to the accumulator flip-flops ACC1-20 and associated arithmetic circuits in FIG. 7 of the patent. The memory input register MI and decoding circuits 610 correspond generally to the circuits shown in FIG. 2 of the patent. The modifications of the memory output circuits as used in the system of FIG. 1 herein are disclosed in detail in the said memory arrangement patent application by Thomas. There are detailed modifications of all of the circuits of FIG. 1 with respect to those disclosed in the Duthie et al. patent.

The basic logic circuits used herein are generally the same as those disclosed in the Duthie et al patent. The logic levels are a negative 8 volts for "1," and ground potential for "0." An open circuit is also used for the logic level "1," the output of a logic module generally being from the unbiased collector electrode of a transistor which is in the cutoff condition for the "1" state, and the negative biasing potential being supplied at the inputs of the succeeding logic modules. The clock pulses as now used in the system comprise trains of negative pulses, which are a train of pulses on the lead CPM (FIG. 3) of 3 microseconds duration recurring every 10 microseconds and a train of pulses on lead CPR of 0.7 microseconds, with the leading edge of the CPR pulses occurring in coincidence with the trailing edges of the CPM pulses. The actual logic circuits as used in the system are principally NOR gates, but are disclosed herein as AND and OR gates to improve the clarity. As stated at column 5 of the Duthie et al. patent, some of the building block circuits are disclosed in U.S. Pat. No. 3,173,994, FIG. 21. The symbols for the AND and OR gates as used herein have been changed to conform to current practice. Referring for example to FIG. 4, block 413 represents an AND gate and block 415 represents an OR gate, with a circle at an input or output as shown for example at gate 414 representing an inversion or inhibit function. The gated pulse amplifier circuits such as 411 are generally similar to circuit 201 shown in FIG. 5 of the Duthie et al. patent, except for the number of DC control inputs.

four-bit binary coded digit are as explained in column 7 of the Duthie et al patent are 0 for the null value 0000, followed by the values 1–9, then *θ* for the value 1010 followed by the values B-F in which the bits have the weight 8-4-2-1. The symbol *θ* is used to correspond to the 0 of telephone directory numbers because it is usually transmitted as 10 pulses in dialing. Thus each digit position of a directory number may have any one of the 10 values **1-*θ*, and for a block of a thousand numbers they may have the value X111-X*θθθ*. Thus if a block of 1,000 numbers is being scanned the last number would have the value X*θθθ*. The operation of the counting circuits is such that the last three digits for the next count would have the value *θ*B1**; so that this constant indicates that all thousand numbers have been scanned and the counter has advanced to the next step.

An option is provided in the comparison circuits to connect the output of the comparator module 221 via a strap 250 to a ground terminal, which has the effect of eliminating the corresponding digit from the comparison so that only the last two digits are compared and the constant becomes equal to XXXB1, which permits one hundred numbers to be scanned at a time.

The J inputs of both sets of comparator circuits 211–214 and 221–223 are connected via the output of an inverter 210 from the conductor OP9 from the instruction register decoder. The outputs from the two NOR gates 215 and 225 are connected to respective inputs of an OR gate 230, the output of which is connected to a conductor EOP9. Thus when the signal OP9 is "1"; and when the contents of accumulator AB has its last three digits (or two digits if the wired option is used) are equal to the constant the signals on leads COP9 and EOP9 both become "1"; and when the contents of accumulator AA compare to the contents of the store register SA the output of NOR gate 215 is "1" which causes the signal on lead EOP9 to also be "1."

In an alternative embodiment not shown the inputs for the constant at the comparator modules 221–223 may be connected to the outputs of another temporary memory register, so that any desired constant may be stored therein under programmed control for use in making the comparison.

Figure 3:
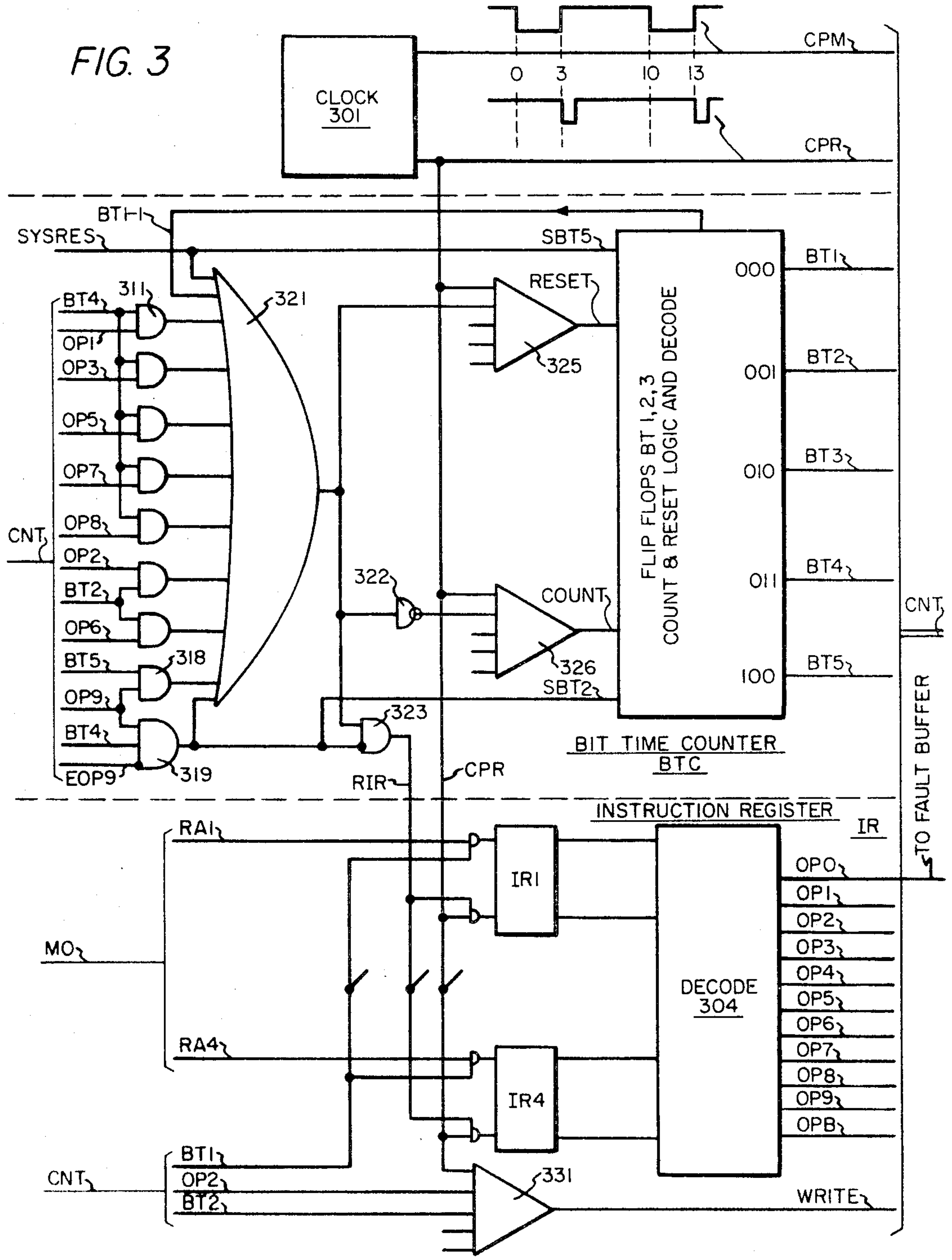
FIGS. 3–7 are functional block diagrams of the registers and logic circuits of other portions of the central processing unit, of the memory, and of general storage registers.
Figure 4:
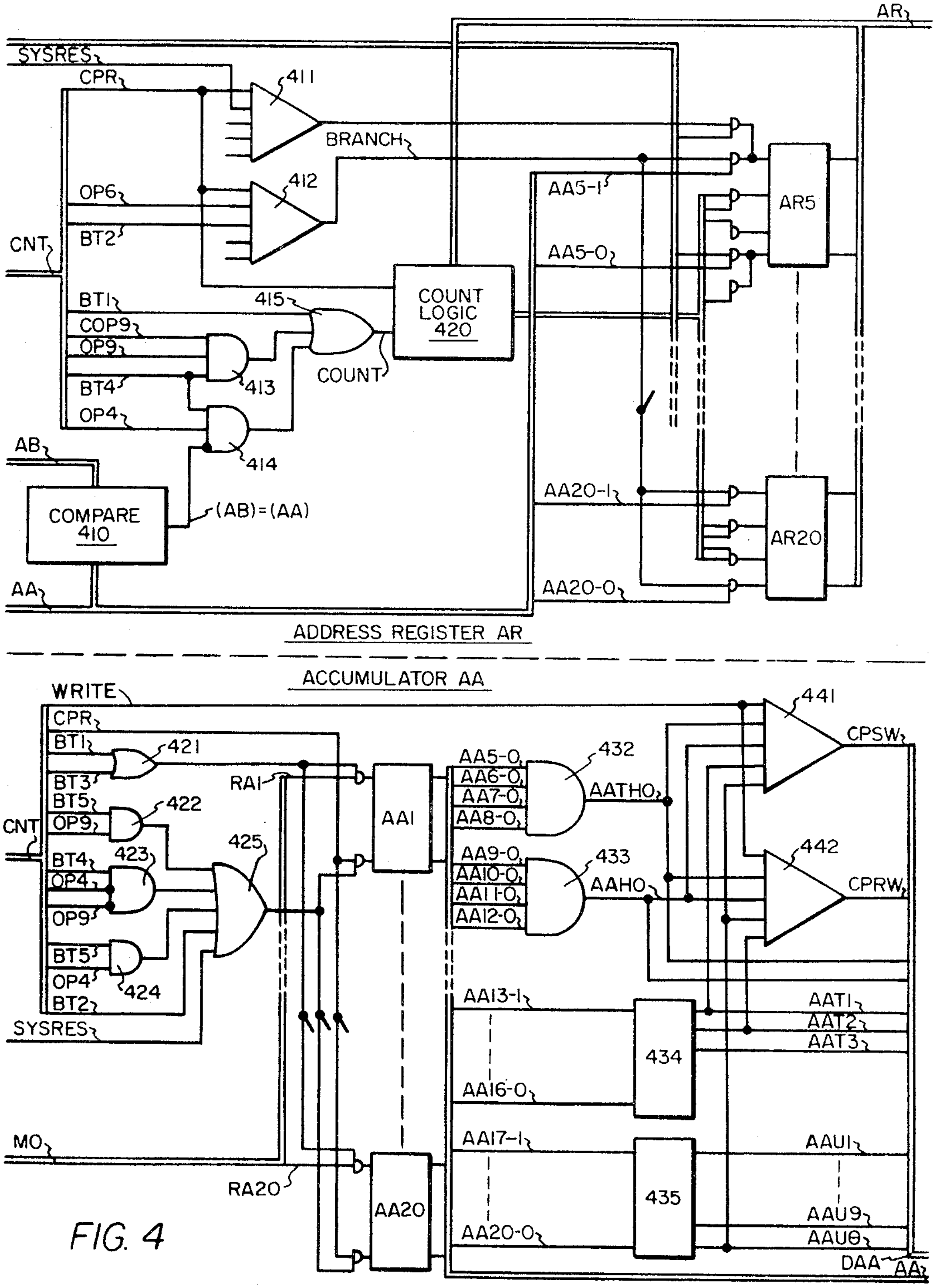

In FIG. 3 the clock is shown as block 301 which supplies the recurring pulse trains as indicated by the graphs on lead CPM and CPR. The pulses on lead CPM are used principally to enable the memory driver circuits, and the pulses on lead CPR are used as AC inputs to the gated pulse amplifiers and the coincidence gates of the flip-flops to control the timing of the change of state.

The bit timer counter BTC counts from one to five. Every operation (OP) code begins with bit time BT1 and the counter advances by one on every CPR clock pulse. However some operations can be conducted in fewer bit times than others. The counter comprises three flip-flops BT1, BT2, and BT3, which along with the counting and reset logic and decoding circuits is represented by block 310. The states of the flip-flops for each output state are shown along the right side of this block, the state 000 being decoded as output BT1, etc. up to the state 100 being decoded as output BT5. The counter advances by one or resets on each pulse from lead CPR as controlled by the gated pulse amplifiers 325 and 326. Normally the output of OR gate 321 is at the level "0" so that the gated pulse amplifier 325 is inhibited and gated pulse amplifier 326 is enabled via inverter 322, so that the counter advances on each occurrence of a pulse on lead CPR. Reset is controlled by gates 311–319 connected to the inputs of OR gate 321. State BT4 causes resetting for codes OP1, OP3, OP5, OP7 and OP8; state BT2 causes resetting for codes OP2 and OP6, and for code OP9 the resetting may occur either with state BT4 or BT5. Also any time the flip-flop BT1 is in the set state, which will only occur for state BT5, the signal on lead BT1-1 will cause reset. The system reset signal on lead SYSRES also enables the reset and via the signal on lead SBT5 is conjunction with the signal on lead RESET forces the counter to state BT5. A signal on lead SBT2 in conjunction with the signal on lead RESET will force the counter to state BT2.

Code OP9 is the only operation code which will cause the bit time counter to reset to a state other than BT1. If comparison is not found, that is the contents of accumulator register AA are not the same as the contents of the storage register SA, and the address in the accumulator AB is not equal to the constant, then the signal on lead EOP9 is at "0"; so that during the state BT4 gate 319 has at its output the signal condition "1." This causes the signals on leads SBT2 and RESET to be "1" so that the counter is set to state BT2. When either comparison indicates equality, then the signal on lead EOP9 is at signal level "1" so that gate 319 is inhibited and the counter advances to state BT5. Then on the next clock pulse the output from gate 318 will produce the reset condition to change the state to BT1. Thus it may be seen that when the central processor is in the state with code OP9, which is the SCAN mode, the bit time counter recycles skipping state BT1 and goes directly from state BT4 to BT2. Since state BT1 is the state for reading instructions from the memory, no instruction is read and the processor remains in the same state OP9.

The instruction register IR comprises four flip-flops IR1-4. This register receives information in parallel from the memory output read amplifiers via leads RA1-4 during interval BT1, the signal on lead BT1 supplying the DC input to the set coincidence gates, and the signals on leads RA1-4 supplying the AC inputs to load the flip-flops. The information stored in these flip-flops is the operation (OP) code, which is decoded by the logic 304. The output on lead OPO is an invalid code which indicates that an instruction was not read, probably due to an open diode or other fault in the memory; so this output is used by the fault buffer. The outputs OP1-OP9 correspond to the operation code previously described. Since the digit comprises four bits the output could be expanded to a maximum of 15 outputs other than the zero output. One such additional output OPB is shown.

A reset control from gate 323 associated with the bit time counter BTC provides a means of setting the instruction register back to zero after the execution of each instruction by supplying a DC input to the reset coincidence gates, with the lead CPR connected to the AC inputs to clock the reset. Note that the reset command is supplied whenever a signal is received from the OR gate 321 for resetting the bit time counter flip-flops; except that its is inhibited by the output of gate 319 during the SCAN operation for code OP9. This permits the instruction register to remain set at the The upper input of the circuit is an AC clock pulse input and the lower four inputs are DC control inputs connected as an AND function. Therefore when all four of the inputs are at the logic level "1" or open circuited a clock pulse at the upper input is gated and amplified to the output. The various decoding circuits generally comprise AND gates such as that shown in block 511 of the Duthie et al. patent. The flip-flops such as AR5 have a number of set inputs shown on the left side on the upper half and a number of reset inputs shown on the left side on the lower half. Each input is from a coincidence gate represented by a small semi-circle on which the input at the center left is an AC clock input and the input from the top or bottom of the left side is a DC control input, with the DC input required to be present for a certain time before the occurrence of the clock pulse input to be effective to change the state of the flip-flop.

There are several gates and gated pulse amplifiers actually used in the system, not shown herein, which are used for amplification and distribution of the signals. For example the busses include several such gating circuits to different groups of units, and also separately to odd and even numbered units for reliability. Thus connections disclosed and claimed herein, while shown as simple conductors, may in actual practice include circuits which repeat the signals.

A memory word comprises 20 bits organized as five digits of four bits each. For instruction words, the first digit is the operation code and the other four digits are an operand address.

The operation codes (OP codes) with their assembler mnemonics are as follows:

LOAD (OP 1) - read the conents of the operand memory address location and place the result in the accumulator AB.

STORE (OP 2) - write the contents of the accumulator AB into the operand memory address location.

TRANS (OP 3) - transfer the contents of the address location stored in the accumulator AB into the accumulator AB. (The operand part of the instruction is blank).

COMP (OP 4) - compare the contents of the accumulator AB with the contents of the operand address location as read into accumulator AA. If equal, proceed to the next instruction in sequence by incrementing the address register by 1 as normal. If unequal, skip one address in the program.

ADD (OP 5) - add 1, 10 or 100 (literals stored at operand address location) to the contents of the accumulator AB.

BR (OP 6) - branch to the instruction at the operand address location.

MASK (OP 7) - mask the conents of the accumulator AB with the contents from the operand address location as read into accumulator AA. Keep the digit where one's are present and set to zero where zero's are present (logical AND).

SUPER (OP 8) - superimpose on the accumulator AB the contents of the operand memory address as read into accumulator AA (logical OR).

SCAN (OP 9) - make an associative search beginning with the address in the accumulator AB. (The operand part of the instruction is blank). When the conents of the accumulator AA compare with the contents of the storage register SA, the search is completed and the next address is used. When the contents of accumulator AB and a wired constant C compare, skip one address in the program. Note that the necessary data must be placed in the register SA and the accumulator AB before this OP code is called upon.

Figure 2:
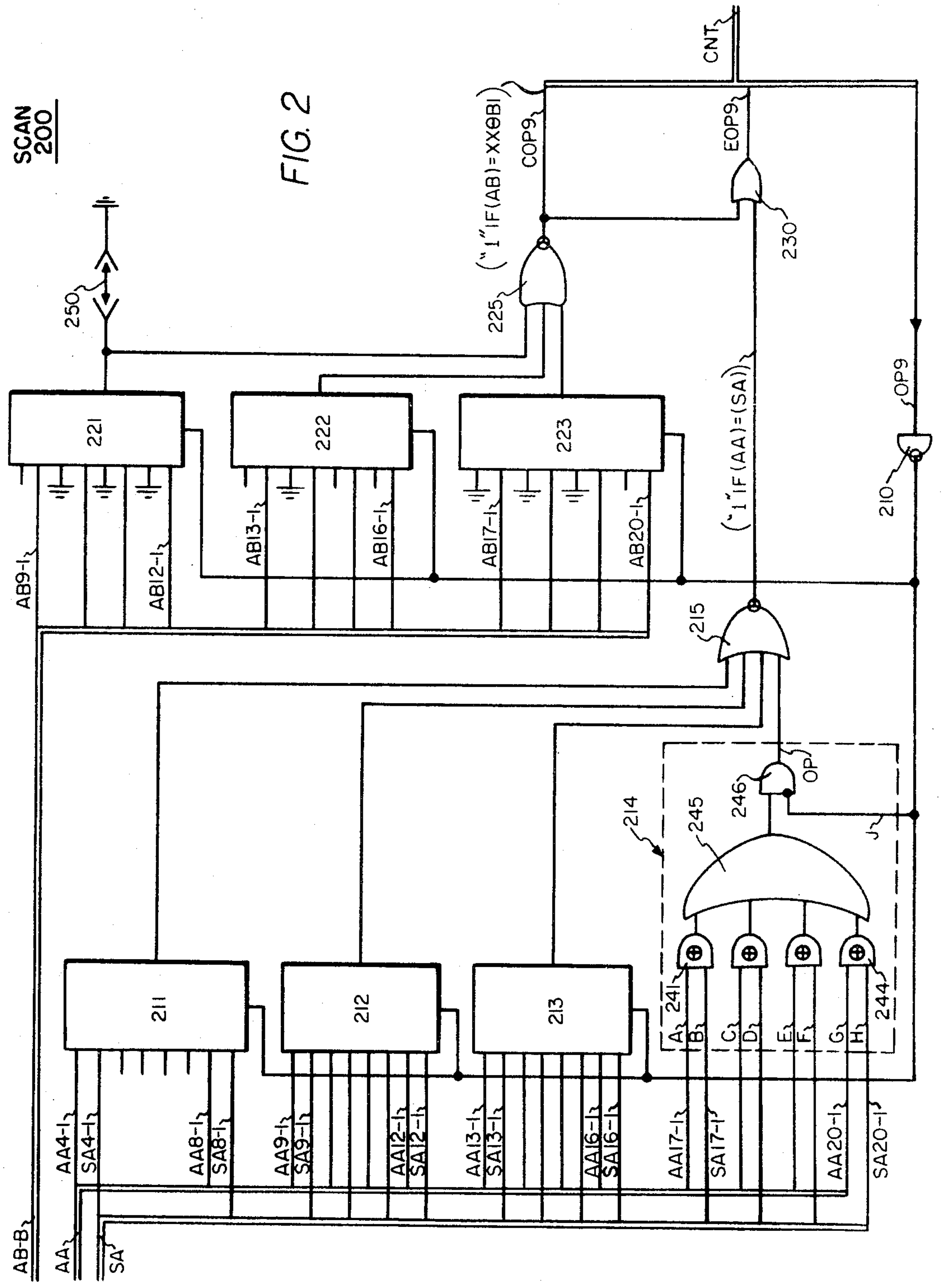
FIG. 2 is a functional block diagram of the comparators used for the operation code SCAN.

The comparison circuits for the SCAN operation are shown in FIG. 2. The basic comparison modules 211–214 and 221–223 each provide for comparing one set of four inputs to a corresponding set of four inputs. These modules may be of the type disclosed in U.S. Pat. No. 3,478,314 by W. R. Wedmore for a Transistorized Exclusive-OR Comparator. Block 214 is a symbolic functional equivalent of the module. It includes four exclusive OR gates 241–244, followed by an OR gate 245 and an output inhibit AND gate 246 to the output conductor OP. Each of the exclusive OR gates comprises a transistor with the two inputs connected via resistance and diode bias circuits to the base and emitter electrodes, the collector electrodes of the four transistors are connected together at a common point, and thence through a resistance-capacitance network to the base electrode of an output transistor, and the collector electrode of this last transistor is connected to the output lead OP. Another input from a terminal J is connected through a resistance network to the base electrode of the output transistor to act as an inhibit input. The Boolean equation for the Wedmore circuit or for the generally equivalent logic of block 214 is:

$$OP = \overline{J}(A\overline{B} + \overline{A}B + C\overline{D} + \overline{C}D + E\overline{F} + \overline{E}F + G\overline{H} + \overline{G}H)$$

The outputs of the four comparator modules 211–214 are connected to respective inputs of a NOR gate 215. The J inputs of the four modules are connected in common to the same source. The result is that if the logic level at input J is "0" and the signals on two sets of inputs compare so that each signal in one set is equal to its respective signal in the other set then the output of the NOR gate 215 is a "1." The specific inputs in this case are the set of conductors AA (from accumulator AA) and the set of conductors SA (from the store register SA). For the particular system requirements the first comparator module 211 has its upper pair of inputs connected to the leads from the fourth bit position of each of the conductor sets AA and SA and its lower pair of inputs to the eighth bit positions; while the inputs for the other three comparator modules run from the ninth bit position of each set at the upper inputs of module 212 to the leads from the twentieth bit position of each set at the lower inputs of module 214; corresponding to the last three digit positions of the data stored in the accumulator AA and the storage register SA.

The three comparator modules 221–223 along with NOR gate 225 are used in a similar manner to compare the contents of the last three digit positions of the accumulator AB with a wired constant. The specific constant shown has the value *θ*B1 corresponding to the binary number 1010 1011 0001, with the 1's and )'s provided by open circuit and ground potentials respectively. Thus if a five digit number is stored in the accumulator AB, the first two digits may be any value as far as operation of comparator is concerned which may be indicated ay an X; so that the output of NOR gate 225 has the value of "1" if the contents of the accumulator AB has the value **XX*θ*B1. This signal appears on the lead COP9 in FIG. 2**.

To appreciate the significance of the particular constant, please note that the 16 possible values for the state OP9 while the bit time counter cycles skipping the interval BT1.

A gated pulse amplifier 331 enabled by DC signals on leads OP2 and BT2 gates a clock pulse from lead CPR to generate a signal on lead WRITE, which is used to write the information into the temporary memory flip-flops during the STORE operation.

The outputs of the clock 310, the bit frame time counter BTC and the instruction register IR are shown combined as a set of conductors CNT, at least some of these signals being used by most of the other blocks of a central processing unit and also the memory input register.

The address register AR in FIG. 4 stores the address to be executed next. It comprises flip-flops AR5-20 and associated logic circuits. The count logic circuits 420 cause the address to be incremented by one during the occurrence of a pulse on lead CPR when the signal on lead COUNT is "1," which occurs via OR gate 415 every cycle during the first bit time interval by the signal on lead BT1, and also conditionally during interval BT4 for the execution of codes OP4 and OP9.

The compare logic for code OP4 shown as block 410 (which is not part of the address register but is shown here for convenience) compares the contents of the accumulator registers AA and AB, and supplies an output signal which inhibits gate 414 when the comparison indicates that the contents are equal. Thus if a comparison is true the register advances only once during the cycle on the occurrence of a signal on lead BT4 as normal and the next instruction in sequence is executed next; while if the comparison indicates an inequality of the two sets of data, gate 414 is not inhibited so that during the occurrence of signal on lead BT4 the register is advanced an additional step causing one instruction to be skipped.

During the SCAN operation (OP9) the address register is incremented once during the first cycle when the instruction is read during the interval BT1 as normal, and during subsequent cycles the interval BT1 is skipped by the bit time counter so that the address register does not advance further. The end of the operation occurs when a comparison is found in FIG. 2 either via gate 215 or 225, which can never occur at the same time. A "1" output from gate 215 indicates that the associative search has been completed by finding the word having the data corresponding to that in the register SA; in which case no further signal is supplied to the address register and the instruction already there is used next. However, if the address stored in accumulator AB which corresponds to the wired constant is reached, then the signal on lead COP9 at gate 413 during the occurrence of interval BT4 causes the address register to be incremented one additional step, so that an instruction is skipped. This causes entering a segment of a program to store data indicating that the search should be continued at a later time in the program, or that the search is to be terminated upon not finding a matching condition.

The branch instruction command OP6 along with the signal on lead BT2 is used to enable gated pulse amplifier 412 to pass a pulse from lead CPR to supply AC signals to set and reset inputs of the flip-flops to load data from the accumulator AA.

In addition the reset signal on lead SYSRES enables gated pulse amplifier 411 to supply reset signals to set the register to designated start addresses for the main or standby programs.

The accumulator AA comprises 20 flip-flops AA1-20. This register receives the information in parallel from the memory output read amplifiers via the twenty leads RA1-20 to the AC set inputs; the DC inputs being enabled during bit time intervals BT1 and BT3 via OR gate 421. The register is reset by a pulse on lead CPR when the reset DC inputs are enabled by a signal from OR gate 425; which occurs during interval BT2 of every cycle, during interval BT5 for the codes OP9 and OP4 via gates 422 and 424 respectively, during interval BT4 for all other operation codes via gate 423, and also when the system reset signal is present on lead SYSRES.

The output of accumulator register AA is also used for the STORE operation code OP2 during the interval BT2 as the operand address indicating into which register the information from accumulator AB is to be written. The output for the digit AA5–8 is decoded by gate 432 as the thousands digit on lead AATHO, and for the digit AA9–12 by gate 433 as the hundreds digit on lead AAHO, since these two digits for the temporary addresses are always 00. The digit AA13–16 is decoded by logic 434 to provide the tens digits AAT1, AAT2, or AAT3; and the digit AA17–20 is decoded by logic 435 to provide a units digit signal on one of the leads AAU1-AAU*0*.

Figure 5:
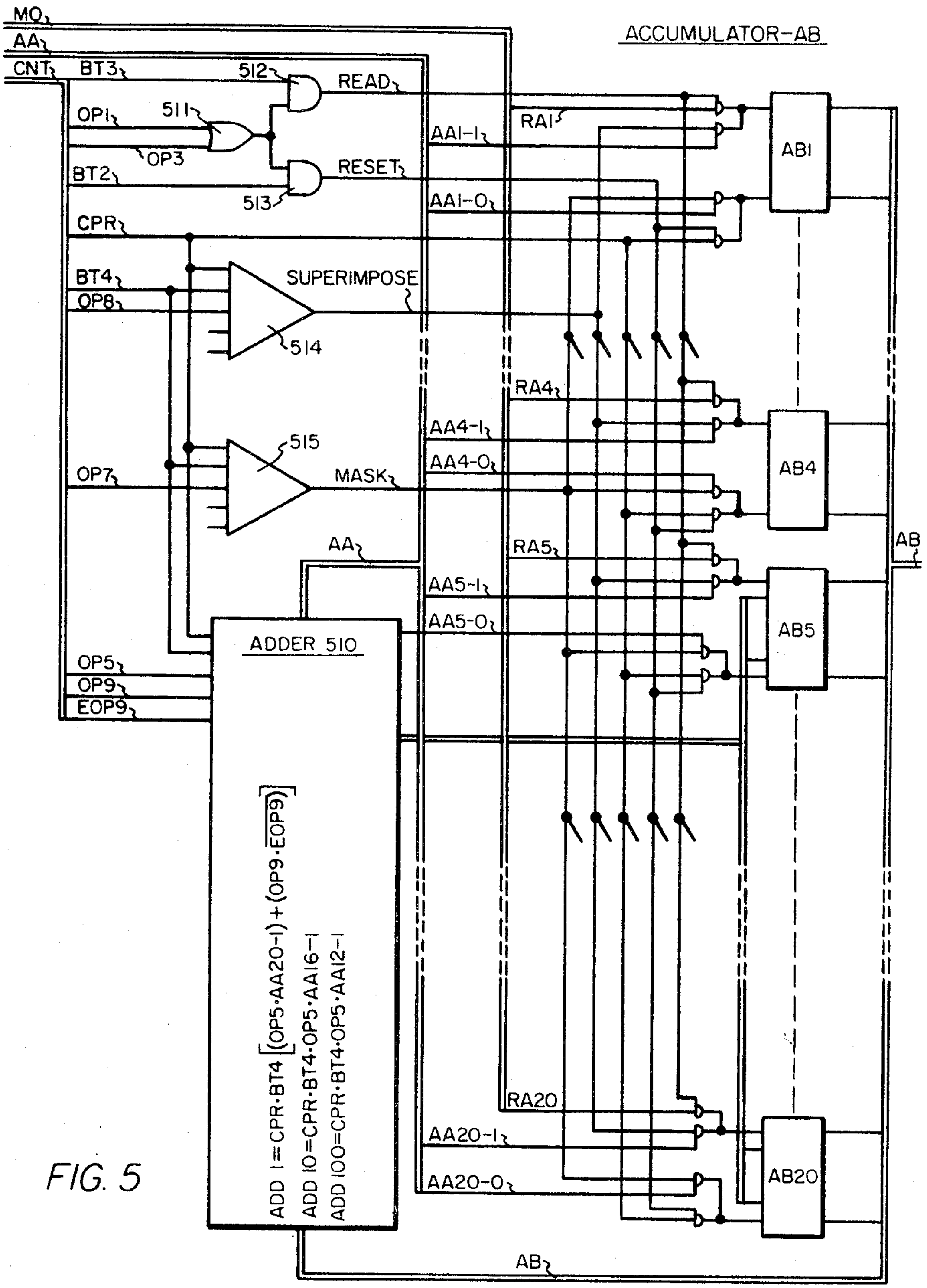

The accumulator AB shown in FIG. 5 comprises 20 flip-flops AB1–20. This register stores the output result for most of the operations, and also supplies part of the input data for many of them.

For the load and transfer operations, accumulator AB receives information directly from the memory output read amplifiers via the conductors RA1–20 to the AC inputs of one set of coincidence gates. For these operations the code OP1 or OP3 via OR gate 511 enables gates 512 and 513 so that during the bit time interval BT2 gate 513 supplies DC reset commands to a set of coincidence gates to reset all of the flip-flops on the occurrence of a pulse on lead CPR, and then during the interval BT3 gate 512 supplies a read command to the DC inputs of the set coincidence gates to load the information from the memory output.

Adder logic 510 provides the addition logic indicated by the Boolean equations within the box. This logic includes set and reset coincidence gates for the flip-flops AB5-20 having AC inputs from lead CPR, and logic for the DC inputs thereof which is actuated during bit time BT4 to add 1, 10 or 100 to the contents of the flip-flops AB5–20. For the add operation OP5, the data 1, 10 or 100 is stored in accumulator AA as a bit in the corresponding one of the flip-flops AA20, AA16 or AA12 respectively. For the SCAN operation OP9, the address in flip-flops AB5–20 is incremented by one during bit time BT4 as long as the signal on lead EOP9 has a value "0."

The mask and superimpose operations OP7 and OP8 control the gated pulse amplifier 515, 514 respectively during the interval BT4 to supply a clock pulse from lead CPR to the AC inputs of coincidence gates to cause information from accumulator AA at the DC inputs of the coincidence gates to ba masked via reset inputs, or superimposed via set inputs respectively.

The memory input register MI comprises flip-flops MI5–20, as shown in FIG. 6. The instruction for the next cycle is transferred from the address register AR via the leads AR5–1 to AR20–0 inclusive connected to the DC inputs of respective coincidence gates; which are clocked via signals from gated pulse amplifier 631 when enabled by a DC signal from OR gate 625, which occurs during bit time BT2 for code OP2 via gate 621, during bit time BT5 during codes OP4 or OP9 via gates 623 or 624 respectively, and for other codes during bit time BT4 via gate 622.

The data address from accumulator AB is transferred via DC inputs of set and reset coincidence gates which receive AC input pulses from gated pulse amplifier 632 when enabled during bit time BT2 and the operation codes OP3 or OP9 via OR gate 626.

The data address from accumulator register AA is transferred via DC inputs of set and reset coincidence gates which are clocked via a signal from gated pulse amplifier 633 when enabled during bit time BT2 and any of the operation codes OP1, OP4, OP5, OP6, OP7 or OP8 via OR gate 627. The output of the memory input register is decoded via the circuits 610 comprising logic circuits 611 for the first address digit from flip-flops MI5-8, decoding logic 612 for the second address digit from flip-flops MI9–12, via decoding logic 613 for the third digit from flip-flops MI13–16, and decoding logic 614 for the fourth digit from flip-flops MI17–20. The first two digits are used by the memory drivers 602 which require an enabling clock pulse on lead CPM. The last two digits are used by the memory switches 603.

As shown in FIG. 7, a storage register SA comprising flip-flops SA1–20 has an address 0021, a storage register SB comprising flip-flops SB5–20 has an address 0022, a storage register SC comprising flip-flops SC5–20 has an address 0023, and a storage register SD comprising flip-flops SD5–20 has an address 0024. Data may be stored in these registers from the accumulator AB via connections to the DC inputs of set and reset coincidence gates as shown. During the store operation in interval BT2 the signal on lead WRITE from gated pulse amplifier 231 (FIG. 3) supplies a clock pulse to the four gated pulse amplifiers 721–724. If one of these gated pulse amplifiers has its address stored in accumulator AA the signals from the set of conductors DAA via bus AB-B enables its DC inputs so that the clock pulse is gated to the AC inputs of the coincidence gates of the corresponding storage register to cause a transfer of the data from accumulator AB. To load information from one of these storage registers into the accumulator AB during the load operation one of the storage readout circuits SR21–SR24 is used. These storage readout circuits are disclosed in said Memory Arrangement patent application by R. M. Thomas. Each of them has an input shown via bus RA-B from the memory driver MD00, and from the memory switches on one of the leads MS21–MS24 corresponding to the last two digits of its address. When both the memory driver and the memory switch of one of the storage readout circuits is enabled the data from the corresponding storage register is supplied via the set of conductors comprising bus RA-B to the read amplifiers 102 (FIG. 1) and then via the memory output bus MO to accumulator AB.

The output from the flip-flops SA1-20 is also supplied via the set of conductors SA to the scan unit 200 for use in the SCAN operation OP9.

Indirect Addressing of Registers, Senders and Automatic Number Identification Units Indirect addressing with permanently wired addresses is used for the registers, senders and automatic number identification units shown as block 130 in FIG. 1. The indirect addressing apparatus comprises gated pulse amplifiers 441 and 442 shown in FIG. 4, and the store registers SB and SC along with decoding circuits 731–735 shown in FIG. 7. Indirect addressing is used only for the write-control operation using the STORE code OP2; direct addressing of the same store registers being used for the read-control operations using the LOAD code OP1 or the TRANS code OP3. The operand addresses 001θ and 002θ are used for indirect addressing, which enable the gated pulse amplifiers 441 and 442 respectively. Thus the output of decoding gate 432 supplies the signal AATH0 supplying the thousands digit, decoding gate 433 supplies the signal AAH0 which is the hundreds digit, the decoding circuits 434 supply the tens digits AAT1 and AAT2, and the decoding circuits 435 supply the units digit AAUθ for the D.C. inputs of these gated pulse amplifiers. During a STORE operation the gated pulse amplifier 331 (FIG. 3) is enabled by the signals on leads OP2 and BT2 to gate the clock pulse on lead CPR to the lead WRITE, connected to the clock pulse inputs of the gated pulse amplifiers 441 and 442, which have the respective output leads CPSW and CPRW. Thus when one of these gated pulse amplifiers is addressed during a STORE operation a clock pulse appears on its output.

The address of a store being indirectly addressed is placed in either store register SB or store register SC. As shown in FIG. 7 the store register SB comprises flip-flops SB5-SB20, with the output of flip-flops SB13-SB16 being decoded by circuits 731 to supply the tens digits SBT1-SBT6, and the output of flip-flops SB17-20 is decoded by circuits 732 to apply the units digit on one of the 10 output leads SBU1-SBUθ. The store register SC comprises flip-flops SC5-SC20, with the thousands digit from the output of flip-flops SC5–8 decoded by circuit 733 to supply either the thousands digit SCTH0 or SCTHC, the output of flip-flops SC13–16 is decoded by circuit 734 to supply the tens digit on one of the six output leads SCT6-SCTB, and the output of flip-flops SC17-20 is decoded by circuit 735 to supply the signal on one of the 10 output leads SCU1-SCUθ.

Figure 15:
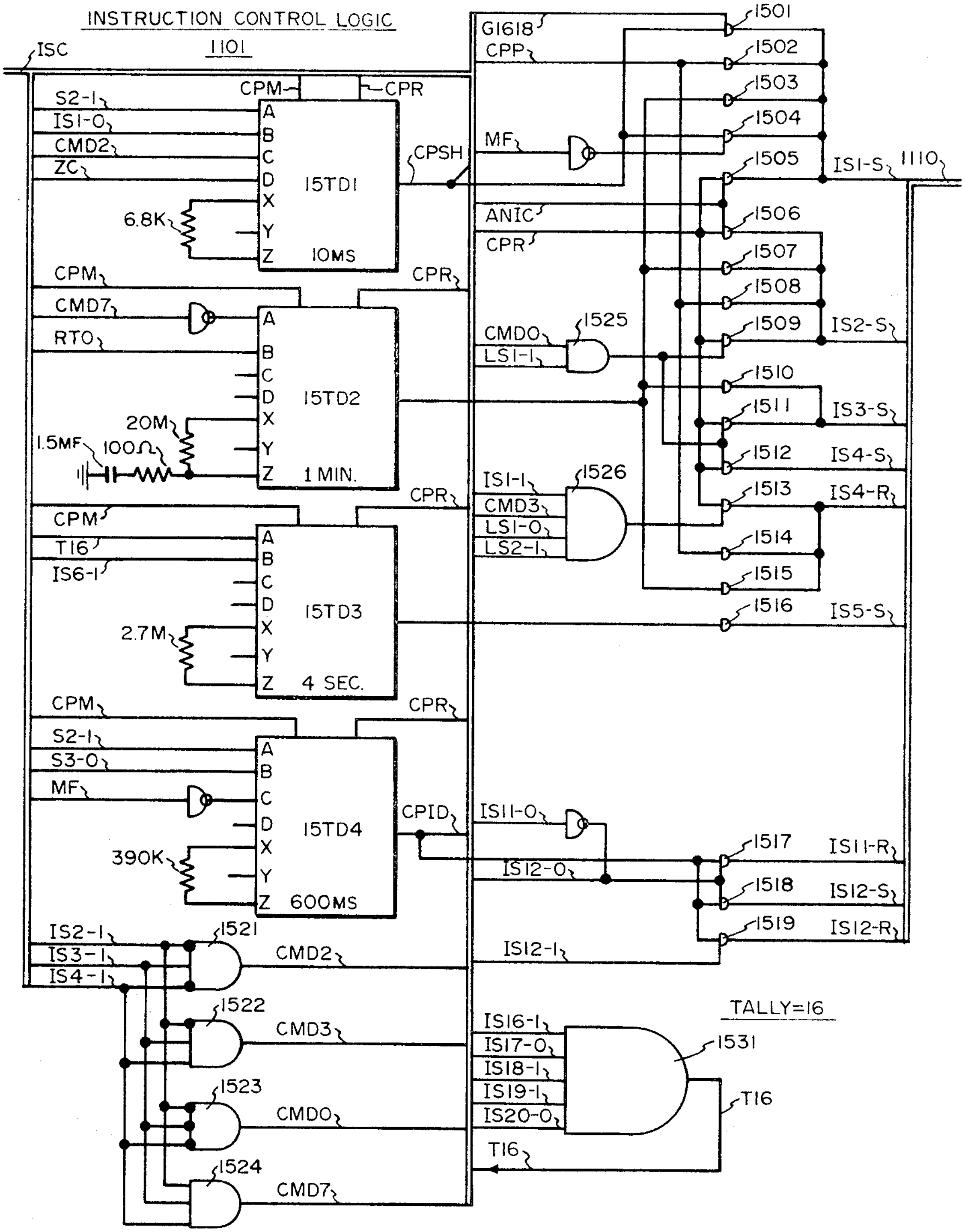
FIGS. 15–17 are functional block diagrams showing some details of one sender.

For purposes of the STORE operation, the stores of the registers, senders and automatic number identification units may be grouped into two sets, one set comprising a directory number store and an equipment number store for each of 22 dial registers; and the other set comprising a directory number store and a sender number store for each of eight automatic number identification units, and four stores for each of 10 senders. FIG. 15 shows the directory number store DN of dial register No. 1 having address C011 and the equipment number store EN of register No. 22 having address C062, the directory number store NS of the automatic number identification unit No. 1 having address 0071, the instruction store IS of sender No. 1 having address C071, and the equipment number store EN of sender No. 10 having address C0B9. Each of these stores has its own individual gated pulse amplifier which may be designated as an "input control gate" for the store, with the gated pulse amplifiers 441 and 442 designated as "special control gates" for indirect addressing. Each of the gated pulse amplifiers 1011–1062 for the set of stores associated with the dial registers has its clock pulse input connected to lead CPRW and has individual inputs from the store register SB decoding circuits for the tens and units address digits. The thousands and hundreds digits for all of these stores are C0 and therefore the decoding connections are not necessary, but could be decoded and connected to the gated pulse amplifiers if desired. In the second set each of the gated pulse amplifiers such as 1471, 1171 and 13B9 have their clock pulse inputs connected to lead CPSW, with decoding connections for the thousands, tens and units digits (the hundreds digit being always zero).

REGISTER-SENDER AND ANI APPARATUS

Figure 8:
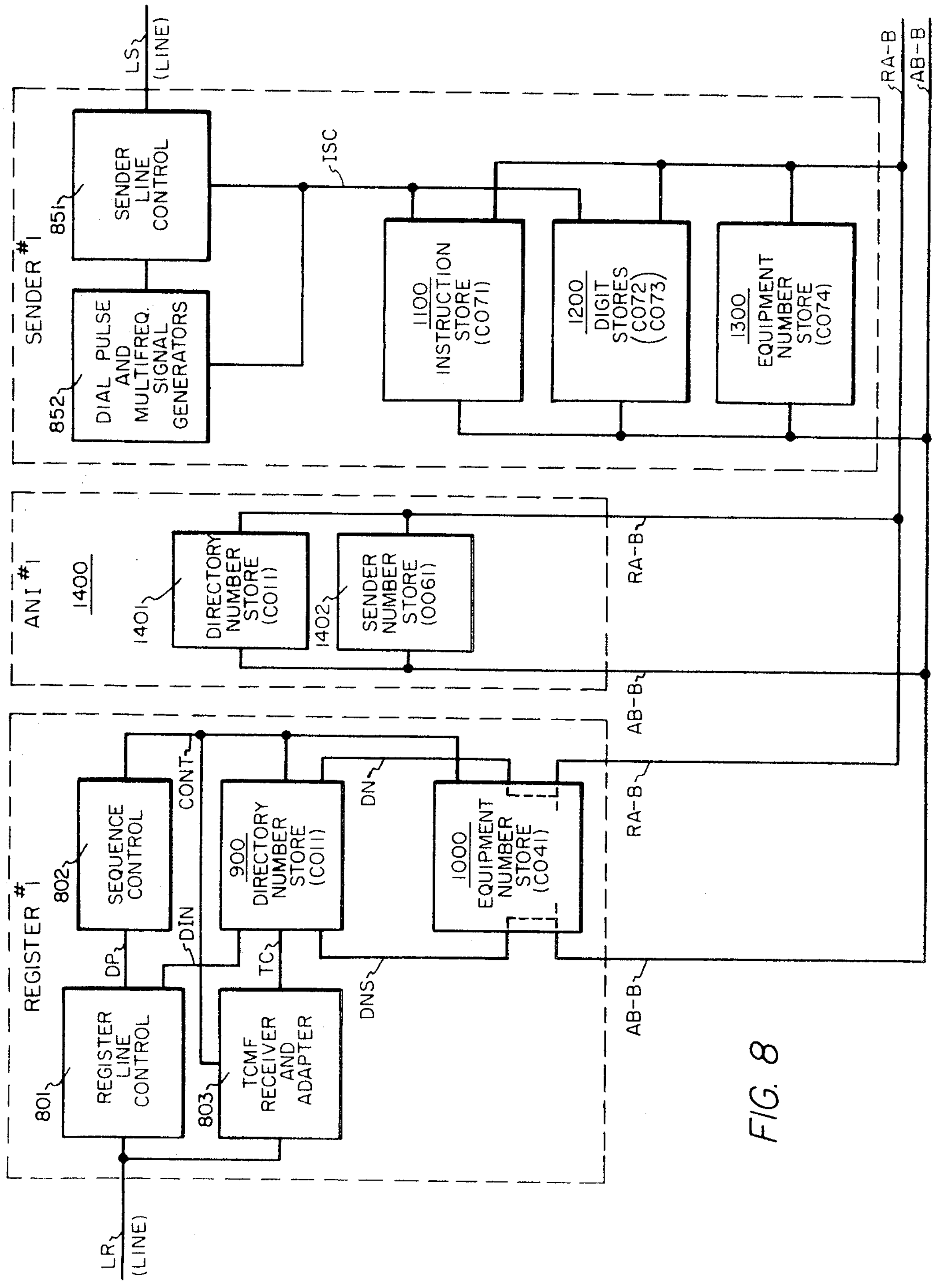
FIG. 8 is a single line block diagram of one register, one sender, and one automatic number identification unit.

FIG. 8 is a single line block diagram of one of the dialing registers, one of the senders and one of the automatic number identification (ANI) units. Each of the registers has a directory number store 900 and an equipment number store 1000 which for register No. 1 have the addresses C011 and C041 respectively; and also a register line control circuit 801, sequence control circuit 802 and a touch calling receiver and adapter 803.

Each of the senders includes an instruction store 1100, two digit stores 1200 and an equipment number store 1300 which for sender No. 1 have the addresses C071, C072, C073 and C074 respectively; and also a sender line control circuit 851 and circuits for dial pulse and multifrequency signal generators 852.

Each of the automatic number identification units 1400 has a directory number store 1401 and a sender number store 1402 which for ANI unit No. 1 have the addresses 0071 and 0061 respectively.

Each of the stores is coupled to the store bus AB-B to store data therein from the accumulator, and to the load bus RA-B to read data from the stores into the accumulator.

Figure 9:
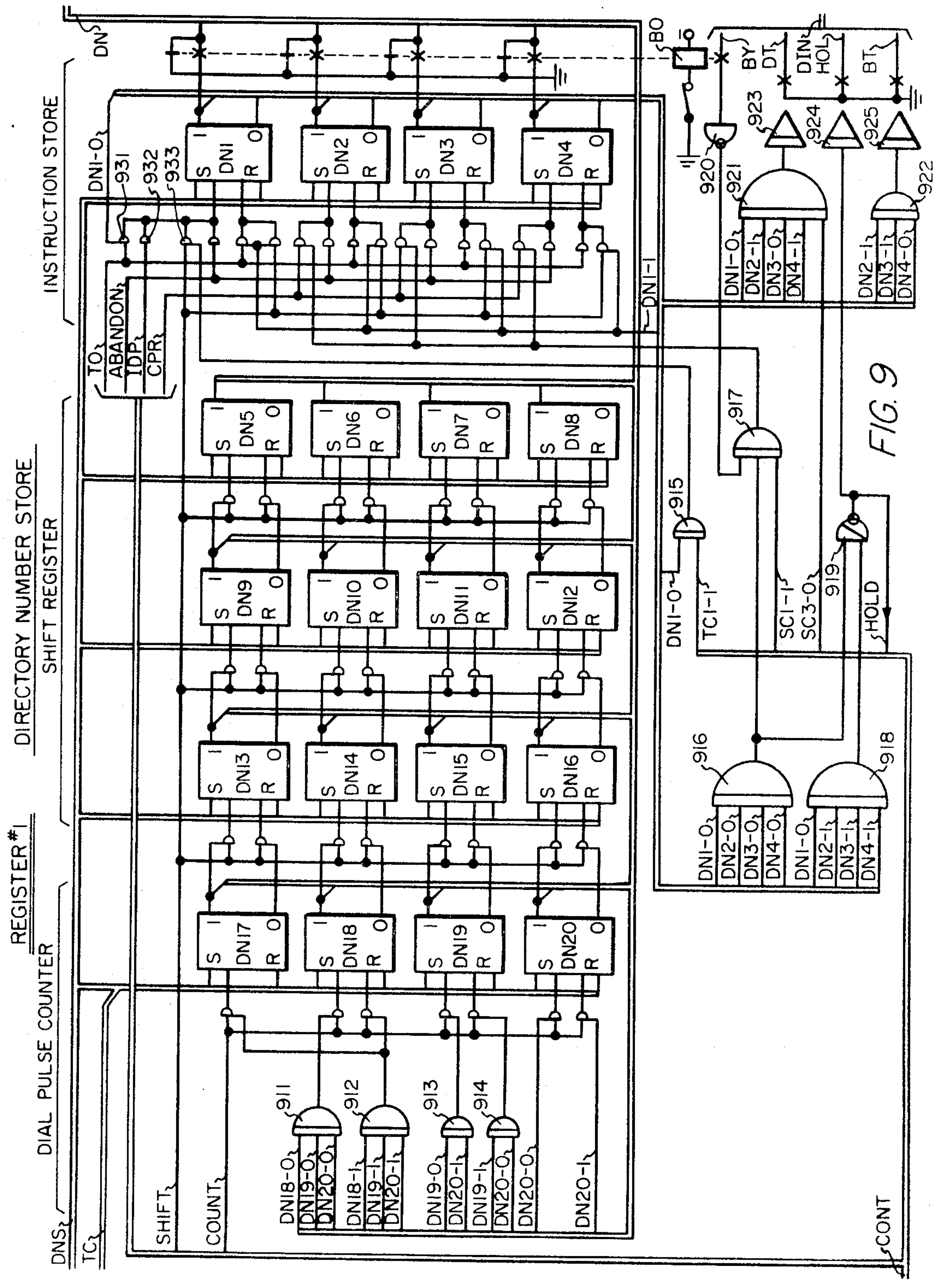
FIGS. 9 and 10 are functional block diagrams of the stores associated with a dialing register.

The directory number store for dialing register No. 1, shown in FIG. 9, comprises 20 flip-flops DN1-20. Flip-flops DN1–4 are used as an instruction store, flip-flops DN17–20 are used as a dial pulse counter, and flip-flops DN5–16 are used as a shift register for the dialed digits, digits being accumulated in the flip-flops DN17–20 and then during each interdigital pause each digit being shifted up one digit position. There are also various control logic circuits associated with the directory number store shown in FIG. 9. The input gates for the write-control STORE operation, and the storage readout circuit for the read-control operations are shown in FIG. 10, and connected by the sets of conductors DNS and DN respectively.

Figure 10:
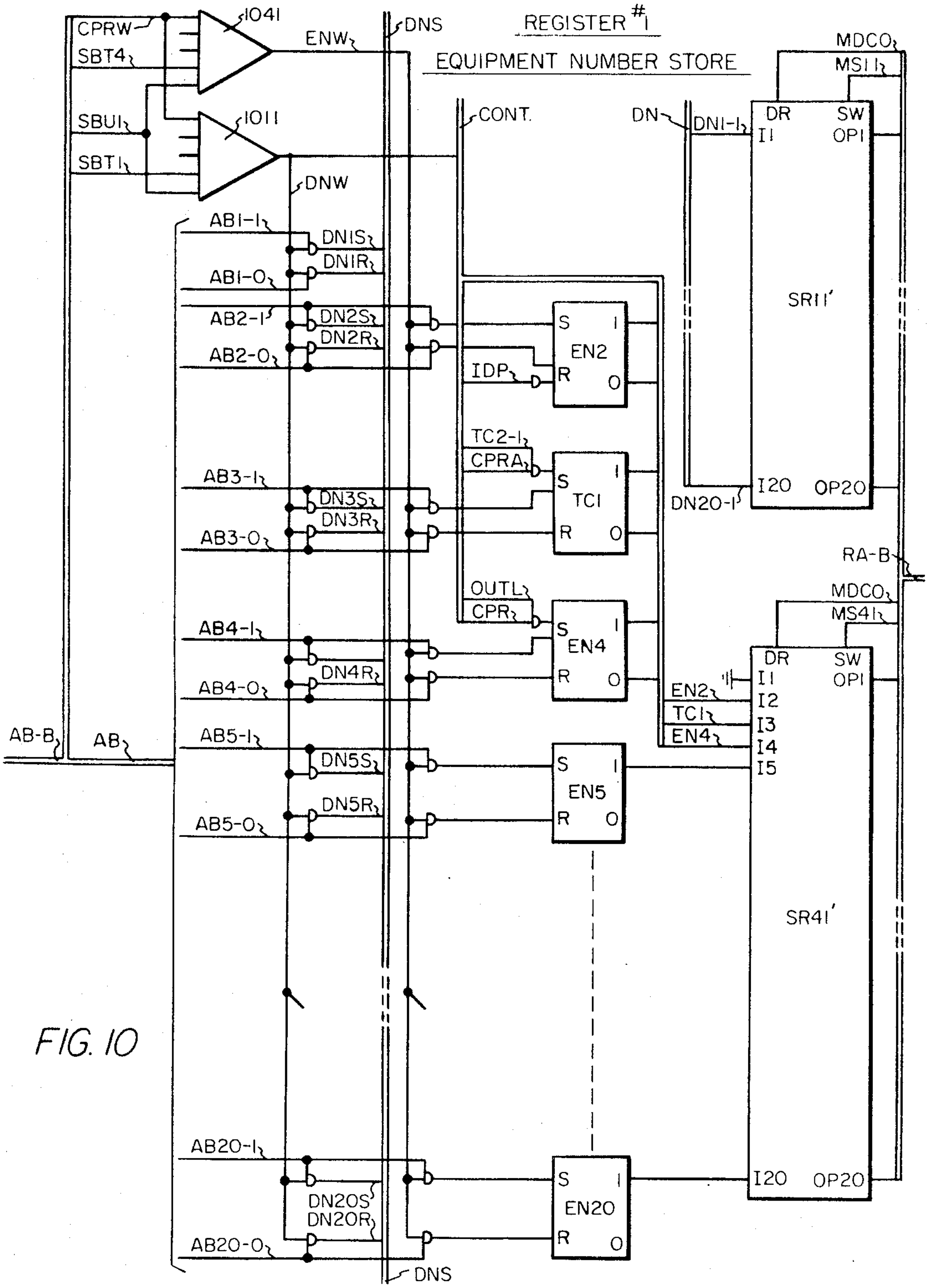

The equipment number store for dialing register No. 1, shown in FIG. 10, comprises flip-flops EN2-20. The flip-flop in the place of EN3 is designated TC1 because of its function for touch calling service. The store bus AB-B has the address conductors connected to the gated pulse amplifiers 1011 and 1041 and the data conductors AB1–1 through AB20–0 connected for double rail input to the input coincidence gates for both the directory number and equipment number stores. When the gated pulse amplifier 1011 is addressed by the decoded signals from store SB, namely SBT1 and SBU1, then when a pulse appears on lead CPRW it is gated to the lead DNW to enable the input coincidence gates for the directory number store, the outputs being coupled to the set and reset inputs of flip-flops DN1-20 via the set of conductors DNS which comprises the set and reset conductors DN1S, DN1R for flip-flop DN1 through the set and reset conductors DN20S and DN20R for flip-flop DN20. Similarly when the gated pulse amplifier 1041 is addressed by the signals on leads SBT4 and SBU1 and a pulse appears on lead CPRW it is gated to lead ENW to enable the input coincidence gates for the equipment number store. The storage readout circuits SR11' and SR41' are used to transfer information from the directory number and the equipment number stores respectively to a load bus when they are addressed by the appropriate memory driver and then memory switch signals.

Figure 11:
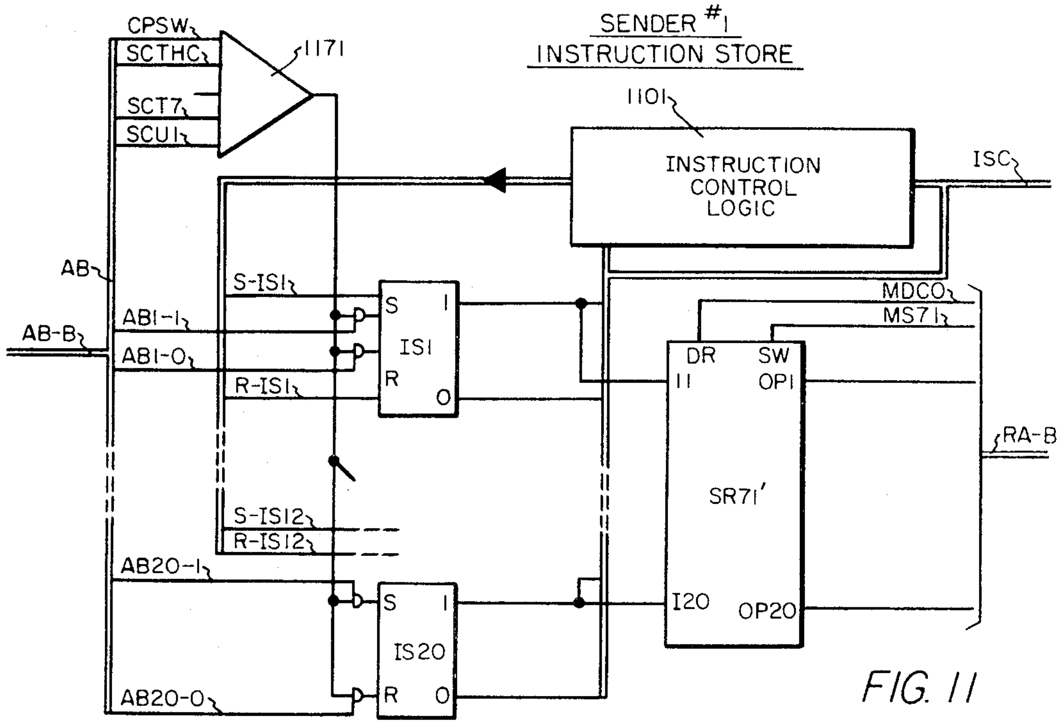
FIGS. 11, 12 and 13 are functional block diagrams of the stores associated with a sender.

The instruction store for sender No. 1, shown in FIG. 11, comprises flip-flops IS1-20. Certain of these flip-flops may be omitted depending upon the functions required. The gated pulse amplifier 1171 has direct current addressing signal inputs from the decoded outputs of storage register SC, and a clock pulse input on lead CPSW to control writing information into this store from the store bus AB-B. A storage readout circuit SR71' controls placing information from this store onto the load bus RA-B when appropriately addressed. There are additional logic control circuits designated instruction control logic 1101 associated with these circuits for certain sender control functions.

Figure 12:
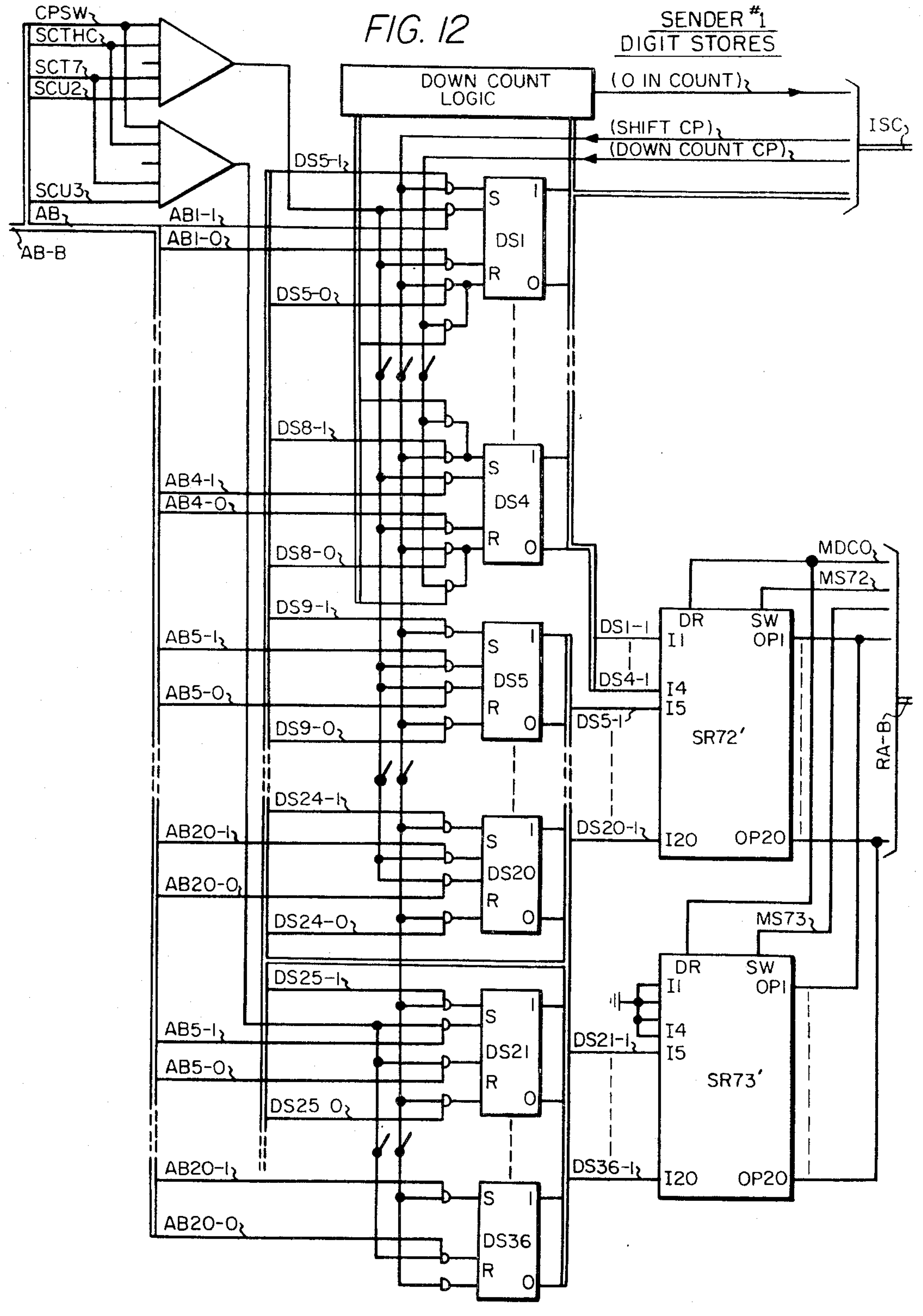

The sender No. 1 digits stores, shown in FIG. 12, comprise twenty flip-flops DS1–20 as a first store, and flip-flops DS21–36 as a second store. Input of information from the store bus AB-B is controlled by the gated pulse amplifiers 1272 and 1273 respectively which have decoded address inputs from the store SC and a clock pulse input on lead CPSW. The output is via storage read-out circuits SR72' and SR73' to the load bus RA-B with address inputs from the memory drivers and switches. There is also a down count logic block 1201 associated with flip-flops DS1–4 used in dial pulse sending. These two stores are also connected as a shift register to shift digits a full digit position (four flip-flops) after each digit has been sent in response to a signal on the lead designated (shift CP).

Figure 13:
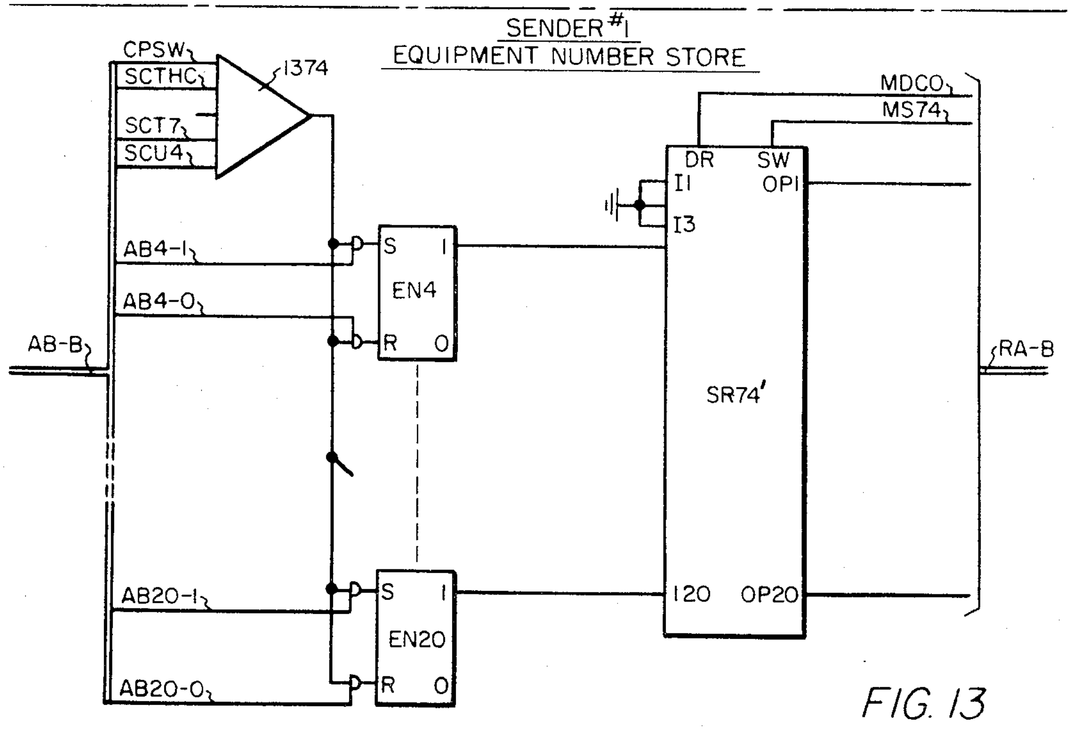

The equipment numbers store for sender No. 1, shown in FIG. 13, comprises flip-flops EN4–20. The input from the store bus AB-B is controlled by gated pulse amplifier 1374 having decoded inputs from store register SC and a clock pulse on lead CPSW. The output is via storage readout circuit 74' to load bus RA-B.

Figure 14:
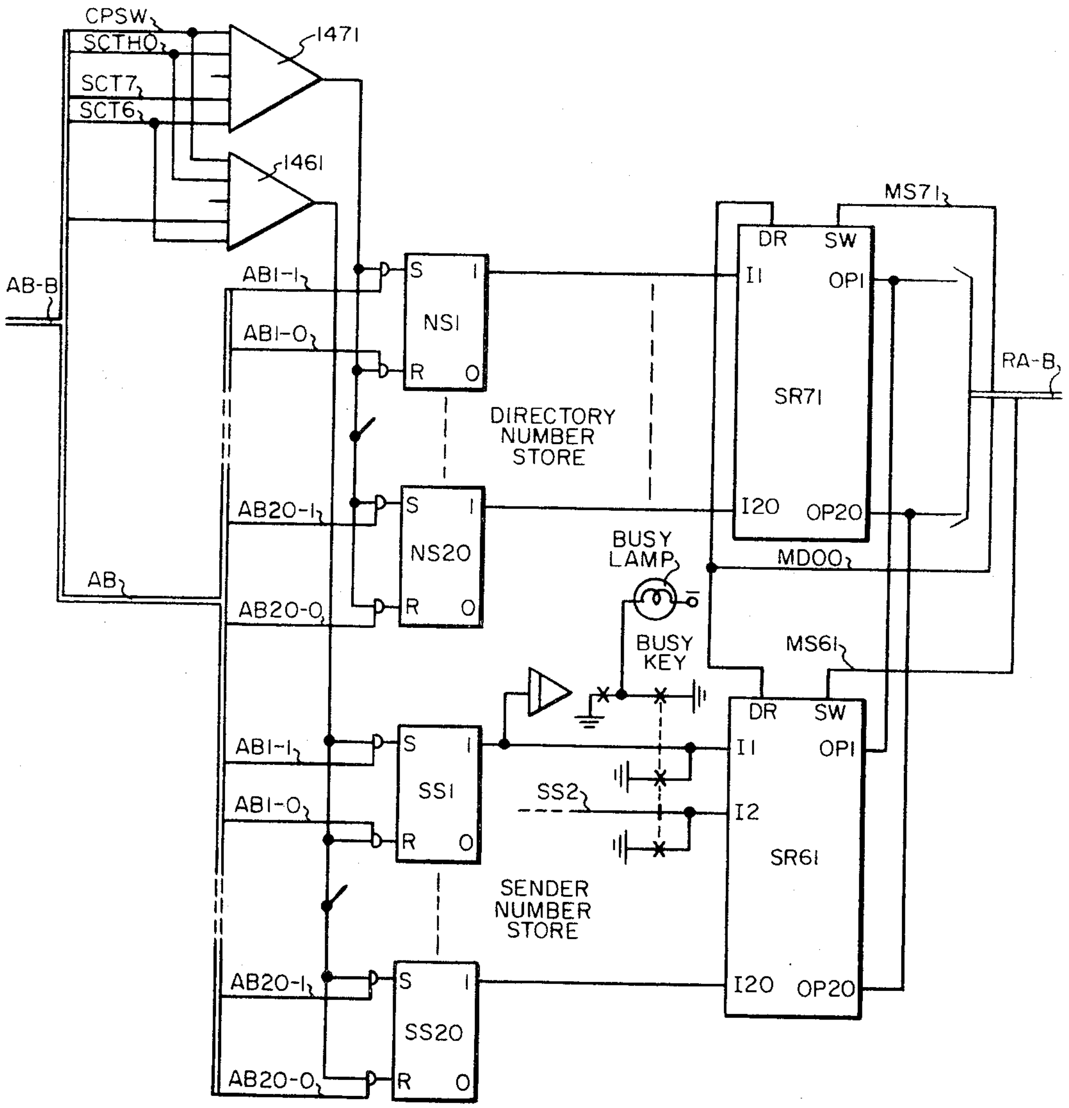
FIG. 14 is a functional block diagram of the stores associated with an automatic number identification unit.

The ANI (automatic number identification) store No. 1 1400, shown in FIG. 14, comprises a directory number store with flip-flops NS1–20, and a sender number store with flip-flops SS1–20. The input from the store bus AB-B is controlled by gated pulse amplifiers 1461 and 1471 respectively having decoded inputs from the store register SC, and a clock pulse input CPSW. The output is via the storage readout circuits SR61 and SR71 to the load bus RA-B, with memory driver and switch inputs.

The store address numbers for registers and senders, which use the memory driver C0 (the thousands and hundreds digits of the address) are as follows:

REGISTER NUMBERS (22 Registers)

| Reg. | DN | EN |
|---|---|---|
| 1 | C011 | C041 |
| . | . | . |
| . | . | . |
| 10 | C010 | C040 |
| 11 | C021 | C051 |
| . | . | . |
| . | . | . |
| 20 | C020 | C050 |
| 21 | C031 | C061 |

| | | | |
|---|---|---|---|
| 22 | C032 | C062 | |

SENDERS (10 Senders)

| Sender | IS | DSNo.1 | DSNo.2 | EN | Spare |
|---|---|---|---|---|---|
| 1 | C071 | C072 | C073 | C074 | C075 |
| 2 | 81 | 82 | 83 | 84 | 85 |
| 3 | 91 | 92 | 93 | 94 | 95 |
| 4 | C0θ1 | C0θ2 | C0θ3 | C0θ4 | C0θ5 |
| 5 | B1 | B2 | B3 | B4 | B5 |
| 6 | 76 | 77 | 78 | 79 | 7θ |
| 7 | 86 | 87 | 88 | 89 | 8θ |
| 8 | 96 | 97 | 98 | 99 | 9θ |
| 9 | θ6 | θ7 | θ8 | θ9 | θθ |
| 10 | B6 | B7 | B8 | B9 | Bθ |

The various store addresses using the memory drivers MD00 (the thousands and hundreds digits) are as follows:

| Stores | Units | | | | | | | | | | |
|---|---|---|---|---|---|---|---|---|---|---|---|
| | 1 | 2 | 3 | 4 | 5 | 6 | 7 | 9 | 9 | θ | |
| Tens: | | | | | | | | | | | |
| 1 | MA | MB | MC | MD | ME | MF | TA | TB | TC | SK | Marker stores. |
| 2 | SA | SB | SC | SD | | | | | | RG | Temporary stores. |
| 3 | PA | PB | PC | PD | PE | PF | PG | PH | PJ | | Printer stores. |
| 4 | XA | XB | XC | XD | | | | | TR | TD | Rotary switches. |
| 5 | SALF | SART | | | | | | | | | |
| 6 | ANI #1 | ANI #2 | ANI #3 | ANI #4 | ANI #5 | ANI #6 | ANI #7 | ANI #8 | ANI #9 | ANI #10 | ANI sender. Number store. |
| 7 | ANI #1 | ANI #2 | ANI #3 | ANI #4 | ANI #5 | ANI #6 | ANI #7 | ANI #8 | ANI #9 | ANI #10 | ANI directory. Number store. |

The stores designated with an M are a part of the marker, the stores designated with a P are associated with the printer subsystem, the stores designated with an X are rotary switches on the control panel, stores TA, TB and TC are peg count buffers, store TR is for a test routine request, and store TD is for the traffic distributor. The symbol RG is a register write mnemonic for the address 002θ, and the symbol SN is a sender write mnemonic for the address 001θ.

PROGRAMMING WITH INDIRECT ADDRESSING

To store information into one of the dial register directory or equipment number stores, the address of the store is first placed in the store register SB using the assembler instruction STORE SB, (machine instruction 20022), and then instruction STORE RG (machine instruction 2002θ) is used which in execution enables the gated pulse amplifier 442 to supply a pulse via lead CPRW to the gated pulse amplifiers of all of the dial register stores, the one designated by the tens and units digits decoded from store SB being enabled to store the data from the accumulator into the store addressed. Similarly to store data into any one of the sender stores or ANI stores, the address of the store is first placed in store register SC, using the instruction STORE SC (machine instruction 20023), and then the instruction STORE SN (machine instruction 2001θ) is used, which in execution enables the gated pulse amplifier 441 to gate a pulse via lead CPSW to all of the gated pulse amplifiers of the sender and ANI unit stores, the one with the decoded address digits from store SC being enabled to store the data from the accumulator AB via the store bus into the addressed store. To place data from any one of the register, sender, or ANI unit stores into the accumulator, the transfer operation code TRANS (OP3) is used. In this operation program instructions are first used to place the address of the desired store into the accumulator AB, and then the transfer operation instruction causes the data at that address to be read into the accumulator AB.

Note that with the indirect addressing technique described herein, it is not necessary in the program to use actual addresses of the stores of the registers, senders, or ANI units except for the first and in some cases the last numbered one. The program can be written in a loop with the store number appropriately incremented in performing various operations, and then the indirect addressing program technique for write-control, or the transfer operation for read-control, is used to write information into the appropriate store or read it out therefrom.

SHIFT APPARATUS

Special storage readout circuits SR51 and SR52, shown in FIG. 7, are also provided for shift left and shift right operations using the contents of storage register SA. Thus the load instruction OP1 with address 0051 (instruction 10051) will cause the contents of the storage register SA to be loaded into accumulator AB shifted one digit (four bits) to the left, that is the bits SA5–20 are loaded into flip-flops AB1–16 and zero's are loaded into flip-flops AB17–20.

In like manner the storage readout circuit SR52 may be used to shift the information from storage register SA one digit (four bits) to the right. Thus the instruction 10052, which provides the code OP1 and the address 0052, causes the storage readout circuit SR52 to be enabled to transfer the information from flip-flops SA1–16 into the accumulator register AB flip-flops AB5–20, and a digit zero will appear in flip-flops AB-1–4.

Note that for additional parallel shift operations, the contents of accumulator AB must be stored in storage register SA before the shift instruction is repeated.

SENDER HARDWARE AND ITS OPERATION

Figure 16:
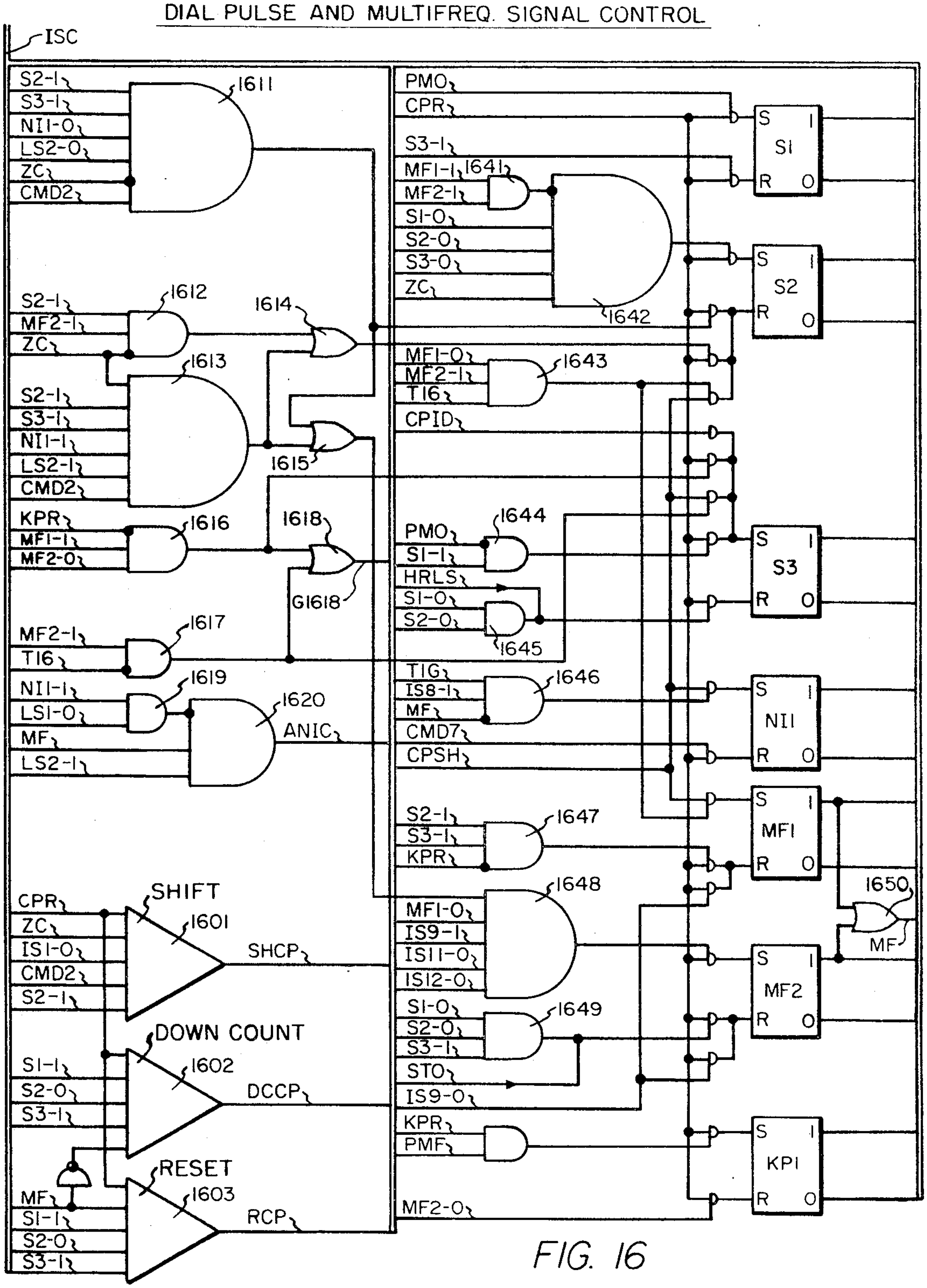
Figure 17:
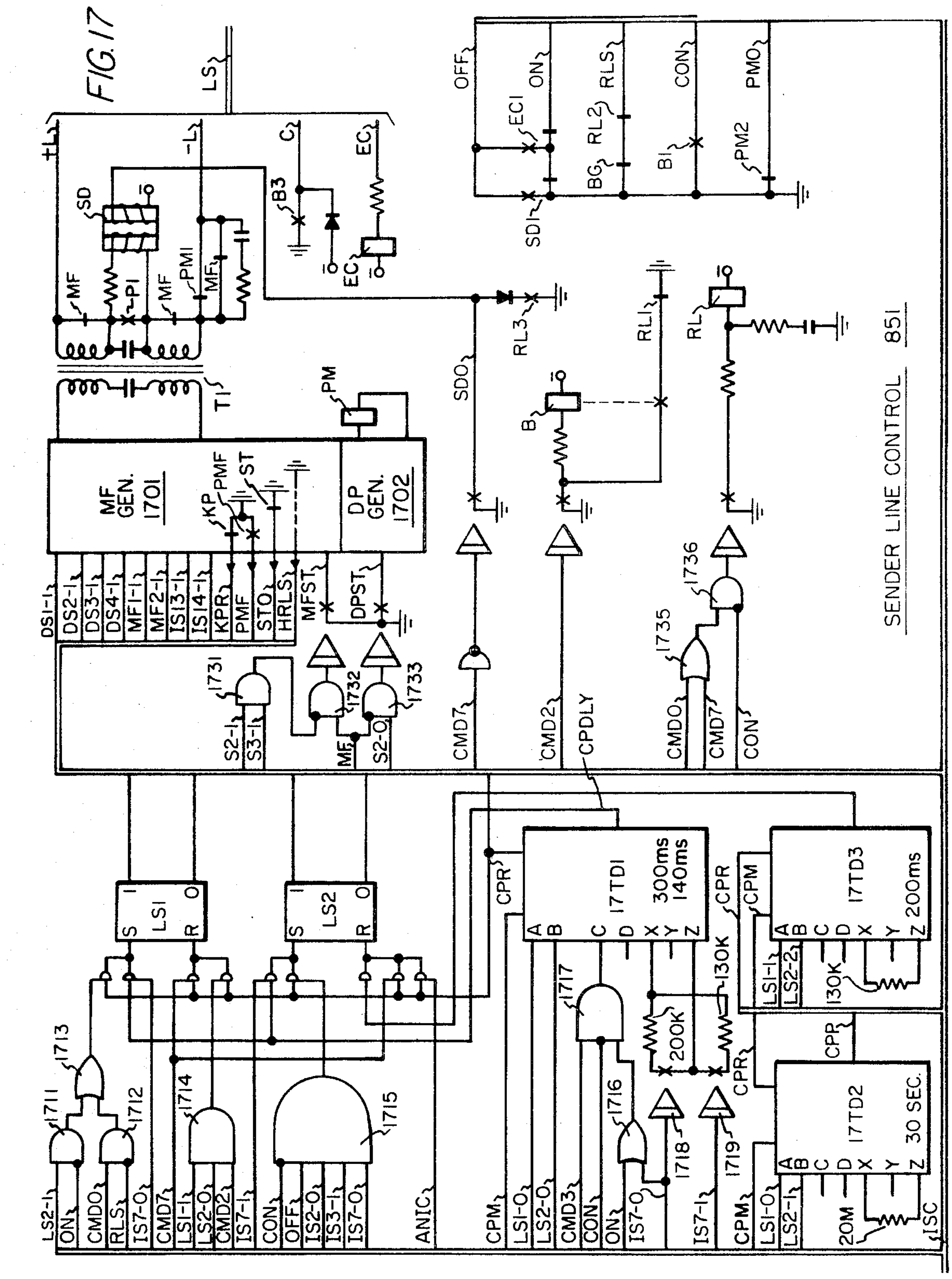

The logic and other circuits connected to the sender stores of FIGS. 11–13 for one sender are shown in FIGS. 15–17, with some circuits shown in detail.

The instruction store (FIG. 11) is used to store information such as call-for-service, command, wink start request, operator time-out call-for-service, operator time-out request, ANI request, MF request, routing count, ST tone request and tally information. The equipment number store (FIG. 13) is used initially on a call to store the calling line equipment number, and later in its place is stored the terminating junctor equipment number.

The sender includes a sequence control circuit comprising flip-flops S1, S2, S3 in FIG. 16, a loop status monitor circuit comprising flip-flop LS1 and LS2 in FIG. 17, and down counting logic 1201 in FIG. 12.

The gated pulse amplifier 1601 of FIG. 16 is used to supply the shift clock pulse for the digit store of FIG. 12. This gated pulse amplifier is enabled under the following conditions: the sequence control flip-flop is set (S2–1), the digit comprising the four bits DS1–4 is a zero (ZC), the sender is not calling for service as indicated by flip-flop IS1 being in the reset state (IS1-0) and the instruction command in flip-flops IS2–4 is state

010 (CMD2). Under these conditions the gated pulse amplifier 1601 is enabled to pass a clock pulse from lead CPR to SHCP to shift the digits in the digit store of FIG. 12.

The down count logic 1201 of FIG. 12 is used to down count the digit in flip-flops DS1–4 in response to a down count clock pulse on lead DCCP. When the counter reaches zero a gate in logic 1201 decodes the states of the flip-flops DS1–4 to produce the zero-in-count signal on lead ZC. This condition is used to indicate that shifting is now required in order to place a new digit in the down counter.

The instruction store shown in FIG. 11 actually comprises two separate equipment units one of which is always provided and used for dial pulse control instructions, and the other portion of which is used for multi-frequency control instructions and is only provided when the sender is equipped for multifrequency sending. The dial pulse portion comprises the call for service flip-flop IS1, the command digit flip-flops IS2–4, the wink start request flip-flop IS7 and the tally flip-flops IS16–20. The operations controlled by bits IS1–4 are summarized in TABLE AA.

TABLE AA

SENDER INSTRUCTION STORE CODES

| State | Bit Position 1 (CFS BIT) | 2 (CMD BITS) | 3 (CMD BITS) | 4 (CMD BITS) | CMD | Description |
|---|---|---|---|---|---|---|
| 7 | 0 | 1 | 1 | 1 | 7 | Sender idle |
| 1 | 0 | 0 | 0 | 1 | 1 | Sender dedicated |
| 9 | 1 | 0 | 0 | 1 | 1 | Request sender to trunk connection |
| B | 1 | 0 | 1 | 1 | 3 | Request line to trunk connection (split mode) |
| 3 | 0 | 0 | 1 | 1 | 3 | Activate loop status monitor |
| 2 | 0 | 0 | 1 | 0 | 2 | Activate outpulsing sequence |
| θ | 1 | 0 | 1 | 0 | 2 | Sender empty |
| 0 | 0 | 0 | 0 | 0 | 0 | Sender busied-out or releasing |
| E | 1 | 1 | 1 | 0 | 6 | Sender timed out |

The multifrequency equipment includes the time out call for service flip-flop IS5, the time out request flip-flop IS6, the ANI request flip-flop IS8, the MF request flip-flop IS9, the routing count flip-flops IS11 and 12, and the ST tone request flip-flops IS13 and 14. The instruction control logic 1101 shown in FIG. 15 comprises time delay circuits, logic and coincidence gates for changing the states of the instruction store flip-flops under the control of the sender.

Flip-flop IS1 is a sender call-for-service (CFS) bit and when set, it indicates to the central processing unit that the sender is calling for service.

The timer 15TD1 is a 10 millisecond timer which is activated at the same time as the shift gated pulse amplifier 1601. When a new digit has been shifted into the down counter, the timer 15TD1 will be disabled again as will the shift gated pulse amplifier. However, if the digit store flip-flops of FIG. 12 none contain any digits when a new digit will never be shifted into the down counter, and so the timer 15TD1 will time for 10 milliseconds after which it will produce an output pulse which sets flip-flop IS1 via transmission gate 1504. This causes the sender to call for service to request more digits.

When the sender is seized a command other than CMD7 (idle) is placed in the sender flip-flops IS2–4. This causes the output of gate 1524 to supply a signal "1" on lead CMD7. When command 3 (011) is present in flip-flops IS2–4, the output of gate 1522 is true to supply a signal on lead CMD3. In FIG. 17 this command operates a relay driver to operate relays B, which grounds the C lead to the network terminal line LS.

When the command 0 appears in flip-flops IS1–4, the sender releasing sequence is initiated. The output of gate 1523 becomes true on lead CMD0, which enables gate 1712 in FIG. 17. Also OR gate 1735 gates the command CMD0 to gate 1736. If relay B is operated ground on lead CON means that then gate 1736 is not inhibited via that input so that the output becomes true to enable a relay driver to supply ground to operate relay RL. When this release relay operates it releases the holding ground from relay B and thus causes it to release and remove the ground from the C lead. This causes the network connections to drop. The release relay itself will restore. When both the relay B and relay RL have restored then the signal on lead RLS becomes ground to cause the output of gate 1712 to become true. This condition is gated via OR gate 1713 to a coincidence gate, so that the next clock pulse on lead CPR sets flip-flop LS1. With flip-flop LS1 set and the command CMD0 in the sender instruction store, gates 1525 of FIG. 15 has its output true which enables coincidence gates 1509, 1511 and 1512 to set flip-flops IS2, 3 and 4 with the next pulse on lead CPR. Now the command in the sender is CMD7 (idle). This signal enables a coincidence gate having an AC input from lead CPR to reset flip-flop LS1. Also as a safeguard against the relay B locking up while the sender is idle, the signal on lead CMD7 via gates 1735 and 1736 operates a relay driver to supply ground to relay RL to release the relay B. The relay driver for supplying ground to lead SDO in FIG. 17 is energized for all commands other than CMD7 and thus maintains the SD (shunt field) relay partially energized at all times while the sender is busy in order to recognize any stop dial signals which might occur.

Gate 1526 in FIG. 15 is used to change the command in the sender instruction store from CMD3 to CMD2 when outpulsing is to begin, using the coincidence gate 1513 to reset flip-flop IS4.

Referring now to the multifrequency portion of the instruction store, flip-flops IS5 and IS6 are used to provide the system with a 3–5 second operator time-out feature. When a 0 has been dialed, it is necessary to determine whether or not the subscriber wishes to place an extended DDD call or whether he simply wants to reach the operator. To do so, when the 0 is seen by the central processing unit, (in the appropriate register service routine) it will set flip-flop IS6 of the associated sender. Also it will set the tally of the sender equal to 16 in flip-flops IS16–20. With flip-flops IS6 set and the tally equal to 16, timer 15TD3 is enabled to time for 4 seconds. When this interval has elapsed it will produce an output pulse to set flip-flop IS5 via coincidence gate 1516. This is the operator time-out CFS bit. This call for service will be picked up by the central processing unit and the appropriate action taken, which would be in this case to connect the subscriber line to the operator. However, if another digit is received before the four-second interval has elapsed the central processing unit will reset flip-flop IS6 and thus disable the timer and in this case, the subscriber wishes to place an EDDD call. This explanation of the operator time-out feature is intended as a general description of the function of this circuit. The actual programming operations may vary considerably as the needs required.

The central processing unit will set flip-flop IS8 when ANI is required on a particular call. When this flip-flop is in the reset state, ANI is not required.

If the sender is to send in the multifrequency mode the central processing unit will set flip-flop IS9. When this flip-flop is not set, the sender will send in the dial pulse mode. Flip-flop IS11 and IS12 are the sender routing flip-flops and are wired, using coincidence gates 1517, 1518 and 1519 to down count to zero. When routing digits are required on a particular call these flip-flops will be loaded with the number of routing digits to be sent (1–3 routing digits are possible). These flip-flops down count with 3 indicated by both IS11 and 12 set, 2 indicated by IS11 set, 1 indicated by IS12 set, and 0 indicated by both reset. Since the routing digits are always sent in the dial pulse mode these flip-flops are wired to inhibit the sender from sending in the multifrequency mode until the routing count has reached zero. This is accomplished via gate 1648. Flip-flop MF2 is not set until the routing flip-flops have down counted to zero. Thus the sender sends in the dial pulse mode until all routing digits have been sent.

Flip-flops IS13 and IS14 are used to store the ST tone requirement on any particular call. There are four possible ST tones which may be sent and there are four binary states of these two flip-flops. These signals are supplied to the MF generator 1701 which decodes them to apply the correct tone combination for the desired ST tone.

The loop status monitor comprising flip-flops LS1 and LS2 and associated logic in FIG. 17 is designed to recognize delay dial, stop dial, and wink start signals. When flip-flop IS7 is set this circuit looks for a wink start signal and when flip-flop IS7 is in the reset condition it looks for delay and stop dial signals.

Delay and stop dial recognition. With flip-flop IS7 reset, relay driver 1718 is operated causing a 200,000-ohm resistor to be connected between terminals X and Z of timer 17TD1, so that it will time for 300 milliseconds. When the sender is idle, the signal on lead CMD7 enables coincidence gates having AC inputs from lead CPR to continuously reset flip-flops LS1 and LS2, so that the idle state of the loop status circuit comprises these two flip-flops being reset (00).

With command CMD3 the loop status monitor is activated for delay dial. When the sender is connected to the outgoing trunk circuit (B relay operated and ground applied to the C lead) the signal on lead CON supplies a ground to gate 1717 to cause its output to become "1." This causes the timer 17TD1 to be actuated and to time for 300 milliseconds.

After 300 milliseconds timing period, if a delay dial has not been received then timer 17TD1 will produce an output which sets flip-flop LS1 via a coincidence gate enabled by the signal on lead IS7-0. Thus the loop status comprises flip-flop LS1 set and LS2 reset (10).

With the sender instruction store containing a command CMD3 then this state of the loop status causes the output of gate 1526, FIG. 15, to become "1" (if no CFS is present) and thus to reset flip-flop IS4 via coincidence gate 1513. This in fact changes the command in the instruction store from CMD3 to CMD2 and allows outpulsing to begin. Once the command has been changed from CMD3 to CMD2, the output of gate 1714 becomes "1" so that on the next pulse on lead CPR, flip-flop LS1 is reset. The loop status is then both flip-flops LS1 and LS2 in the reset state (00).

The loop status monitor is now back to the idle state and will monitor the trunk loop for any stop dial which might occur.

If during the 300-millisecond timing interval of timer 15TD1 a delay dial signal is received then the signal on lead OFF goes to ground and the signal on lead ON becomes a "1." This is because of the relay SD operating from the reverse battery received from the trunk. (For some trunk circuits instead of reverse battery a ground is supplied on lead EC to operate relay EC, which likewise supplies ground on lead OFF and a "1" on lead ON.) This will cause the output of gate 1715 to become "1" and on the next pulse on lead CPR flip-flop LS2 is set. The loop status now comprises flip-flop LS1 reset and flip-flop LS2 set (01).

This state activates timer 17TD2 which in turn will time the delay dial for 30 seconds after which this timer supplies an output pulse to load the time-out command (1110) into the sender instruction store, the pulse being supplied via lead CPP to coincidence gates 1502, 1508 and 1514 of FIG. 15.

However, if the delay dial is removed before the 30-second time limit is up, then the signal on lead ON goes back to ground to cause the output of gate 1711 to become "1" this signal via OR gate 1713 causes flip-flop LS1 to be set on the next pulse on lead CPR. The loop status is now flip-flops LS1 and LS2 both set (11).

This state enables the timer 17TD3 which times for 200 milliseconds. After the 200 milliseconds it supplies an output pulse to reset flip-flop LS2. The loop status is now flip-flop LS1 set and LS2 reset (10).

This state in the loop status monitor is described above and in this case the same events will occur. The loop status will go back to state 00, as before, and will monitor the trunk loop for stop dial signals. Should a stop dial occur flip-flop LS2 will be set in the same manner as previously described and outpulsing will be halted.

Wink Start Recognition. With flip-flop IS7 set, relay driver 1719 operates to connect a 130,000-ohm resistor between the X and the Z terminals of timer 17TD1. Now this timer will time for 140 milliseconds. Again the loop status begins at sequence from the state with both of flip-flops LS1 and LS2 reset.

The circuir remains in this statw 00 until the wink signal has begun. The command in the sender instruction store again must be CMD3 (011) and lead CON must be grounded. The wink signal, as in delay dial, is a reverse battery which operates relay SD (or a signal which causes the trunk circuit to place ground on lead EC), causing the lead ON to go to the logic state "1" and the lead OFF to go to logic state "0" (ground). These signal conditions cause the output of gate 1717 to become a "1," which actuates the timer 17TD1 to cause it to time for a minimum wink of 140 milliseconds. If the wink is removed before the 140-millisecond time limit the timer will simply halt its timing and will wait for another reverse battery wink. When a 140 millisecond has elapsed the timer will produce an output pulse which sets flip-flop LS2 via the coincidence gate enabled by the signal on lead IS7-1. The loop status now comprises flip-flop LS1 reset and LS2 set (01).

In this state the timer 17TD2 will again time for a permanent condition of 30 seconds. When the reverse battery wink is removed the relay SD restores and lead ON is grounded. This causes the output of gate 1711 to become a "1," which via OR gate 1713 enables a coincidence gate so that the next pulse on lead CPR sets flip-flop LS1. The loop status now comprises both flip-flops LS1 reset and LS2 set (01).

This state activates the timer 17TD3 which times for 200 milliseconds after which it produces an output pulse to reset flip-flop LS2. The loop status then comprises LS1 set and LS2 reset (10).

This state of the loop status will change the command in the sender instruction store from CMD3 to CMD2 in the same manner as previously described for delay dial operation and thus enables the outpulsing sequence. The output of gate 1714 goes to "1" which causes the next pulse on lead CPR to reset flip-flop LS1 and thus the loop status monitor is back into the idle state, with both of the flip-flops LS1 and LS2 reset (00).

SENDER DIAL PULSE CONTROL.

The sequence flip-flops S1, S2 and S3 of FIG. 16 control the overall sender operation in the dial pulse and multifrequency modes, as summarized in Tables AB and AC, respectively.

In the dial pulse mode, the sender down counts to zero each digit to be outpulsed and sends the corresponding number of dial pulses to the distant office. When the sender is idle the status of the sequence flip-flops is 011.

When the loop status has changed the command in the sender from CMD3 to CMD2, and if a digit is not present in the down counter then the gated pulse amplifier 1601 is actuated to shift the first digit to be outpulsed to the down counting position (flip-flops DS1-4). The output of gate 1611 then becomes a "1" to enable a coincidence gate to reset flip-flop S2 when the next pulse occurs on lead CPR. The sequence is now 001.

With flip-flop S2 reset, the output of gate 1733 becomes a "1" so that the relay driver at its output produces a ground on lead DPST for the dial pulse generator 1702 to thereby actuate it. The pulse generator operates and releases the relay PM at a predetermined make-break (60-40) and at a predetermined pulse rate (10PPS) to thus send the dial pulses to the distant office via its contacts PM.

Ten microseconds after flip-flop S2 has been reset flip-flop S3 is also reset because gate 1645 enables a coincidence gate (note that the signal on lead HRLS is normally open). The sequence flip-flops are now in the states 000.

The sequence remains in this state until relay PM operates. When it does it removes ground from lead PMO via break contacts PM2, which enables a transmission gate to set flip-flop S1 by the next pulse on lead CPR. The sequence is then 100.

Here again the sequence remains until relay PM releases. When relay PM releases the ground is returned to lead PMO and the output of gate 1644 becomes a "1" which enables a coincidence gate. The next pulse on lead CPR sets flip-flop S3. The sequence is then 101.

State 101 in the sequence enables the gated pulse amplifier 1602, so that it passes the next pulse on lead CPR to the coincidence gates of flip-flops DS1-4 of FIG. 12 for the down count logic 1201 to cause the digit contained in these flip-flops to be down counted by 1. Also the same pulse on lead CPR will cause flip-flop S1 to reset via a coincidence gate enabled by the signal on lead S3-1. The sequence is then 001.

The state is now back to where the pulse generator was turned on and the sequence repeats as described until the digit has been down counted to zero. When the zero is present in flip-flops DS1-4, this state is decoded by a gate within the block 1201 to produce a "1" on lead ZC. The output of gate 1645 is a "1" which enables the coincidence gate so that flip-flop S3 is reset on the next pulse on lead CPR. This causes the output of gate 1642 to become a "1" to enable a coincidence gate to set flip-flop S2 on the next pulse on lead CPR. The sequence flip-flops are then in state 010.

A new digit must now be placed into the flip-flops DS1–4 and the interdigital pause timer (600 milliseconds) must be actuated. In doing so, the interdigital pause clock pulse from timer 15TD4 via lead CPID enables the coincidence gate to set flip-flop S3. The sequence flip-flops are then in state 011.

The sequence is now at the idle state and advances again in the same manner as described above.

TABLE AB

DP OUTPULSING SEQUENCE TABLE

| State | S1 | S2 | S3 | Description |
|---|---|---|---|---|
| No. 1 | 0 | 1 | 1 | Idle state of outpulsing sequence flip-flops. When the command in the instruction store goes from No. 3 to No. 2 and if there is a digit present in the down counter (converter) the sequence will begin. |
| No. 2 | 0 | 0 | 1 | Start the pulse generator (DP control). |
| No. 3 | 0 | 0 | 0 | PM relay (mercury wetted relay) starts to operate. |
| No. 4 | 1 | 0 | 0 | PM relay has operated and now begins to release. |
| No. 5 | 1 | 0 | 1 | PM relay has released. At this point in the sequence, one dial pulse has been sent to the distant office. Once clock pulse will now be sent to the down counter and cause it to down count by 1. |
| No. 6 | 0 | 0 | 1 | This state is the same as No. 2 and the sequence will thus go to state No. 3 until the down counter is equal to zero. When the down counter does equal zero the sequence continues instead to state No. 7. |
| No. 7 | 0 | 1 | 0 | Stop DP pulse generator. Another digit will now be shifted into the down counter. The interdigital pause timer will also be activated. |
| No. 8 | 0 | 1 | 1 | The 600 msec interdigital pause has elapsed. The sequence begins again from state No. 1. |

TABLE AC

MF OUTPULSING SEQUENCE TABLE

| State | S1 | S2 | S3 | Description |
|---|---|---|---|---|
| No. 1 | 0 | 1 | 1 | Idle state of outpulsing sequence flip-flop. When the command in the instruction store goes from No. 3 to No. 2 and if there is a digit present in the down counter (converter) the sequence will begin. |
| No. 2 | 0 | 0 | 1 | This will place a ground on the MFST lead which in turn |
| No. 3 | 0 | 0 | 0 | starts the KP timer. One clock pulse CPR after No. 2 occurs the sequence will go to No. 3 which is an intermediate state. The functions started in No. 2 continue during No. 3. The KP timer will time for 100 ms after which the KP relay will operate |

| | | | | |
|---|---|---|---|---|
| | | | | and remain operated for the duration of the call. The KP relay operating will forward a ground to the pulse generator causing it to start. The PM relay (mercury wetted relay) will begin to operate. |
| No. 4 | 1 | 0 | 0 | PM relay has operated. This causes the slave PMF relay to operate. The PM relay will then begin to release. |
| No. 5 | 1 | 0 | 1 | PM relay has released. This causes the slave PMF relay to release. The two tones corresponding to the digit in the down counter (converter) have been sent to the distant office. One clock pulse will now reset the converter. |
| No. 6 | 0 | 0 | 1 | The converter has now been reset. |
| No. 7 | 0 | 1 | 0 | A new digit will now be shifted into the converter. If during No. 7 the sender was empty a 10 msec shifting timer would have fired and caused the sequence to go from No. 7 to No. 9 instead of the normal advance to No. 8. |
| No. 8 | 0 | 0 | 0 | This state is the same as No. 3. As long as a digit can be shifted into the converter the sequence will continue at No. 4. |
| No. 9 | 0 | 1 | 1 | Back to outpulsing sequence idle state. The sender must now be serviced by the CPU. |

Multifrequency mode. The multifrequency mode of sending differs from the dial pulse mode in that the down counting gated pulse amplifier 1602 and the interdigital pause timer are not required. Instead, each digit is decoded from flip-flops DS1–4 into its corresponding MF tones and sent to a distant office in one cycle of the sequence circuit. The block 1701 in FIG. 17 contains the digit decoding circuits and a plurality of relays for applying the tones via transformer T1 to the line LS. Some of the contacts of a relay KP and a relay ST are shown supplying signals to leads used by the other circuits. Also when any of the relays for connecting the tones is operated, ground is supplied to lead HRLS.

The sequence begins from the same state as in the dial pulse mode, with the sequence state flip-flops S1–S3 in state 011.

The sequence begins when the command in the sender instruction store is changed from CMD3 to CMD2 by the loop status monitor circuit. When this happens the next pulse on lead CPR resets flip-flop S2 via the coincidence gate enabled by the output of gate 1611 in the same manner as in the dial pulse mode. The same pulse on leads CPR also sets flip-flop MF2, the output of gate 1611 being supplied via OR gate 1615 to an input of gate 1648. Flip-flop IS9, the multifrequency bit, must be set, flip-flop MF1 must be in the reset state, and the routing count (flip-flops IS11 and 12) must be 0. With these conditions the output of gate 1648 is a "1," enabling a coincidence gate to set flip-flops MF2 in response to the next pulse on lead CPR. The sequence is then in state 001, and the flip-flops MF1 and MF2 are in state 01.

When originally idle the multifrequency supervision circuit was in state 00. When flip-flop MF2 becomes set, a relay driver (not shown) in block 1701 operates to in turn operate a relay to prepare the line control circuit for sending in the multifrequency mode. Also with the multifrequency supervision circuit in a state other than 00, the output of OR gate 1650 places a "1" on lead MF. This condition is also supplied to the multifrequency generator 1701.

With flip-flop S2 of the sequence circuit reset, the pulse generator is again started but in a different way. The output of gate 1732 operates relay driver to place ground on lead MFST.

The sequence follows a pattern which is very similar to that for the dial pulse mode. Referring to the sequence states of the flip-flops S1–S3, the operation is as follows:

State 001. Start the multifrequency pulse generator by grounding lead MFST.

State 000. This state is simply an intermediate state which occurs with the following clock pulse on lead CPR.

State 100. Relay PM has operated. Tones are being applied to the +L and –L lines, via tone relays of the MF generator 1701.

State 101. Relay PM has released. Tones have been removed from the +L and –L lines. The decoding relays of the generator 1701 are still operated. This state enables the reset gated pulse amplifier 1603.

The reset pulse via lead RCP resets to zero the digit in flip-flops DS1-4.

State 001. The flip-flops DS1-4 having been reset, the relays in the generator 1701 begin to release. As long as any of these are operated ground is supplied to lead HRLS to maintain the output of gate 1605 at "0." When the relays are all released the reset gate of the flip-flop S3 is enabled.

State 000. The tone relays of generator 1701 have released.

State 010. This state enables the shift gated pulse amplifier 1601 and the shifting timer 15DT1.

State 000. A new digit has been received before the 10-millisecond timing cycle of the shifting timer has elapsed. This state is the same as the intermediate state and the sequence continues as described above. Flip-flop S2 has been reset via the coincidence gate enabled via gates 1612 and 1614.

State 011. This state indicates that a new digit was not received before the 10-millisecond timeout of the shifting timer 15TD1. A call-for-service (CFS) has been set and the pulse generator turned off because flip-flops S2 and S3 are both set. This time flip-flop S3 was not set by the interdigital timer but instead via a coincidence gate enabled by the output of gate 1617 (tally not 16) and with the pulse on lead CPSH from timer 15TD1.

When the sequence state is 010 one other condition may arise. If the tally in the sender is not 16, the above sequences occur. However, when the tally is 16 the sequence will advance from state 010 in the following manner. When the tally is 16 the shift timer has produced an output pulse on lead CPSH (meaning that the sender is empty). The sequence must advance through one more cycle in order to send the ST tone. The pulse on lead CPSH sets flip-flop MF1 via a coincidence gate enabled by the output of gate 1643. Also there is an inhibit of the normal call-for-service (CFS) set up by the pulse on lead CPSH, because the outputs of gates 1616 and 1617 are "0," so that the output of 1618 remains at "0" via lead G1618 and does not enable coincidence gate 1501. Also the output of gate 1643 becomes a "1" which enables a coincidence gate to reset flip-flop S2. The MF supervision flip-flops MF1 and MF2 go to state 11 and the sequence state flip-flops S1–3 are in state 000.

At state 11 of the MF supervision circuit operations occur in the MF generator 1701 to produce the ST tone. The sequence is normally advanced to state 001. With this sequence state and with relay ST operated to remove ground from the output of gate 1649, a coincidence gate is enabled to reset flip-flop MF2 with the next pulse on lead CPR. The sequence is 001 and the MF supervision circuit is 10.

State 10 in the MF supervision circuit will cause the MF relay in the generator circuit 1701 to release and in turn the KP relay is released. This state again releases the ST relay. The sequence will continue normally to state 010 and when the KP relay has released the signal on lead KPR is at ground to remove the inhibit of gate 1616, whose output enables a coincidence gate to set flip-flop S3 with the next pulse on lead CPR. The sequence is then 011.

State 011 in the sequence causes the output of gate 1647 to go to a "1" to enable a coincidence gate to reset flip-flop MF1 with the next pulse on lead CPR. The MF supervision circuit is now at state 00.

Now the shifting timer 15TD1 which began when flip-flop S2 was set will continue timing for 10 milliseconds at which tim it will produce an output pulse on lead CPSH to set flip-flop IS1 via coincidence gate 1504.

Now this sender must be serviced by the central processing unit. It must either be released or if ANI (automatic number identification) is desired the ANI information must be loaded in. If ANI was desired on this call flip-flop IS8 of the sender instruction store would be set at seizure. When the shifting timer 15TD1 produces an output pulse after the ST tone has been sent, flip-flop NI1 would be set via a coincidence gate enabled by the gate 1646. With the ANI data in the sender and the call-for-service (CFS) reset the sender sequences begin again in the multifrequency mode.

In order to start the sequence a reverse battery must be seen. When flip-flop LS2 of the loop status monitor sets due to the reverse battery along with flip-flops S2, S3 and NI1 command CMD2 in the instruction store, and with a digit in flip-flops DS1-DS4, the output of gate 1613 via OR gate 1614 enables a coincidence gate to reset flip-flop S2 with the next pulse on lead CPR. The output of gate 1613 via OR gate 1615 also provides a "1" signal to an input of gate 1648 to set flip-flop MF2 in the same manner as described above. The sequence is now 001, and the MF supervision circuit is now 01.

The sequence continues in the multifrequency mode as described above.

When ANI sending is in progress flip-flop NI1 is set. With flip-flop LS1 in the reset state, the output of gate 1619 is a "1" which inhibits gate 1620. The signal on lead MF is a "1." When the reverse battery is initially detected for ANI operation, flip-flop LS2 is set so that this input of gate 1620 also becomes a "1." When the reverse battery is removed, flip-flop LS1 is set in a normal manner as explained above which causes the output of gate 1619 to become "0." Therefore, the output of gate 1620 on lead ANIC becomes "1." This signal enables coincidence gates 1505 and 1506 in FIG. 15, and the lower reset coincidence gate for flip-flop LS2 in FIG. 17. When the next clock pulse on lead CPR sets flip-flops IS1 and IS2, this places the time-out command (E) (1110) into the sender instruction store because the previous command was a 2 (0010). The same pulse on lead CPR also resets flip-flop LS2 to cause the signal on lead ANIC at the output of gate 1620 to return to "0." Now the central processing unit must service this timed-out sender.

PROGRAMMING FOR REGISTER-SENDER-ANI CONTROL

Figure 18:
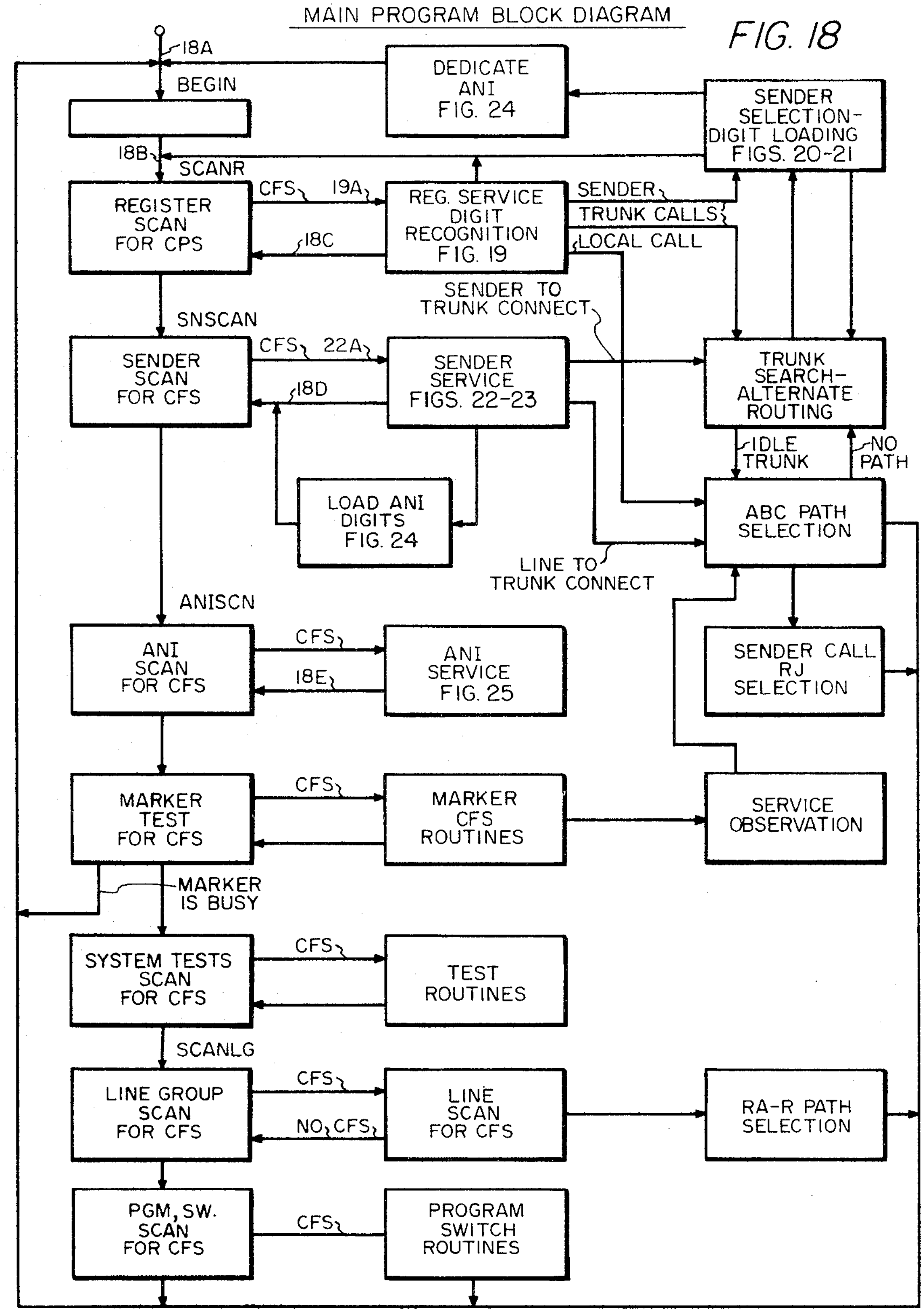
FIGS. 18–25 are flow charts ofsome of the programs for the central processor.

A main program block diagram is shown in FIG. 18, and detailed programs for some of the register, sender and ANI control are shown in FIGS. 19–25.

An executive cycle comprises the call-for-service routines shown on the left-hand side of FIG. 18. There is a BEGIN block at the start of the program followed by the register scan for call-for-service routine SCANR, the sender scan for call-for-service routines SNSCAN, the ANI scan for call-for-service routines ANISCN, a marker test for call-for-service, some system test scans for call-for-service, line group scan for call-for-service routines SCANLG, program switch scan for call-for-service routines, and then returning to BEGIN. As long as no call-for-service condition exists and the marker is idle, the executive cycle continues to cycle through these call-for-service routines as indicated. After the marker test for call-for-service, if the marker is busy the cycle returns to the beginning, since the remaining routines of the executive cycle require the use of the marker to service any call-for-service. Whenever a call-for-service is detected during the executive cycle, the program branches to other routines as shown in FIG. 18 to take appropriate action, after such action is taken the program may either return to the beginning of the executive cycle or continue the scan of units as indicated by the flow lines in FIG. 18.

To illustrate the register, sender and ANI control programs, and the use of the temporary memory stores, a local originating, outgoing call will be described. This call description will make use of the flow charts of FIGS. 18–25, and lists 1, 2 and 3 found at the end of this description to show the use of the temporary memory stores, by noting all of the principal store instructions in the programs. The columns headed REF are arbitrary designations for convenience in referring to the lines and for coordinating the three lists, and may be shown in the description in parentheses without specific mention of the lists. List 1 shows the use of the storage registers SA, SB, SC and SD; List 2 shows the use of the register, sender and ANI stores and List 3 shows the use of the marker stores. Hyphens are used for the contents of some stores to indicate unequipped digit positions, always read as 0.

Assume that the call originates at a local line having the equipment number C231, that this is a two-party line, and that the call originates from party 2 having directory number 342-5934. A prefix digit "1" is used in the dialed number to designate a station-to-station toll call. it is assumed that the complete dialed number is 1-8θ2-462-7321. Note that the $\theta$ represents a dialed digit zero.

The line scanning arrangement is described in said Duthie et al. System patent (U.S. Pat. No. 3,487,173). Each line and trunk, as well as each junctor has an individual address in the data block of memory with the first two bits used for indicating the status thereof, and the remaining portion of the word being used for class-of-service information. The status information is derived from relay contacts in the designated circuits. Assuming that the third and fourth bits of the first digit are zeros, the code for the status of lines and trunks derived from the first two bits is idle (10) decoded as 8, call-for-service (CFS) (11) decoded as C, busy (00) decoded as 0, and lock-out (01) decoded as 4. For junctors the busy condition is indicated by zeros for the first two bits, and the idle condition for originating junctors and register junctors is indicated by (10) decoded as 8, while for terminating junctors the idle condition is indicated by (01) decoded as 4. The junctor addressing scheme has been revised from that described in the Duthie et al. System patent, so that the originating and terminating junctor pair which may be used in a connection will have addresses in which the last two digits are identical, the first two digits indicating the hundreds group of the associated A stage for originating junctors and the associated C stage for terminating junctors.

The List 1 has the first line with the reference A00 with the call-for-service address being that of the calling line C231. The columns under the heading "Core Memory" have an address column ADR and an instruction column INST for the contents of that address. The contents of address C231, even though not a program instruction are indicated in column INST for convenience. The first digit C indicates that the line is calling for service, and the fourth and fifth digit having value of 10 indicate a two-party subscriber line.

Note that in program instructions the initial digit "2" is the STORE operation code, and that the other four digits are the address at which the data is stored. For storing in registers the address is first placed in store SB, and the indirect address command for STORE RG is 2002θ; and in like manner to store data in a sender or ANI unit the address is placed in store SC, and the indirect address command STORE SN is 2001θ.

The line scanning arrangement also uses a group status arrangement for each hundred lines using a special address in which the first two digits designate the hundreds group and the last two digits are Cθ. The status detecting arrangement is shown in FIG. 13 of said "Dial Pulse Incoming Trunk and Register Arrangement" application by Panter et al.

The executive cycle scans the line groups for call-for-service when it reaches the routine labelled SCANLG (A01). Initial conditions for the marker are shown in list 3, at reference line A00. In store MA the first digit 8 indicates that the marker is idle, and the remaining information in this store and the other marker stores may be residual information from the last call serviced.

The routine SCANLG loads the information from store MA, masks it with the literal OFF00 to select the hundreds group digits and stores it at SB. It then superimposes the group address Cθ for the last two digits, adds one hundred to increment to the next group and places this in store SA. It then makes a test that this is a valid group address, and makes a test for call-for-service. If there is no call-for-service, the program checks whether this is the last line group, in which case the program-switch protion of the executive cycle is entered; otherwise the program loops to increment by a hundred to the next group address and repeats the test. When a call-for-service is found the program branches to a line scan for a call-for-service as shown in FIG. 18.

For the call being described the initial group address derived from store MA is C1, and is placed in store SB (A02). The address is then incremented by one hundred and the group address digits are superimposed so that the group address OC2Cθ is placed in store SA (A03). A call-for-service is found at this address so that the program branches to the routine at the label LINE (A10).

The address in the first line of the group is derived by loading the number from store SA, masking and superimposing to obtain the line address 0C211 which, with an 8 superimposed as the first digit, is stored in marker store MA (A11), and also in SC (A12). The line is then tested for a call-for-serivce by transferring the contents of this address into the accumulator register AB and testing for a C as the first digit. With no call-for-service a one is added to the line number and the routine loops to test the next line. During each loop the number in SC is incremented to the line being tested. When this number reaches the value 8C231, a call-for-service is detected.

When a line call for service is detected, several tests are performed to determine the type of line. There is also a test to determine if it is a dummy line address having the last two digits B1 which indicates all lines in that group have been scanned and the routine branches back to the register scan. The dummy line routine is indicated in List 1 by the label DUMYLN (A14). This routine ensures against the processor getting into a long scan if a line call-for-service cannot be found.

After the test for a dummy line and the class-of-service tests which are not of interest for this call, th routine branches to a register connected test labelled RGCTST (A20). This routine selects the first register equipment number and stores it in store SA so it can be referred to for incrementing. At this point a check is performed to filter out the last equipment number register which is C062. When the routine has incremented past this register number all registers have been tested and no connected condition has arisen. This is a check to prevent a failure from connecting more than one register to a call. After this test the routine branches to the label CLASS (A23) where several class-of-service tests are not of interest on this call are made.

The program next makes a register type selection. It is possible to have different types of registers, and in the routine with the label RGTYPE (A24) the different classes of calls are routed to the corresponding register type through the register selection tables. The calling line equipment number is first selected from store SC and stored in store SC (A25). This is necessary so that the line equipment number will be preserved when the route table address is stored in SC at the trunk table selection routine. Since this is a dial pulse call the routine at the label DPRG (A26) selects the contents of a data address 0169 which have the label DPTBL (numeric value 01031). At the routine of the trunk hunting section of the program at the label GRPSIZ the address DPTBL (0169) is stored in store SC (A30). This routine resets the marker stores MC and MD to zero (A31–A32) The routine then selects the contents from address DPTBL.

A register hunt routine takes the register table position determined by the trunk table selection routine as a reference starting point. An idle register is searched for, and until an idle one is found all registers are examined for an idle condition. During this routine the calling line number is taken from store SB and placed back in store SC (A39), so that store SB can be used for a register number.

After an idle register has been found and some tests performed during which the idle register's equipment number 0C041 is first placed in store SB (A42) the line number is stored in the register equipment number store as shown in List 2 (A43). Then the register's directory number store address C011 is placed in store SB (A44).

Note that although there is no subroutine structure in the processor, the program does in fact use the trunk table routine in a manner very similar to a subroutine for random start. DPTBL is a table similar to the trunk routing table and is necessary for the use of the common routine to provide a random start to ensure distribution of traffic.

An idle register junctor selection is made, starting with the routine labelled ENTRRJ (A45). The main purpose of this routine is to perform a random search for an idle register junctor. A random number is derived, the contents of a table RJTBL are superimposed thereon, and the contents of the resulting address are transferred into the accumulator. The resulting contents are placed in marker stores MC and MB (A46 and A47) which it is assumed in this case is junctor B2. Store MC acts as a reference starting point. In order to derive the register junctor equipment number, the calling line number is loaded and the group number is derived by masking and then superimposed on the contents of store MB. This junctor is then tested for idle. If it is not idle the program loops to examine the other register junctors in turn. In this case it is assumed that it is idle and the program branches to the routine TSTLN at address 0678. After making some tests and counting the register selection at routine PEGCON, the program branches to the routine SELCMD (A51) to select the correct register command for the associated type of line or trunk before loading the marker.

After checking for several classes of service, the routine branches to the label CMD1DT (A60) to provide the command to supply dial tone and call-for-service after one digit. This is the command 50000 which is selected and stored at the register's directory number address C011 (A61). sender-connect some more tests of the calling line class, the idle register number is stored in marker store MC along with an 8 as the first digit, (A62), and marker MD is reset to zero (A63). Since the idle link number is already in store MB, the program places the calling line number in marker store MA (A64). The first digit placed in store MA is a 0, which activates the marker to establish the connection.

REGISTER CALL-FOR-SERVICE ROUTINES

After the digit "1" has been dialed, the register calls for service by setting the first bit of its directory number store at address C011, which superimposed on the command "5" becomes a "D." Therefore the complete data at address C011 is D0001, the dialed digit being in the last position (B00).

Figure 19:
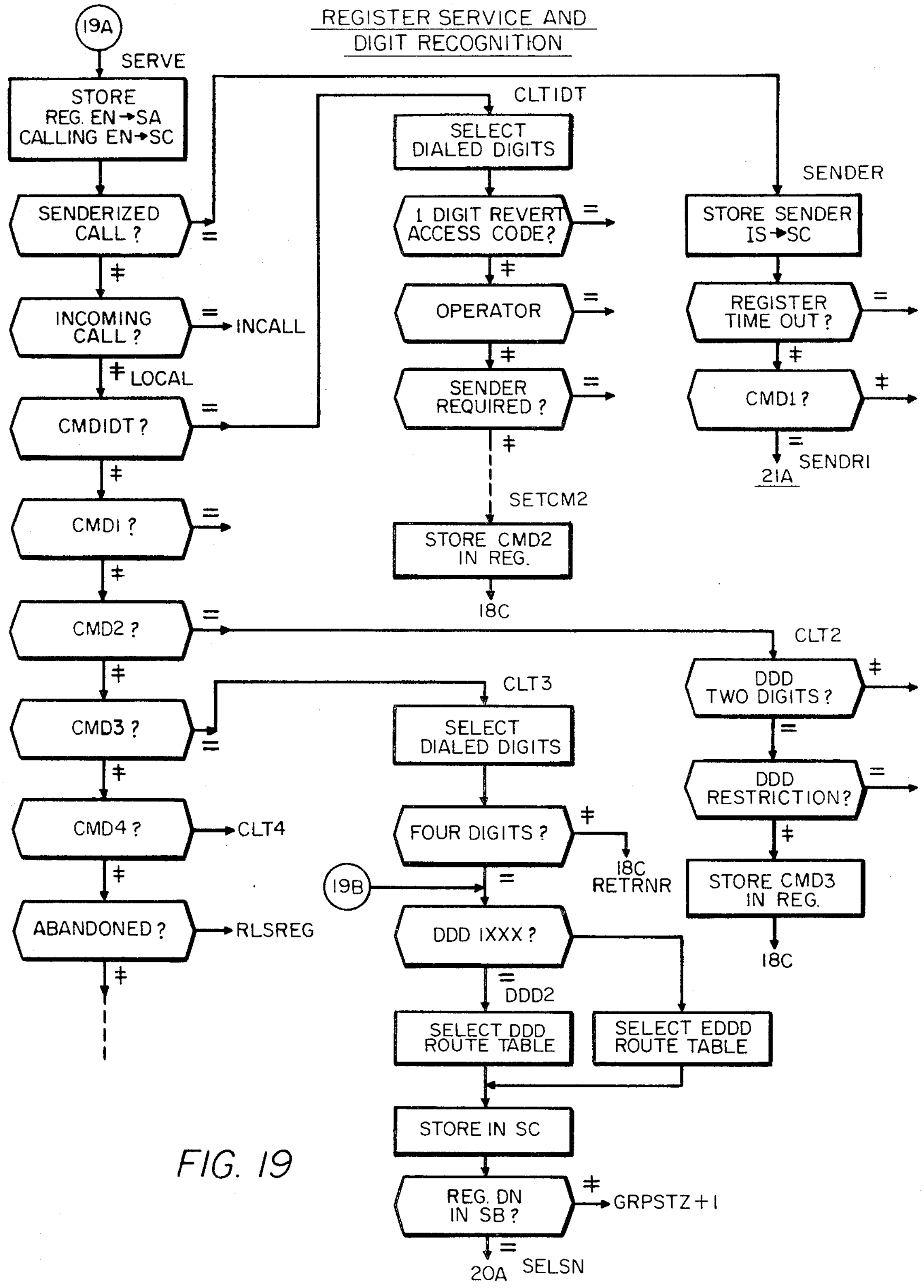

The executive cycle scans for register calls for service with the routine starting with SCANR (B01). It stores the first register address 0C011 in store SB (B02) and then transfers the contents thereof to test for a call for service. If there were no call for service the routine would add 1 and loop to scan the other registers. However in this case there is a call-for-service at address CO11 so the routine branches to SERVE (B03). The flow chart is shown in FIG. 19. The contents of store SA (B04) are reset to zero (except for bit 1 for a possible priority condition). After making some tests, the register equipment number address is derived from the directory number address from store SB, and the result is placed in store SA (B07). The contents of this address, which is the calling line number, is then transferred into the accumulator and then stored in store SC (B08). A test is then made for a "E" in the second position to determine whether this is a senderized call. A test is made for an incoming call and then the contents from the directory number store are loaded and tested for the command CMD1DT, which after masking out the call-for-service bit is the digit 5 in the first position. Upon finding this command the routine branches to CLT1DT.

In the routine CLT1DT as shown in the flow chart the dialed digits are selected and then various tests are made such as one digit revertive access code, operator call, sender required, and several others, and the program eventually reaches the routine SETCM2 (B10). Here the command 2 is selected and is stored in the directory number store along with the dialed digit 1 replaced (B11). The routine then returns to scanning registers at address 0319.

CLT2

When the digits 18 have been dialed the register calls for service, this time as shown at reference C00 with the call for service superimposed on the command 2 resulting in *θ*, so that the contents at address C011 and ***θ*0018. The routine proceeds as before as shown in FIG. 19 until a test is made for CMD2, at which time the program branches to the routine CLT2 at address B9B1. In this routine a check is made for a two-digit number beginning with 1. A check is also made to make sure that the two-digit number is not 11. This confirms a DDD call in progress and the program branches to test for DDD restriction. It then places the command 3 in the register's directory number store along with the digits 18 (C21**).

CLT3

When the digits **18*θ* have been dialed the register calls for service, and the routine proceeds as shown on the left hand side of FIG. 19 until a test is made for CMD3, where the program branches to the routine CLT3 (D20). Here the dialed digits are selected and a test is made as to whether there are four digits. Since there are only three the program branches to a routine RETRNR (D21) at which the register call-for-service is reset and (D22) the information stored back into the register directory number store with the command 3 and the dialed digits (3018*θ*). The program then branches back to scan the registers at address 0319.**

When the digits **18*θ*2 have been dialed the register calls for service (E00), and the routine again proceeds as shown on the left hand side of FIG. 19 to the test for CMD3, where the program again branches to the routine CLT3 (E20). This time when the dialed digits are selected and the test is made for four digits, equality is found. A check is made at this time to determine whether this is a DDD or EDDD call by checking for a 1** or *θ* as the first digit. When it is determined that this is a DDD call the appropriate route table is selected and stored in store SC. This is shown in List 1 at reference E22, by the mnemonic DDDRT (numeric value 0111). The program then checks whether there is a register directory number stored in store SB, and upon finding equality branches to routine SELSN (E30) to select and dedicate a sender.

SENDER SELECTION AND DEDICATION

Figure 20:
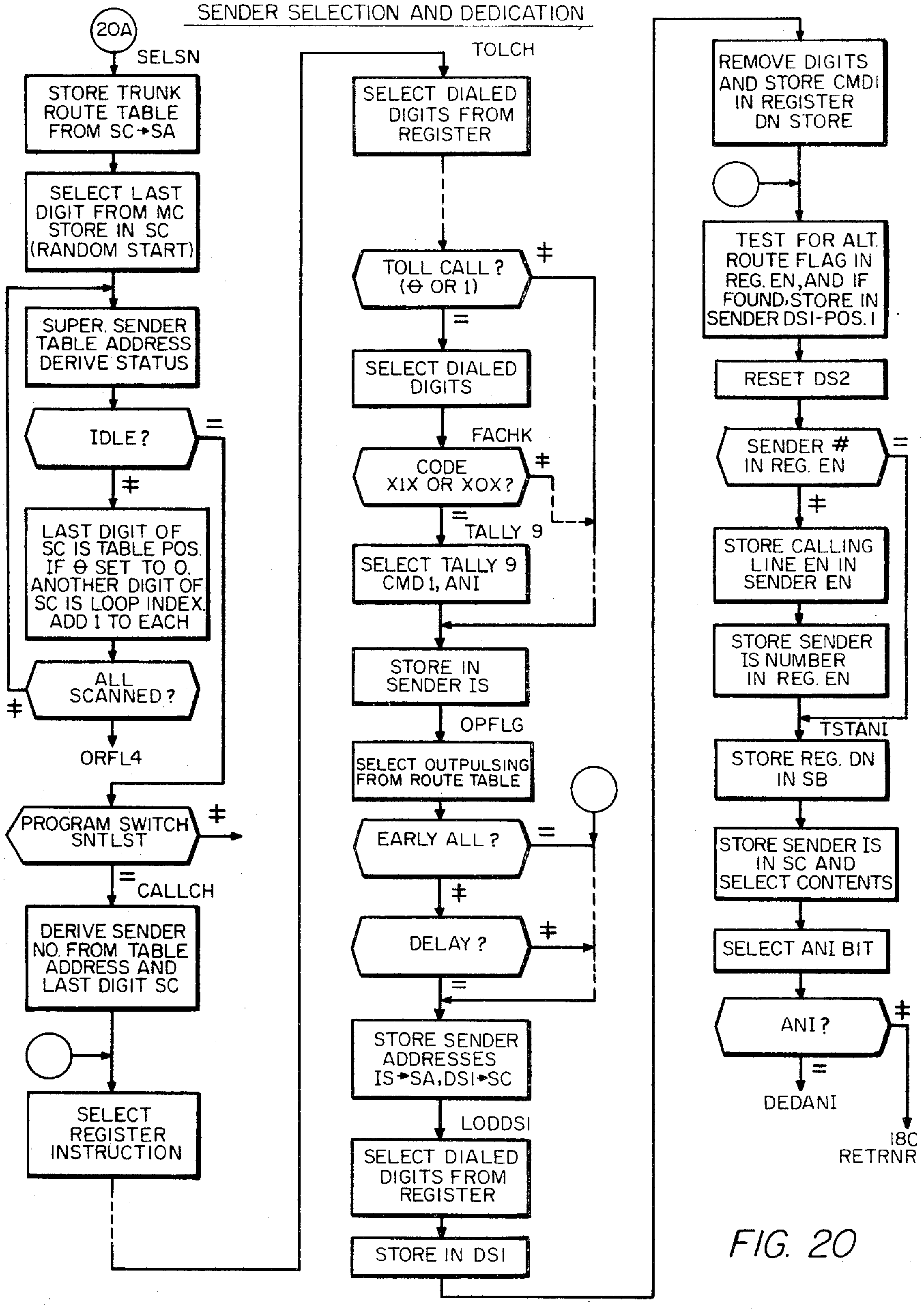

The purpose of the sender selection and dedication is first to select an idle sender from a table using a random selection, and then to determine from the dialed digits in the register the information that is required for the sender. The flow chart is shown in FIG. 20.

When the idle sender is found the routine branches to the routine RSNR (Reserve sender). The program at this point makes a test having to do with a program switch for test calls and then branches to routine CALLCH (call check).

At reference E35, the sender instruction store address is placed in store SC. In this case it is assumed that the first sender is selected so this address is C071. The contents of the register directory number store, whose address C011 is in store SB, is selected and the contents examined. If there is a command 4 in the register the routine branches to a routine ONEDIG which relates to an in dialing PABX call. Since this is not applicable, in this call the routine proceeds to routine TOLCH (toll check). Here the dialed digits from the register are selected and tested for several conditions relating to different types of calls. Since these conditions are not of interest for this call they are indicated by a dashed line in the flow chart down to the test for a toll call as indicated by a *θ* or 1 as the first digit. Hence a 1 is found and the program again selects the dialed digits at the routine FACHK (foreign area check).

A test is made whether the middle digit of the three-digit code following the initial digit is a 1 or *θ* which indicates a foreign area code. In this case an equality is found on the check for a 1 and the program branches to the routine TALLY9. Here the command 11009 is selected which indicates command 1 with AN1 and TALLY9 as the sender instruction. The program then branches to an address (E39), where this instruction is placed in the sender IS store.

The tally has several functions. In conjunction with the command it is used to determine the stage outpulsing of the sender, whether all digits have been loaded into the sender, whether more digits are located in the register, etc. In addition to these there are a number of hardware functions that use a specific tally, such as tally 16. These include such things as operator or home area timeout, change to AN1 sending mode, etc.

The next routine is OPFLG (E40), where the route table is selected from the address in store SA and the type of outpulsing (early or delay) is determined. The determination here is that this is a delay call. The sender IS store address is taken from store SC and is placed in store SA (E41). One is added to this and the sender digits store 1 address C072 is placed in store SC (E42). The program then proceeds to routine L0DDS1, to place the first four dialed digits from the register into the sender digits store.

The dialed digits are transferred from the register directory number store and are placed in the sender digit store DS1 whose address is C072 (E44). These digits are 18θ2, which are placed into the positions 2–5 off the digit store. Next a number 10000 is selected and placed in the register directory number store address C011 (E45). This provides the register with the command CMD1 and erases the dialed digits. The register directory number address is placed in store SB (E46) so that the program can check for an alternate route flag. If the register contains an alternate route flag this flag must be placed in the sender store DS1 to be preserved. This flag indicates that the call attempted to switch through without a sender but because the prime route was busy and required an alternate route a sender became necessary. However this condition is not present in this call.

The next routine is RSTDS2 (reset DS2) in which the address of store DS2 is placed in store SC (E48), and then all zeros are placed in store DS2 (E49). Next the address of the sender equipment number store C074 is placed in store SC (E50), and the calling line number is loaded from the register equipment number store and placed in the sender equipment number store (E51). This line number is 1C231.

The sender instruction store address is loaded from store SA and this is stored into the register equipment number store. It is loaded with the digit C superimposed with 2 to change it to an E so that the register may identify this as a senderized call. Thus the value 0E071 is placed into the store at address C041 (E52).

Next at the routine TSTANI (test ANI), the program tests for an ANI bit set in the sender at this point. In this case the ANI bit is set so the program branches to select and dedicate an ANI store, thus initiating the search for the directory number associated with the equipment number in the sender equipment number store.

ANI CONTROL PROGRAM

Figure 24:
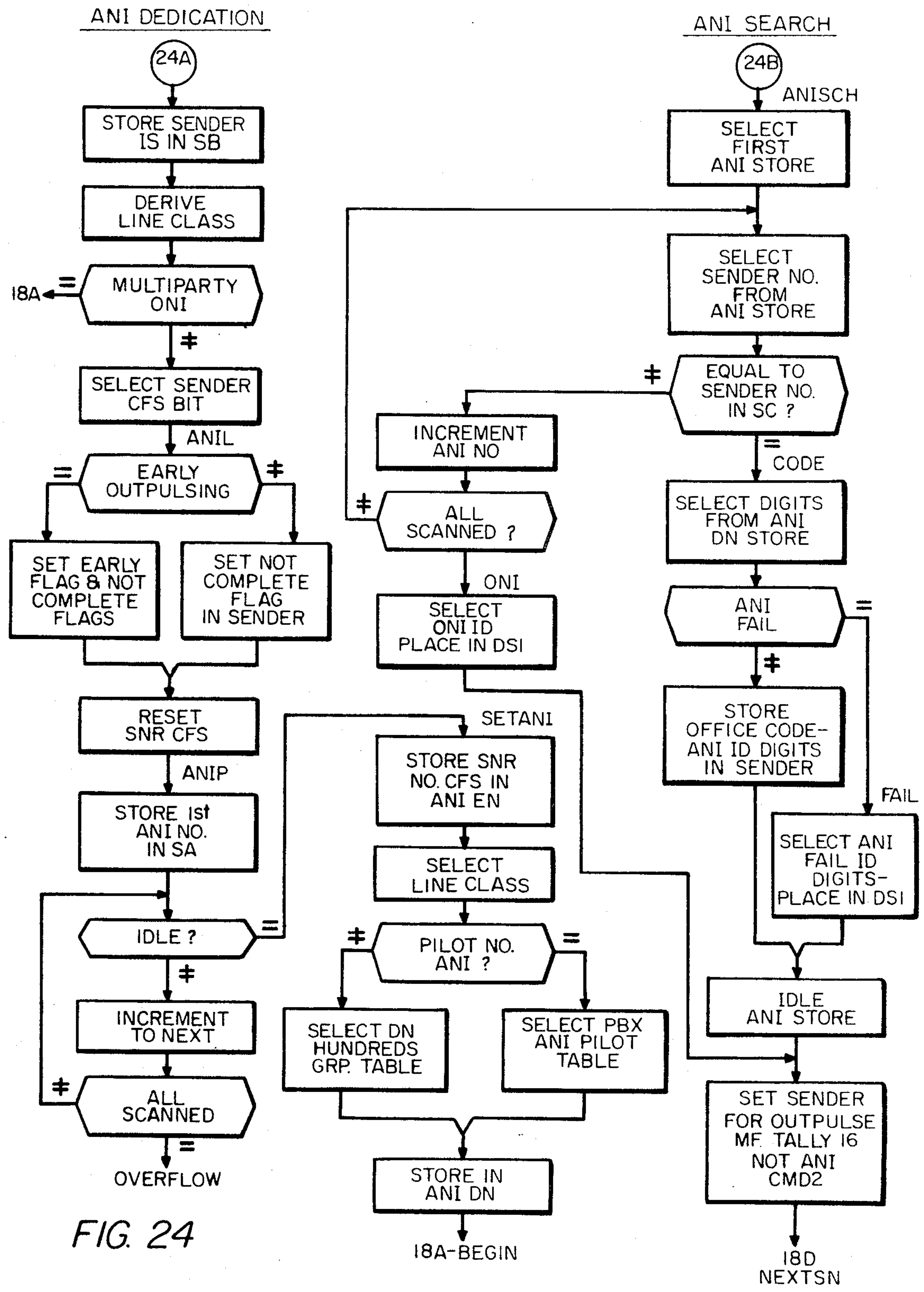
Figure 25:
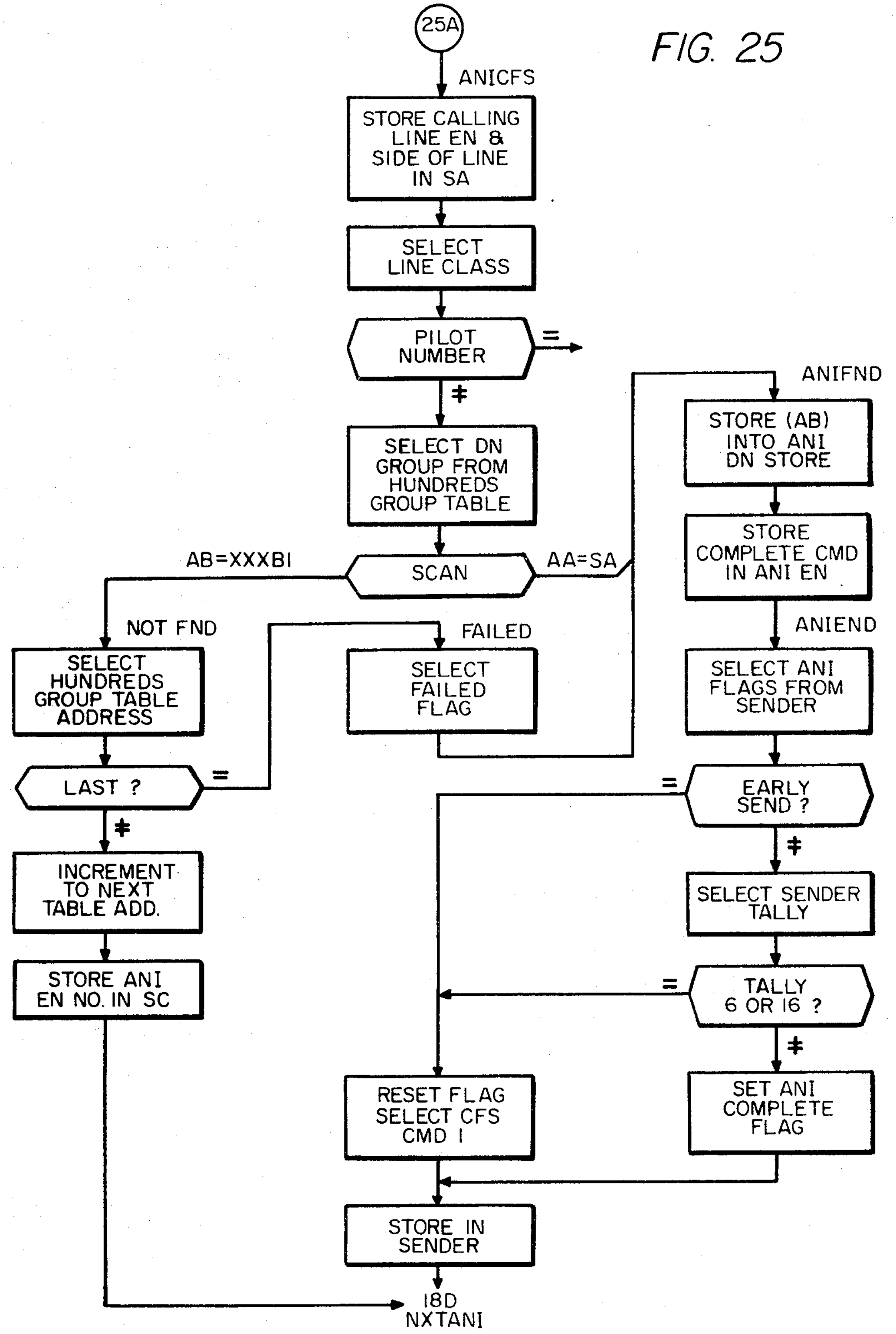

The flow charts for ANI control are shown in FIGS. 24 and 25. This part of the program consists of a set of routines to dedicate an idle ANI store to a toll call for ANI detection, to provide ANI detection for one and two-party lines, to provide ANI detection to a pilot number for PBX or PABX lines, and to load the ANI information into a sender at the appropriate time for outpulsing to the toll center in the CAMA (centralized automatic message accounting) format. The program features (1) ONI (operator number identification) will be provided to multiparty lines by outpulsing the appropriate CAMA identification digit, (2) ANI fail conditions will be provided by outpulsing the appropriate CAMA identification digit, (3) digit outpulsing will be inhibited until the ANI scanning function has been completed, (4) ANI may be provided to PBX night numbers or separate PBX trunks by class marking, and (5) ANI will be achieved by using a table for determining the directory number hundreds group equipped in the office and scanning through the various hundreds groups for calling line identification. A similar procedure is followed for pilot number ANI using a table to associate a PBX table to a directory number. The PBX trunk table may be scanned for the calling line number and the directory number derived. The program routines for all of these features are not shown in FIGS. 24 and 25, but the points for branching to them are shown.

ANI DEDICATION

The flow chart for ANI dedication is shown on the left hand side of FIG. 24. Entry to this routine has been noted above following the selection of a sender for te toll call. As shown in List 1, at reference E61, the address of the sender instruction store is placed in store SB. The address in the accumulator is then incremented by three to derive the address of the sender equipment number store, the contents of this store are transfered to obtain the calling line number and the contents are then transferred again to obtain the class-of-service of the calling line. A test is then made as to whether this is an ONI multiparty line, and if so the program branches to return to the executive cycle without assigning an ANI store to the call. The branch is to the routine BEGIN at the start of the executive cycle.

The routine ANIL (E62) provides for the setting of two flags in the sender instruction store. One flag will identify early outpulsing calls on which outpulsing may commence as soon as the ANI function has completed during the ANI call-for-service routine. The other flag will indicate that the ANi function has not yet completed. This is necessary for delayed outpulsing calls (namely a call in which everything is sent multifrequency) so that when all digits have been received this flag is present to indicate whether the ANI function is complete and outpulsing may begin. This routine first loads the instruction store address for the sender from store SC and transfers the contents which is 11009, masks it with 80000 to test the first bit of the first position to determine if it is an early outpulsing call, which in this call is a non-equality. Therefore the contents of the instruction store are again derived and superimposed with 00040 to set the flag in the sender for ANI not complete, and then masked with 7FFFF to reset the sender call-for-service, and the result is placed back in the sender instruction store (E63). This result is 11049.

Starting with the routine ANILP, the ANI stores are scanned beginning with the first for an idle store to be assigned to the call until an idle store is found or it is determined that there is an overflow condition. The first ANI store number 00061 is loaded (E64), the contents are derived, masked with C0000, and compared to 40000 to est the status for idle. If it were not idle the store number which (E65) has been placed in store SA is incremented and the program branches to repeat the idle test. In this case it is assumed that the first unit is idle and the program branches to SETANI.

The routine SETANI provides for loading the ANI stores with the correct information for initiating the ANI function. The sender number and the ANI call-for-service condition will be placed into the ANI equipment number store and the starting directory hundreds group table address into the ANI directory number store. If pilot number identification is rquired the ANI pilot number table address would be placed into the ANI directory number store. The routine starts by loading the ANI equipment number store address from store SA and (E67) storing it into store SC. Note that the ANI equipment number store is identified as store SS with an address 0061 and the directory number store is identified as store NS with address 0071. Next the sender instruction store address is loaded from store SB, superimposed with 80000 to provide a call-for-service indication, and placed into the ANI equipment number store SS as 8C071, (E68). Next the contents of store SC are loaded, incremented by 10 and stored back to provide the ANI directory number store NS address.

Next the calling line number is again derived and its contents transferred and masked to test for pilot number ANI required. In this case this test is a not equal, so that the program proceeds to select the directory number hundreds group table which has the mnemonic identification DNTABLE (numerical value 0174) and this is placed into the ANI directory number store NS (E70). The program then branches to BEGIN at the start of the executive cycle.

ASSOCIATION OF REGISTER, SENDER AND ANI STORES

Note from List 2 that the instruction store address of the sender is now in the register equipment number store as 0E071, and in the ANI equipment number store SS as 8C071. The sender equipment number store contains the calling line number 1C231. Thus the register and the ANI store each have the sender number identity directly available, and the program may locate the associated register or ANI store by scanning for its own instruction store number of a sender it is servicing. This arrangement provides for efficient use of the registers in these units.

ANI CALL FOR SERVICE

The data in the register, sender and ANI stores is shown in List 2 at reference F00. In the ANI store SS the first digit is an 8 to indicate the call for service condition. This call for service is detected during the executive cycle in the routine ANISCN (F01). This instruction loads the first ANI address 00061, which is then stored in store SC (F02). The routine transfer the contents of this address, masks it with a C0000, and compares it to an 80000 to test for the call for service. If this test were to yield an inequality, the routine would add 1 to the address, make various tests as to whether it were the last ANI address and whether it is a legitimate number and loop to repeat the call for service test. After the last ANI store has been tested without finding a call for service the routine proceeds in the executive cycle as shown in FIG. 18. However in this case a call for service is found at the address 0061, so the routine branches to the program ANICFS, shown in FIG. 25.

The next instruction (F03) is to load SC, which places the address 00061 in the accumulator. The next instruction is to transfer which places the contents of store SS which is 8C071 into the accumulator, and the following instructions increment this address by 3 to give the address C074. The contents of this address are then transferred placing the number from store EN which is 1C231 into the accumulator. This is the calling line number which is next stored in store SA (F04). There is then another transfer instruction to obtain the class of service information for the calling line, which is masked with 00417 and compared to 00400 to test for pilot line number. In this case there is an inequality so the next instruction is to load SC and add 10 which provides the address 00071 of the ANI store NS. This is stored in store SC (F05). The contents of that address are then transferred into the accumulator and masked with OFFFF.

The calling line number and side of line indication have now been stored in store SA, and the first hundreds group number has been placed into the accumulator AB. The next instruction is now SCAN, which is shown in List 1 at reference F07 as 90000. The operation of this special operation code has been explained above with reference to FIG. 2. It is assumed in this case that the jumper 250 is provided so th at only 100 directory numbers are scanned. Assume that the hundreds group number loaded into the accumulator AB has the initial value 1111. After 100 numbers are scanned the value has advanced to **11*00*, and then the next value is 11B1. In response to this value the SCAN operation code apparatus as shown in FIG. 2 causes the program to branch to the routine NOTFND as shown in FIG. 25.**

The address 00071 is loaded from store SC and the con-tents which is the directory number table are transferred. A test is then made as to whether this is the last hundreds group. If it were the program would branch to the routine FAILED to select a failed flag and proceed to the routine ANIFND. However in this case it is not the last group so the table value is incremented by 1 and is placed back into the store NS (F09). The address from store SC is then loaded and masked with 0006F to change it back to the address of store SS, and this is stored into store SC (F10). The program then branches to the routine NXTANI in the executive cycle to scan the other ANI units for calls for service.

It is possible during the executive cycle for several call for service conditions to occur and various branch routines executed. However assume in this case that at the time the executive cycle again reaches the scanning of the ANI units and detects this call for service the conditions are not shown at reference G00 in List 2. The operratio proceeds through the routines exactly as in the previously call for service, except that this time the hundreds group number loaded into the accumulator AB will have the value 01211. Assume that during the SCAN operation when the value in the accumulator has reached 01234 that the condition AA=SA occurs at the program branches to the routine ANIFND. The instruction at this address is STORE SN, which places the directory number information from the accumulator into the ANI store NS as shown in List 2. The address from store SC is then loaded, changed to the address of the store SS and stored into SC (G21). The contents of store SS are then transferred, superimposed with C0000 and placed back into the store SS (G22). This is the ANI complete flag in digit position 1.

The program then proceeds to the routine ANIEND. This routine starts with the series of instructions LOAD SC, STORE SB, TRANS, STORE SC, TRANS, STORE SA; whichesults with the address 00061 of store SS in store SB (G24), the address CC071 of store NS in store SC (G25), and the information including the flags from the sender instruction store into store SA (G26).

The instruction information is then masked with 00080 and compared to all zeros to test for an early send flag. Since this is an inequality, the instructions are again loaded and masked with 0000F and compared to 00006 to test whether the tally is equal to six or 16.. This in effect tests whether all of the digits have been dialed. Since this again is an inequality, the instructions are loaded and masked with FFF1F which resets the ANI flag to indicate ANI comlete. This information is placed back into store IS with the value 11009 (G27). The ANI address 00061 is then loaded and stored back into store SC (G28). The program then branches to NXTANI to resume the executive cycle, scanning the other ANI units for call for service conditions.

SENDER DIGIT LOADING

This section of the program performs all the sender digit loading on register calls for service. Each time a digit is loaded the tally is incremented by 1. After the sender is filled the remaining digits remain in the register and a tally 6 flag condition is set in the sender. This condition later indicates on a sender emply call for service, that more digits are to be loaded into the sender from the register.

Recall that the digits 18Ø2 have been dialed and loaded into the sender store DS1. After the next digit which is a 4 has been dialed the register again calls for service with the conditions as shown in list 2 at reference H00. In the directory number store there is the call for service superimposed on the command 1 in position 1, and in the last position there is the dialed digit 4, so that the contents of store DN are 90004. In store EN the contents are 0E071 identifying the associated sender and indicating that this is a senderized call. The program proceeds as in previous register call for service, starting with SCANR in the executive cycle detecting the call for service and branching to the routine SERVE, shown in FIG. 19, and proceeding until there is a test for a senderized call. This test finds that there is an E in position 2 of store EN, and therefore branches to the routine SENDER (H20).

The beginning of this routine loads the contents of store SC, masks it with OCOFF and places it back into store SC (H21), which has the effect of changing the E to a C for the sender instruction store address. The routine then makes a test for a register time out, followed by a test for command CMD1. Upon finding thiss command the program branches to the routine SENDRI, shown n FIG. 21.

SENDRI (SENDER 1) - FIG. 21

On all senderized calls when the register calls for service for the digit to be loaded the program branches to this routine. On entering this routine the sender instruction store contents are selected and tested for a time out with tally 16. This condition would indicate that the call in progress is either a foreign area time out call or an EDDD call and thus the program would branch accordingly. However in this case this condition is not present and there is next a test for tally 16 which would indicate an error condition (too many digits dialed so call is released). Providing the tally is not 16 as in this case the program increments the tally by selecting the contents of the instruction store adding 1 an;d replacing thee result in the instruction store IS (H31). Next the dialed digits are selected by loading the contents of the register store DN, masking with OFFFF, and placing the result in store SA (H32). A test is then made for more than one digit by masking with OFFFO and comparing to all zeros. The result is inequality so the program branches to the routine DEDICT. At this point the contents of store DS2 of the sender are selected and tested for positions 4 and 5 empty. If positions 4 and 5 are not empty the store DS2 is considered full and no more digits can be loaded at this point, so the program would branch to FORDG for further processing.

The reason why position 5 for store DS2 must be left empty is so that when performing a shift right during the sender to trunk connection a digit will not be lost. Providing positions 4 and 5 are empty the program proceeds to load the digits from store SA into store DS2 at the routine CMDTST.

Before placing the digits into the store DS2 the sender shift must be disabled. In order to disable the sender shift the sender call for service must be set if not already set, but in order that the command can be later restored in the sender a flag must be set in store SB.

First the program tests for a sender empty command in which case the call for service in the sender will be reset after the digit is loaded and thus the call for service flag is reset. When the call for service is to be set after the digit is loaded the call for service flag is set in store SB.

When the sender call for service flag is to be left set after the digit is loaded the program branches to the routine FLAG and sets a flag in store SB to indicate this fact.

However when the sender call for service is to be reset after the digit is loaded the program will branch to the routine RSET and reset the flag in store SB.

In this case the two tests both yield inequalities, so at routine RSET the store SB is loaded and masked with OOOFF and placed back into store SB (H36). Then the contents of the sender instruction store IS are loaded and superimposed with 80000 to set the call for service bit, and the result stored back into the instruction store (H37).

The next routine is LEFT. In order to pack the digits in the store DS2 tigthly the program must detect the number of digits already therein. If there are no digits in the store DS2 the digit from store SA is placed in the left most position of store DS2. If there is one digit in store DS2 the digit from SA is placed in position 3, and if there are two digits already there the digit is placed in position 4. After position 4 is filled no more digits can be loaded into store DS2 until some outpulsing occurs.

The contents of store DS2 are loaded and tested for empty by comparison to all zeros. At this time the test produces an equality so the routine branches to EMPTY. The digits in store SA are shifted left three times by using the LOAD SALF instruction followed by the STORE SA instruction three times.

The next routine is LODSNR, in which the contents of store DS2 are loaded, the contents of store SA superimposed thereon and the result placed back in the sender store DS2 (H41). The call for service flag from SB is selected and tested for set. If it is set the call for service is left set and the instruction in the sender store IS. Providing the call for service flag is reset the program branches to ENABL which is the case for this call.

The contents of the sender store IS are loaded, masked with 7FFFF to reset the call for service and placed back therein at reference H43. Next the contents of store SB are loaded, superimposed with OCOOO and replaced in store SB (H44). Next a literal 10000 is loaded and placed in the register directory number store DN, which sets the command to CMD1 and erases the dialed digit.

The routine then branches to address 0319 in the executive cycle to resume the scan of the registers.

After the next digit is dialed and the register again calls for service, as indicated by reference I00 in List 2 the stores contain the same information as at reference H00, except that the dialed digit in the register store DN is a 6, and the sender store DS2 contains a 4 in position 2. The program proceeds as before until it arrives at the label EMPTY (I39). This time it is found that store DS2 is not empty, so that the routine next makes a test for one digit. This is found to be an equality so the routine branches to skip one of the LOAD SALF and STORE SA instructions, thereby shifting the digits left only two positions. Thus as shown in List 2 during the routine LODSNR (I41) the sender store DS2 has placed therein the digits 04600. List 2 also shows references I31, I37, L43 and I45, which correspond to those to the same number references in the H series to place information into the register and sender stores.

The next dialed digit is "2" (JOO) which is loaded into the sender in the same manner, except that the LOAD SALF instruction is executed only once.

Note that the tally has increased during each call for service so that at reference H31 it increased from 9 to *θ*, at I31 it increased to 11, and at J31 it increased to 12.

At the time of the next call for service as indicated by reference KOO in Lists 1 and 2, the dialed digit in the register store DN is 7, the tally in the sender instruction store IS is 12, and the digit store DS2 contains 04620. The program again proceeds in the same manner as indicated in the call for service designated by the reference H, down to reference K31 where the tally in the instruction store IS of the sender becomes 13. At reference K32 the dialed digit placed in store SA is a 7 in position 5. This time when testing for positions 4 and 5 of store DS2 empty, an inequality is found since there is a digit in position 4.

FORDG

Figure 21:
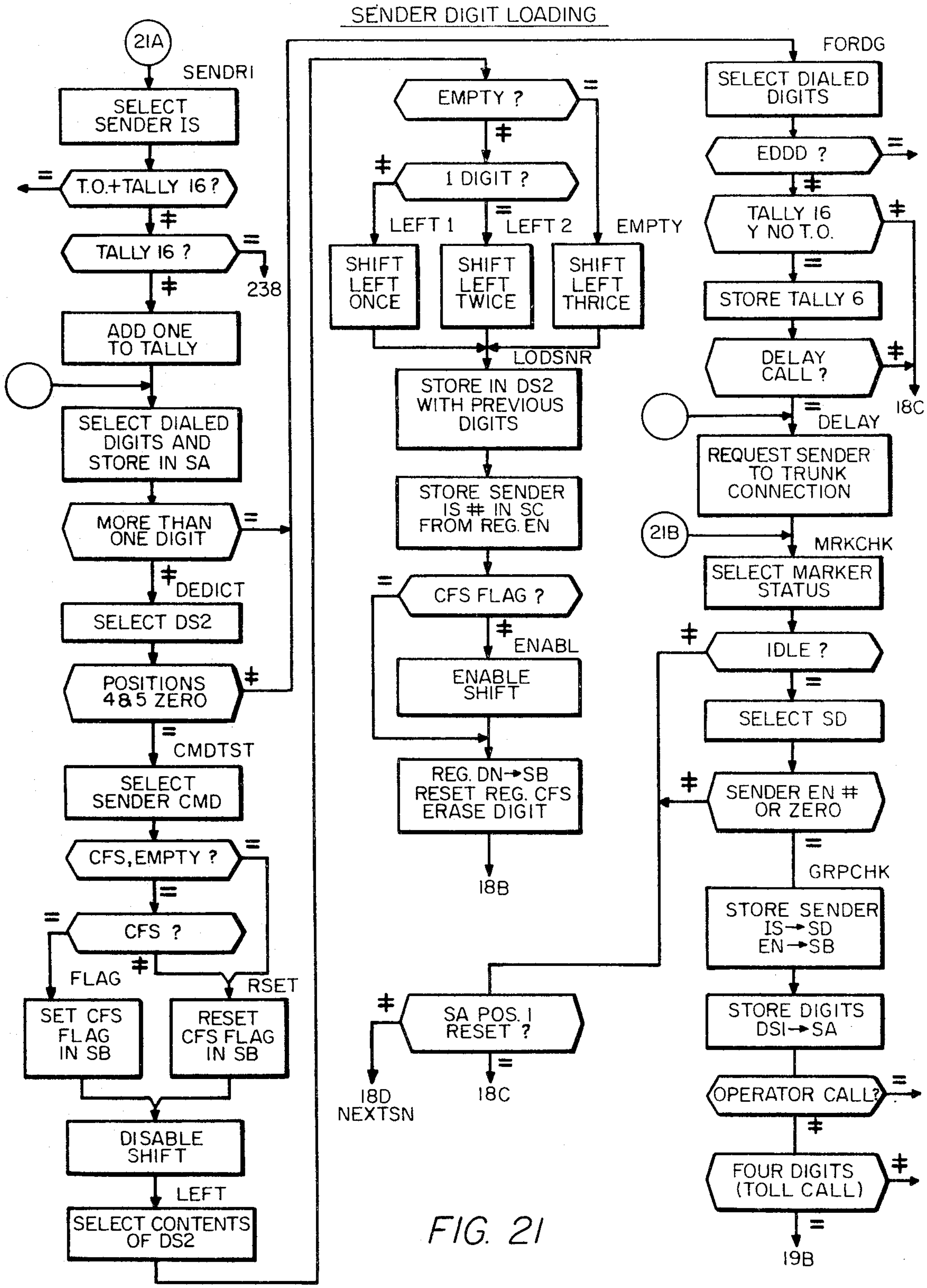

The routine then branches to the label FORDG (K53) which is shown in FIG. 21 in the right hand column. The dialed digits are first selected from store SA and tested for a D in position 2 which indicates an EDDD call which would cause a branch to a routine EDDDR1. Next there is a test made for tally 16 and no time out by selecting the contents of the sender instruction store IS, masking them with 0401F, and comparing to 00016. In this case this comparison yields an inequality so the program branches to RETRNR where the contents of the register instruction number store DN are selected and masked with 7FFFF to reset the register call for service, and the result placed back into the store DN (K55). Note that the dialed digit is also left therein so that the contents are now 10007. Then the program branches back (K56) to address 0319 in the executive cycle to continue to scan the registers.

The next two times that the register calls for service are shown only in List 2. At L00 the register store DN contains 90073, and at reference L31 the tally in the sender store IS is increased to 14.

At reference MOO the register directory number store DN contains 90732 and the tally is increased in the instruction store IS to 15 (M31).

At the next register call for service indicated by the reference NOO, the register store DN contains 97321, and the tally in the sender store IS is increased to 16 (N31). Therefore in the routine FORDG, when a test is made for tally 16 it is found to be equal. The information from the sender store IS is then selected and masked with FFFEO, followed by superimposing 00006 to change the tally 16 to tally 6, which is placed back into the store IS (N60). There is then a test made as to whether this is a delay call by checking the first digit position of the instruction store for a 1. Upon finding this condition to be equal, the program branches to DELAY.

DELAY

Several sections of the program branch to this point to request a sender to trunk connection. The contents of sender store IS are selected and superimposed with a 9 and again placed in store IS to set the sender call for service (N62).

The next label is MKRCHK, where tests are made to determine whether the marker and store SD are idle. For this call the equal condition is found in both cases so the program branches to the label GRPCHK.

The sender store IS address is selected from store SC and placed in store SD (N65). The sender equipment number store address 0C074 is placed in store SB (N66). Then the dialed digits from sender store DS1 are selected and placed in store SA to make tests for an operator call, which yields an inequality, and then whether there are four digits indicating a toll call which yields equality.

The program then branches to an entry of the CLT3 routine at the point indicated by 19B in FIG. 19. A test for the first dialed digit being a 1 and finding equality indicates this is a DDD call so at label DDD2 the route table DDDRT is selected and placed in store SC (N69). The contents of store SB are then tested to determine if it is a register number and finding that it is not the routine branches to the first instruction after the label GRPSIZ, which is address 0θB1.

The call has now entered the section of the program which provides for the selection of an idle trunk from a trunk group and entry into the ABC path selection program. After several routines having to do with trunk hunting and path selection, the program reaches the routine with the label PRIME (N80). The marker contains the information indicated at reference N80 in List 3.

Note that the routines between reference N70 and N80 include path testing to determine whether a path is available between the calling line and the selected outgoing trunk. However the path is not reserved at this time.

In the routine PRIME the hunting address DDDRT is loaded from store SC and is placed in store MC (N81). Next the sender number is moved from store SD to store SC (N82). This same number is superimposed with an 8 in the first digit position and is placed in marker store MA (N83). Then the trunk table is moved from store SC to store SD (N84). The sender mode of operation is selected by loading the table from store MC, adding 1 to the address, transferring the contents thereof, and masking with 0000F with the result placed in store SA (N85). The digit is masked with a 4 and compared to all zeros to test for wink start, and upon finding inequality the digit is moved two places to the left (N86 and N87). Next the contents of the sender instruction store IS are loaded, masked with OFFFF, superimposed with B0000 to place a line to trunk request in the sender, superimposed with the sender mode digit from store SA, and the result placed back in the instruction store IS (N88). The B in the first position is the request for a line to trunk connection, the 1 in the second position is the ANI indicator, the 8 in the third position indicates send MF, and the 6 in the fifth position is the tally indicator.

The address of store DS1 is placed in store SC (N89), and the dialed digits in store DS1 are then selected and placed in store SA (N90).

The contents from store MC of the route table plus 1 are selected and tested for the delete command which is assumed to be zero. The digits in store SA are again selected and masked with 00FFF and placed back in store SA (N91) and into store DS1 (N92). The digits in store SA are then shifted right once (N93). The contents of the address at the route table plus 1 from store MC are again selected and masked with FFFOO, superimposed with the digits from store SA, and are placed into store MC (N93). Next the digits from store DS1 are selected and placed in store SA (N94). The digits from store MC are selected and placed in store DS1 (N95). The digits from SA are shifted left three times (N96, N97 and N98) with the result placed in store MC. The address of store DS2 is placed in store SC (N99). The digits from store DS2 are selected and placed in store SA (N100). These digits are shifted right once, superimposed with the digits from store MC and placed into store DS2. Note that the first position of store DS2 is not equipped and therefore remains as a 0. The sender number is moved from store MA to store MC (N102). Next all zeros are loaded and placed in store MD (N103). Finally the trunk number is selected by loading the table from store SD, transferring its contents, and masking with 0FFFF, and placing this number in store MA (N104). It is assumed that the trunk number selected is C921. The zero in position one of marker MA causes it to be activated to establish the connection. The program branches to BEGIN (N105) of the executive cycle.

SENDER CALL FOR SERVICE

With a B in position 1 of the instruction store IS, the sender is now calling for service with a request for a line to trunk connection. The information in the register, sender and ANI stores for this call are shown at reference POO in List 2. Also note in List 1 that the hunt table is stored in store SD.

In the meantime the marker is in the process of establishing the trunk to sender connection, and the program proceeds through the executive cycle serving other calls.

Figure 22:
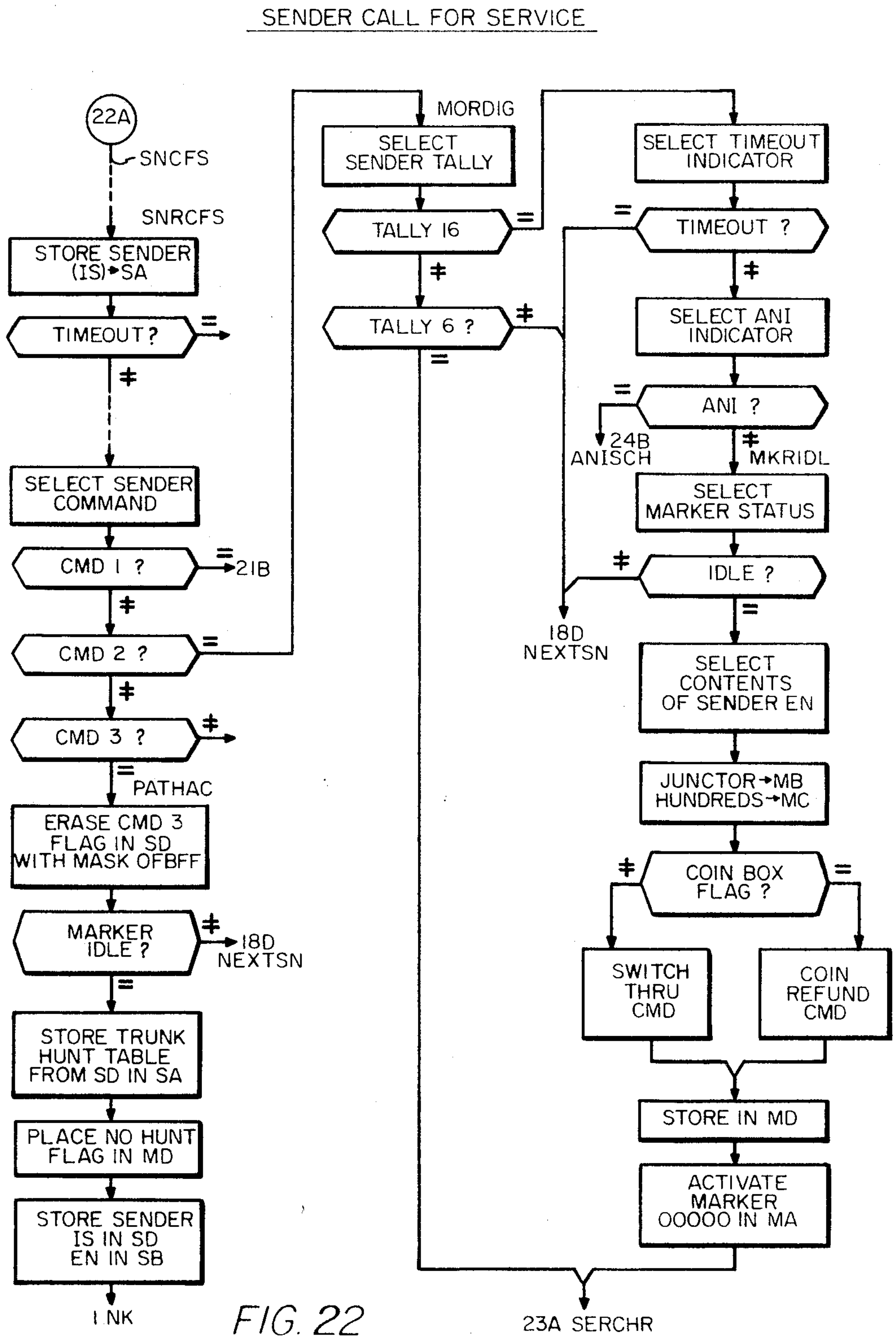

The executive cycle scans the senders in the routine SNSCAN. Upon finding the call for service condition at address C071, the program branches to the routine SNCFS which is shown in FIG. 22.

The purpose of this routine is to service sender call for service and sender time out calls for service. This routine is capable of handling all possible sender call for service conditions, such as request for sender to trunk connection, line to trunk connection, final switch through, faulty or timed out senders, as well as the sender empty condition.

There are initially some checks made to determine whether this is a test call, and then the routine reaches SNRCFS. The contents of the sender instruction store IS are selected and placed in store SA for easier access (P05). There is first a test for a 5-second time-out-elapsed call for service condition, and then the call for service is reset and placed in the sender store IS (P06).

The routine then checks for the value of the command by masking the first digit with 70000 and testing the value in the first position of the instruction store digits. If equality is found on the test for command CMD1 the program branches to MRKCHK in FIG. 21 for a sender to trunk connection. If equality is found on the test for CMD2 the program branches to the routine MORDIG. If, as in this case, there is an equality on the test for CMD3 the program branches to PATHAC to serve the request for a line to trunk connection in a split mode.

First the command 3 flag in store SD is reset indicating that the contents of store SD must be reserved on the next pass through the executive cycle if the line to trunk connection cannot be made at this point due to a busy marker (P07). The store SD is also tested for empty and if so there is a branch to an error printout. Next the same information is masked with 0FF00 and compared to 0C000 to test for a sender number, and if so there is a branch to the error printout routine.

Then the marker is tested for idle by testing for an 8 in position 1 of store MA. If the marker is busy the routine returns to NEXTSN in the executive cycle to continue scanning the other senders.

If the marker is idle the call will be set up at this point for the ABC path selection program. The hunt table from store SD is placed in store SA (P08), a no-hunt flag is placed in store MD to prohibit a second chance through trunk hunting by selecting a literal 00800 and placing it in store MD (P09), the sender instruction store address is taken from store SC and placed in store SD (P10), and this address is incremented to obtain the sender equipment number address which is placed in store SB (P11). At this point the program branches to the ABC path selection routines where the line to trunk connection will be performed, starting with branch to the routine LNK.

After proceeding through several routines including PATH, NORMAL, ACTMKR, TJSEL, and SPLIT, the conditions in the stores are shown in the lists by reference P20. Store SD has been reset to zero in List 1. In List 2, the calling line number has been replaced in sender store EN by the terminating junctor number which is assumed to be 0C927. In List 3 for the marker, store MA has the first position a zero to activate it, and the other positions contain the calling line equipment number C231. Store MB contains the identity C7 for the junctor number. Store MC contains the outgoing trunk equipment number C921. Store MD contains 040-- which is the command for providing the split mode in the terminating junctor. The program then returns to NEXTSN in the executive cycle to continue scanning other senders.

With the network connections completed, and the command 3 in the sender instruction store, its loop status monitor monitors the stop dial condition, and when sending may proceed causes the sender command to be changed to CMD2. The sender then proceeds to outpulse the digits 8θ2462 from its stores DS1 and DS2. In response to the empty condition it sets the call for service bit thereby changing the first digit of instruction store from a 2 to a θ. The conditions in the stores are now as indicated by Q00 in List 2.

The call for service routines proceed as in reference P series with reference to FIG. 22 down to the test for CMD2, at which point the program branches to the routine MORDIG (Q10).

MORDIG (MORE DIGITS)

The program now tests the digits from store SA for tally 16, and with an inequality then tests for tally 6. The equality condition causes the program to branch to SERCHR in FIG. 23.

At SERCHR, the first register equipment number address is loaded and placed in store SB (Q12). Here there is first a test as to whether all of the registers have been scanned, which if found to be true would cause a branch to the error printout program, but with the inequality the contents of the register equipment number store are selected and compared with the contents of store SC. If there is an inequality, the register address is incremented by 1 and the tests repeated. Here the equality condition is found for the first sender, and the routine branches to HATEST (home area test). The register address is modified to provide the directory number address which is again placed in store SB (Q14). The sender instruction data has been loaded from store SA and tested for time out and tally 16, which is here found to be an inequality. The next test is for tally 6 which is found to be equality which causes a branch to DS2LOD.

The sender instruction store address is moved from store SC into store SA (Q16), the address of store DS2 is derived and is placed in store SC (Q17). Then the dialed digits are loaded from the register directory number store DN and are placed in store DS2 (Q18).

Next the contents of the sender instruction store are loaded, masked with 7FFEO, and superimposed with 00016 to reset the sender call for service and set tally 16. The result is placed back in the sender store IS (Q20). The program then branches to NEXTSN to continue scanning senders in the executive cycle.

The sender then proceeds to outpulse the digits 7321, and with the empty condition again calls for service, with the conditions as shown at reference R00. When this call for service is found in the executive cycle, the routine branches as in the previous call to MORDIG, and upon finding the tally 16 equality, then selects the time out indicator from the sender instructions and finds inequality. It next tests for the ANI bit which is the digit 1 in position 2 of the instruction store, and upon finding the equality branches to ANISCH.

The ANI search routine is in FIG. 24 on the right hand side. The routine searches the contents of the ANI number stores SS beginning with the first to find the ANI store associated with the sender in question. If no associated ANI store is located the call will be treated as ONI and routed accordingly (branch to ONI). Upon finding an associated ANI store a check is made for an ANI fail flag which will cause the call to be routed to FAIL if a flag is set.

In the beginning of the routine the first sender number 00061 is loaded and placed in store SA (R31). The contents thereof are then masked with OCOFF and compared with the contents of SC. If there is inequality the number is incremented and compared to a literal 00071 to determine if all the ANI stores have been scanned. If so there is a branch to ONI, and otherwise the program returns to loop and repeat the test.

In this case the appropriate ANI store is found at address 0061.

In the routine CODE, when an associated ANI store has been found, the local office code and the ANI identification digit will be stored into the sender DS1 store and the terminal digits stored in the sender DS2 store. The digits from the ANI store NS are loaded and compared to a literal 20000, and if there were an equality the program would branch to FAIL. However on this call there is inequality so that the routine proceeds at reference R32. The sender instruction store address is placed in store SB, and the address of store DS1 is placed in store SC (R33). The program now loads a data literal having the mnemonic LOCAL 1, for the of-

BEST AVAILABLE COPY fice code, which in this case is assumed to be 342. There is superimposed thereon θ0000, literal and the result θ0342 is placed in the sender store DS1 (R34). The address in store SC is now increased by one to the value 0C073 for store DS2 (R35). Next the address from store SA is loaded and increased by 10 to obtain the address of store NS, and the terminal digits are transferred therefrom and masked with 0FFFF, and then placed in the sender store DS2 (R36).

Next the address of the ANI store SS is selected from store SA and placed in store SC (R37), a literal 40000 is selected and is placed in store SS (R38) to set the ANI store to idle. The address of store IS is placed in store SC (R39), and then a literal 20816 is loaded and is placed in store IS (R40). This is the command to set the sender for outpulsing with command 2, not ANI, MF, and tally 16. The program then branches to NEXTSN to continue scanning senders in the executive cycle.

After outpulsing the ANI information, the sender again calls for service with the data in the stores indicated by reference S00. The program again proceeds as in the previous call for service down to the routine MORDIG. At this routine it then tests for tally 16, finds an equality, tests for time out and finds inequality, tests for ANI and finds inequality and thereby enters the routine MKRIDL.

At the routine MKRIDL the final switch through on the line to trunk connection can be performed. The marker status is first tested and if it should happen to be busy the program will return to the executive cycle and return on the next cycle.

Providing the marker is idle the trunk group and terminating junctor number are selected from the sender store EN where they were previously stored during the line to trunk connection. The data selected from sender store EN is placed in store SB (S51), and is placed in the marker store MB (S52). The number is masked with 0FF00 to select the hundreds group number and is placed in store MC (S53). At this point the line is tested for coin box and if it is, a coin refund command is placed in store MD. Otherwise a switch through command is placed in store MD. This is done by loading the literal 0C000 and placing it in store MD (S54). Then all zeros are loaded and placed in store MA to activate the marker (S55).

Figure 23:
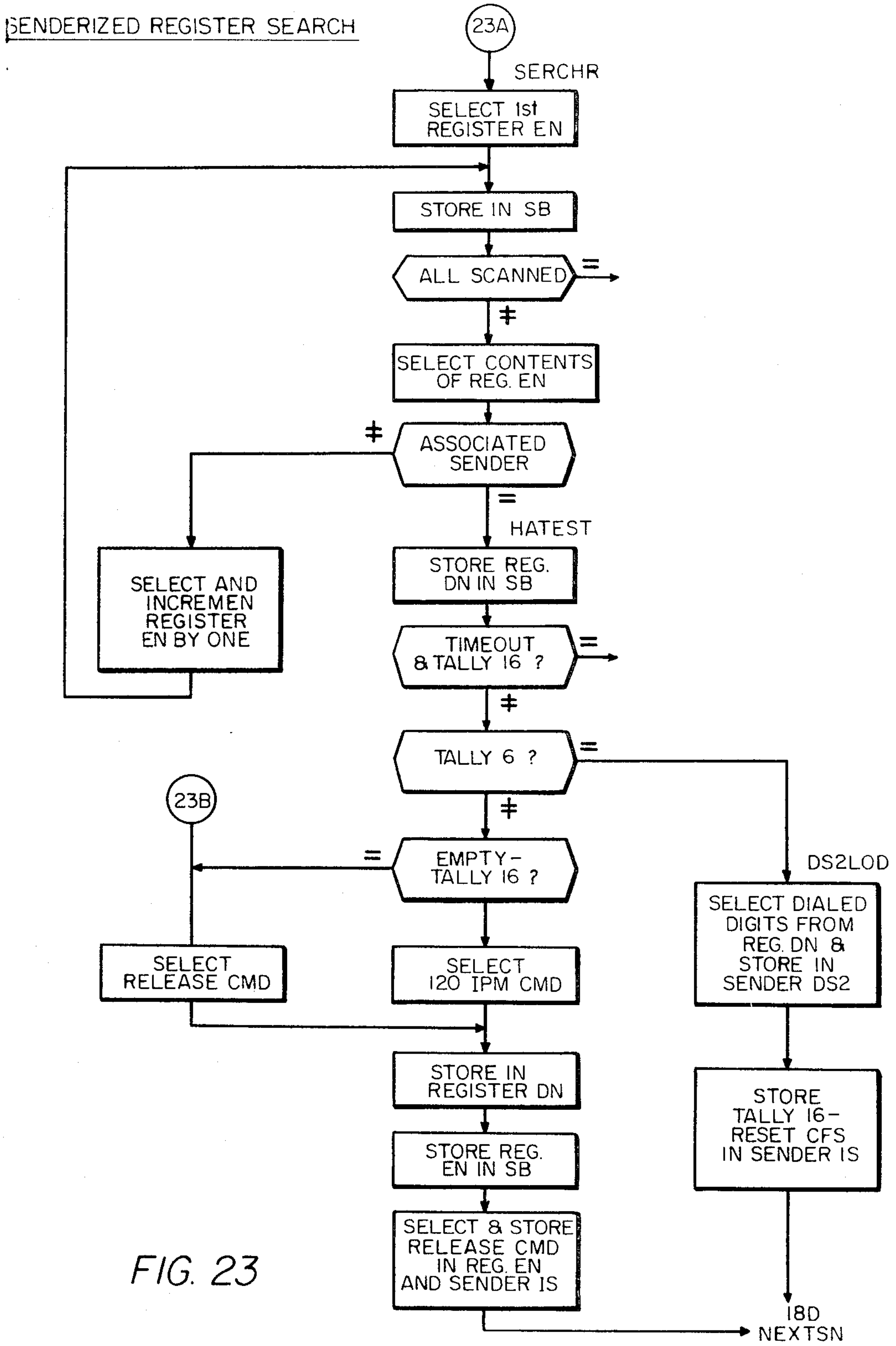

The program now branches to the routine SERCHR of FIG. 23. The routine SERCHR has been described in the call at the reference Q, to the routine HATEST. The register directory number address is placed in store SB (S59). The tests for time out and tally 16, and the test for tally 6 both yield inequalities. The digits selected from the sender store IS are then masked with FB01F to test for empty and tally 16, which gives equality. The routine then branches to reference S60 to select the release command which is all zeros and branches to the routine ENDCAL (S61) where this command is placed in the register store DN. The address in store SB is then incremented to that of the register equipment number C041 (S62). The release command comprising all zeros is again loaded and is placed in the register equipment number store (S63), and is placed in the sender instruction store IS (S64). The register and sender have now been given commands to release. The program next branches to NEXTSN to continue scanning senders in the executive cycle.

This is the end of the call processing for this call in the register, sender and ANI control programs.

It should be noted that the use of the storage registers SA, SB, SC, SD, MA, etc. is fairly flexible and different issues of the programs may have the information and data handled in quite different ways, bearing in mind that some stores have definite hardware functions (e.g. SB is used for indirect addressing of registers, and SC for indirect addressing of senders and ANI stores) and some stores are of different bit lengths.

It should also be noted that the use of flags, indicators, etc. is primarily due to the limited hardware, and makes possible maximum efficiency of that provided.

LIST 1

| | | | | STORAGE REGISTERS | | | |
|---|---|---|---|---|---|---|---|
| | CORE MEMORY | | | SA | SB | SC | SD |
| REF | LABEL | ADR | INST | 0021 | 0022 | 0023 | 0024 |
| A00 | | C231 | C0010 | | | | |
| A01 | SCANLG | 03C4 | 10011 | | | | |
| A02 | | 03C6 | 20022 | | -C100 | | |
| A03 | | 03CØ | 20021 | 0C2CØ | | | |
| A10 | LINE | 0485 | 10021 | | | | |
| A11 | | 0488 | 20011 | | | | |
| A12 | | 0489 | 20023 | | | -C211 | |
| LOOP | | | | | | | |
| A13 | | 0489 | 20023 | | | -C231 | |
| A14 | DUMYLN | 0497 | 10023 | | | | |
| A20 | RGCTST | 0516 | 10021 | | | | |
| A21 | | 0519 | 20021 | 0C041 | | | |
| LOOP | | | | | | | |
| A22 | | 0519 | 20021 | 0C063 | | | |
| A23 | CLMSS | 0545 | 10023 | | | | |
| A24 | RGTYPE | 0586 | 10023 | | | | |
| A25 | | 0587 | 20022 | | -C231 | | |
| A26 | DPRG | 0597 | 10169 | | | | |
| | DPTBL | 0169 | 01031 | | | | |
| A30 | GRPSIZ | 0ØØØ | 20023 | | | -0169 | |
| A31 | | 0ØB6 | 20014 | | | | |
| A32 | | 0ØB7 | 20013 | | | | |
| A39 | | 05Ø6 | 20023 | | | -C231 | |
| A42 | | 0625 | 20022 | | -C041 | | |
| A43 | | 0627 | 2002Ø | | | | |
| A44 | | 0635 | 20022 | | -C011 | | |

| REF | LABEL | ADR | INST | SA | SB | SC | SD |
|---|---|---|---|---|---|---|---|
| A45 | ENTRRJ | 0648 | 10023 | | | | |
| A46 | | 0650 | 20013 | | | | |
| A47 | | 0661 | 20012 | | | | |
| A48 | TSTLN | 0678 | 10023 | | | | |
| A49 | PEGCON | E808 | 10023 | | | | |
| A50 | | E8B3 | 20017 | | | | |
| A51 | SELCMD | 0687 | 10023 | | | | |
| A60 | CMDIDT | 0606 | 10281 | | | | |
| A61 | | 0607 | 20020 | | | | |
| A62 | | 06B5 | 20013 | | | | |
| A63 | | 06B7 | 20014 | | | | |
| A64 | | 06B9 | 20011 | | | | |
| B00 | | C011 | D0001 | | | | |
| B01 | SCANR | 0313 | 10212 | | | | |
| B02 | | 0314 | 20022 | | -C011 | | |
| B03 | SERVE | B7C1 | 10021 | | | | |
| B04 | | B7C3 | 20021 | 00000 | | | |
| B07 | | B825 | 20021 | 0C041 | | | |
| B08 | | B827 | 20023 | | | -C231 | |
| B09 | CLTIDT | B919 | 10022 | | | | |
| B10 | SETCM2 | B905 | 10022 | | | | |
| B11 | | B900 | 20020 | | | | |
| | | 0319 | 10022 | | | | |
| C00 | | C011 | 00018 | | | | |
| C01 | SCANR | 0313 | 10212 | | | | |
| C02 | | 0314 | 20022 | | -C011 | | |
| C03 | SERVE | B7C1 | 10021 | | | | |
| C04 | | B7C3 | 20021 | 00000 | | | |
| C07 | | B825 | 20021 | 0C041 | | | |
| C08 | | B827 | 20023 | | | -C231 | |

| REF | LABEL | ADR | INST | SA | SB | SC | SD |
|---|---|---|---|---|---|---|---|
| C20 | CLT2 | B9B1 | 10022 | | | | |
| C21 | | B077 | 20020 | | | | |
| | | 0319 | 10027 | | | | |
| D00 | | C011 | B0180 | | | | |
| D01 | SCANR | 0313 | 10212 | | | | |
| D02 | | 0314 | 20022 | | -C011 | | |
| D03 | SERVE | B7C1 | 10021 | | | | |
| | | B7C3 | 20021 | 00000 | | | |
| D07 | | B825 | 20021 | 0C041 | | | |
| D08 | | B827 | 20023 | | | -C231 | |
| D20 | CLT3 | BB35 | 10022 | | | | |
| D21 | RETRNR | 0359 | 10022 | | | | |
| D22 | | 0362 | 20020 | | | | |
| | | 0319 | 10022 | | | | |
| E00 | | C011 | B1802 | | | | |
| E01 | SCANR | 0313 | 10212 | | | | |
| E02 | | 0314 | 20022 | | -C011 | | |
| E03 | SERVE | B7C1 | 10021 | | | | |
| E04 | | B7C3 | 20021 | 00000 | | | |
| E07 | | B825 | 20021 | 0C041 | | | |
| E08 | | B827 | 20023 | | | -C231 | |
| E20 | CLT3 | BB35 | 10022 | | | | |
| E21 | DDD2 | BB49 | 10111 | | | | |
| E22 | | BB43 | 20023 | | | DDDRT | |
| E31 | | B249 | 20021 | DDDRT | | | |
| E34 | CALLCH | B290 | 10023 | | | | |
| E35 | | B204 | 20023 | | | -C071 | |
| E36 | TOLCH | B200 | 10022 | | | | |
| E37 | FACHK | B2C7 | 10022 | | | | |
| E38 | TALLY9 | B396 | 1B116 | | | | |

| REF | LABEL | ADR | INST | SA | SB | SC | SD |
|---|---|---|---|---|---|---|---|
| E39 | | B316 | 2001θ | | | | |
| E40 | OPFLG | B317 | 10021 | | | | |
| E41 | | B32θ | 20021 | 0C071 | | | |
| E42 | | B332 | 20023 | | | -C072 | |
| E43 | LODDS1 | B333 | 1022 | | | | |
| E44 | | B336 | 2001θ | | | | |
| E45 | | B338 | 2002θ | | | | |
| E46 | | B343 | 20022 | | -C041 | | |
| E47 | RSTDS2 | B352 | 10023 | | | | |
| E48 | | B354 | 20023 | | | -C073 | |
| E49 | | B356 | 2001θ | | | | |
| E50 | | B359 | 20023 | | | -C074 | |
| E51 | | B368 | 2001θ | | | | |
| E52 | | B36θ | 2002θ | | | | |
| E53 | TSTANI | | | | | | |
| E60 | DEDANI | | | | | | |
| E61 | | | | | -C071 | | |
| E62 | ANIL | | | | | | |
| E63 | | | 2001θ | | | | |
| E64 | ANILP | | | | | | |
| E65 | | | | 00061 | | | |
| E66 | SETANI | | | | | | |
| E67 | | | | | | -0061 | |
| E68 | | | | | | | |
| E69 | | | | | | -0071 | |
| E70 | | | | | | | |
| F00 | | 0061 | 8C071 | | | | |
| F01 | ANISCN | 0381 | 10231 | | | | |
| F02 | | 0382 | 20023 | | | -0061 | |
| F03 | ANICFS | | 10023 | | | | |

| REF | LABEL | ADR | INST | SA | SB | SC | SD |
|---|---|---|---|---|---|---|---|
| F04 | | | 20021 | 1C231 | | | |
| F05 | | | | | | -0071 | |
| F07 | | | 90000 | | | | |
| F08 | NOTFND | | | | | | |
| F09 | | | 2001θ | | | | |
| F10 | | | 20023 | | | -0061 | |
| F11 | NXTANI | | | | | | |
| G00 | | 0061 | 8C071 | | | | |
| G01 | ANISCN | 0381 | | | | | |
| G02 | | 0382 | 20023 | | | -0061 | |
| G03 | ANICFS | | | | | | |
| G04 | | | 20021 | 1C231 | | | |
| G05 | | | | | | -0071 | |
| G07 | | | 90000 | | | | |
| G20 | ANIFND | | 2001θ | | | | |
| G21 | | | | | | -0061 | |
| G22 | | | 2001θ | | | | |
| G23 | ANIEND | | 10023 | | | | |
| G24 | | | 20022 | | -0061 | | |
| G25 | | | 20023 | | | -C071 | |
| G26 | | | 20021 | 11049 | | | |
| G27 | | | 2001θ | | | | |
| G28 | | | | | | -0061 | |
| G29 | NXTANI | | | | | | |
| H00 | | C011 | 90004 | | | | |
| H01 | SCANR | 0313 | 10021 | | | | |
| H02 | | 0314 | 20022 | | -C011 | | |
| H03 | SERVE | B7C1 | 10021 | | | | |
| | | B7C3 | 20021 | 00000 | | | |

| REF | LABEL | ADR | INST | SA | SB | SC | SD |
|---|---|---|---|---|---|---|---|
| H07 | | B825 | 20021 | 0C041 | | | |
| H08 | | B827 | 20023 | | | -E071 | |
| H20 | SENDER | B865 | 10023 | | | | |
| H21 | | B867 | 20023 | | | -C071 | |
| H30 | SENDR1 | B572 | 10023 | | | | |
| H31 | | B582 | 20010 | | | | |
| H32 | | B586 | 20021 | 00004 | | | |
| H33 | DEDICT | B500 | 10023 | | | | |
| H34 | CMDTST | B5B8 | 10023 | | | | |
| H35 | RSET | B658 | 10022 | | | | |
| H36 | | B5C9 | 20022 | | -0011 | | |
| H37 | | B613 | 20010 | | | | |
| H38 | LEFT | B614 | 10023 | | | | |
| H39 | EMPTY | B626 | 10051 | | | | |
| H40 | LODSNR | B632 | 10023 | | | | |
| H41 | | B635 | 20010 | | | | |
| H42 | | B643 | 20023 | | | | |
| H43 | | B651 | 20010 | | | | |
| H44 | | B654 | 20022 | | -C011 | | |
| H45 | | B656 | 20020 | | | | |
| H46 | | 0319 | 10022 | | | | |
| I00 | | C011 | 90006 | | | | |
| I39 | EMPTY | B626 | 10051 | | | | |
| | LEFT2 | B628 | 10051 | | | | |
| I40 | LODSNR | B632 | 10023 | | | | |
| I41 | | B635 | 20010 | | | | |
| I46 | | 0319 | 10022 | | | | |
| J00 | | C011 | 90002 | | | | |
| J39 | EMPTY | B626 | 10051 | | | | |

| REF | LABEL | ADR | INST | SA | SB | SC | SD |
|---|---|---|---|---|---|---|---|
| | LEFT1 | B628 | 10051 | | | | |
| J40 | LODSNR | B632 | 10023 | | | | |
| J41 | | B635 | 20010 | | | | |
| J46 | | B319 | 10022 | | | | |
| K00 | | C011 | 90007 | | | | |
| K31 | | B582 | 20010 | | | | |
| K32 | | B586 | 20021 | 00007 | | | |
| K53 | FORDG | B661 | 10021 | | | | |
| K54 | RETRNR | 0359 | 10022 | | | | |
| K55 | | 0362 | 20020 | | | | |
| K56 | | 0319 | 10022 | | | | |
| N00 | | C011 | 97321 | | | | |
| N30 | SENDR1 | B572 | 10023 | | 0C011 | 0C071 | |
| N31 | | B582 | 20010 | | | | |
| N32 | | B586 | 20021 | 07321 | | | |
| N53 | FORDG | B661 | 10021 | | | | |
| N60 | | B675 | 20010 | | | | |
| N61 | DELAY | B670 | 10023 | | | | |
| N62 | | B683 | 20010 | | | | |
| N63 | MKRCHK | B684 | 10011 | | | | |
| N64 | GRPCHK | B534 | 10023 | | | | |
| N65 | | B535 | 20024 | | | | -C071 |
| N66 | | B539 | 20022 | | -C074 | | |
| N67 | | B544 | 00021 | 01802 | | | |
| N68 | | BB30 | 402C1 | | | | |
| N69 | | BB43 | 20023 | | | DDDRT | |
| N70 | | 00B1 | 10011 | | | | |
| ↓ | | | | | | | |
| N80 | PRIME | 0989 | 10023 | XXXXX | | | |

| REF | LABEL | ADR | INST | SA | SB | SC | SD |
|---|---|---|---|---|---|---|---|
| N81 | | 0901 | 20013 | | | | |
| N82 | | 0903 | 20023 | | | -C071 | |
| N83 | | 0905 | 20011 | | | | |
| N84 | | 0907 | 20024 | | | | XXXXX |
| N85 | | 09B2 | 20021 | 00008 | | | |
| N86 | | 09C1 | 20021 | 00080 | | | |
| N87 | | 09C3 | 20021 | 00800 | | | |
| N88 | | 09C9 | 20010 | | | | |
| N89 | | 0012 | 20023 | | | -C072 | |
| N90 | | 0014 | 20021 | 01802 | | | |
| N91 | | 0036 | 20021 | 00802 | | | |
| N92 | | 0037 | 20010 | | | | |
| N93 | | 0039 | 20021 | 00080 | | | |
| | | 0045 | 20013 | | | | |
| N94 | | 0048 | 20021 | 00802 | | | |
| N95 | | 0040 | 20010 | | | | |
| N96 | | 0052 | 20021 | 08020 | | | |
| N97 | | 0054 | 20021 | 80200 | | | |
| N98 | LODDS2 | 0056 | 20013 | | | | |
| N99 | | 0059 | 20023 | | | -C073 | |
| N100 | | 0061 | 20021 | 04620 | | | |
| N101 | | 0064 | 20010 | | | | |
| N102 | | 0066 | 20013 | | | | |
| N103 | | 0068 | 20014 | | | | |
| N104 | | 0072 | 20011 | | | | |
| N105 | BEGIN | 0311 | 10021 | | | | |
| P00 | | C071 | 17321 | | | | XXXXX |
| P01 | SNSCAN | 0334 | 10218 | | | | |
| P02 | | 0335 | 20023 | | | -C071 | |
| P03 | SNCFS | B390 | 1B022 | | | | |

| REF | LABEL | ADR | INST | SA | SB | SC | SD |
|---|---|---|---|---|---|---|---|
| P04 | SNRCFS | B3Ø9 | 10023 | | | | |
| P05 | | B3B1 | 20021 | B1806 | | | |
| P06 | | B3B7 | 2001Ø | | | | |
| | PATHAC | B426 | | | | | |
| P07 | | B428 | 20024 | | | | 0XYXX |
| P08 | | B439 | 20021 | 0XYXX | | | |
| P09 | | B441 | 20014 | | | | |
| P10 | | B443 | 20024 | | | | 0C071 |
| P11 | | B447 | 20022 | | -C074 | | |
| P12 | LNK | 0733 | 10049 | | | | |
| ↓ | | | | | | | |
| P20 | | | | | | | 00000 |
| | NEXTSN | | | | | | |
| Q00 | | C071 | 97321 | | | | |
| Q01 | SNSCAN | 0334 | 10218 | | | | |
| Q02 | | 0335 | 20023 | | | -C071 | |
| Q03 | SNCFS | B39Ø | 1B022 | | | | |
| Q04 | SNRCFS | B3Ø9 | 10023 | | | | |
| Q05 | | B3B1 | 20021 | Ø1806 | | | |
| Q06 | | B3B7 | 2001Ø | | | | |
| B10 | MORDIG | B449 | 10021 | | | | |
| Q11 | SERCHR | B478 | 10255 | | | | |
| Q12 | | B479 | 20022 | | -C041 | | |
| Q13 | HATEST | B493 | 10022 | | | | |
| Q14 | | B496 | 20022 | | -C011 | | |
| Q15 | DS2LOD | B557 | 10023 | | | | |
| Q16 | | B558 | 20021 | 0C071 | | | |
| Q17 | | B561 | 20023 | | | -C073 | |
| Q18 | | B564 | 2001Ø | | | | |

| REF | LABEL | ADR | INST | SA | SB | SC | SD |
|---|---|---|---|---|---|---|---|
| Q19 | | B566 | 20023 | | | -C071 | |
| Q20 | | B56θ | 2001θ | | | | |
| | NEXTSN | | | | | | |
| R00 | | C071 | 97321 | | | | |
| R01 | SNSCAN | 0334 | 10218 | | | | |
| | | | | θ1816 | | -C071 | |
| ↓ | | | | | | | |
| R10 | MORDIG | B449 | 10021 | | | | |
| R30 | ANISCH | | | | | | |
| R31 | | | 20021 | 00061 | | | |
| R32 | | | 20022 | | -C071 | | |
| R33 | | | 20023 | | | -C072 | |
| R34 | | | 2001θ | | | | |
| R35 | | | 20023 | | | -C073 | |
| R36 | | | 2001θ | | | | |
| R37 | | | | | | -0061 | |
| R38 | | | 2001θ | | | | |
| R39 | | | 20023 | | | -C071 | |
| R40 | | | 2001θ | | | | |
| R41 | NEXTSN | | | | | | |
| S00 | | | | | | | |
| S01 | SNSCAN | 0334 | 10218 | | | | |
| | | | | θ0816 | | -C071 | |
| ↓ | | | | | | | |
| S10 | MORDIG | B449 | 10021 | | | | |
| S50 | MKRIDL | B4Cθ | 10011 | | | | |
| S51 | | B519 | 20022 | | -C9C7 | | |
| S52 | | B51θ | 20012 | | | | |
| S53 | | B522 | 20013 | | | | |
| S54 | | B52θ | 20014 | | | | |
| S55 | | B532 | 20011 | | | | |
| S56 | SERCHR | B478 | 10255 | | | | |

| REF | LABEL | ADR | INST | SA | SB | SC | SD |
|---|---|---|---|---|---|---|---|
| S57 | | B479 | 20022 | | -C041 | | |
| S58 | HATEST | B493 | 10022 | | | | |
| S59 | | B496 | 20022 | | -C011 | | |
| S60 | | B4C8 | 10211 | | | | |
| S61 | ENDCAL | B4θ8 | 2002θ | | | | |
| S62 | | B4B4 | 10211 | | -C041 | | |
| S63 | | B4B5 | 2002θ | | | | |
| S64 | | B4B6 | 2001θ | | | | |
| | NEXTSN | | | | | | |

LIST 2

| | REG. #1 | | SENDER #1 | | | | ANI #1 | |
|---|---|---|---|---|---|---|---|---|
| | DN | EN | IS | DS1 | DS2 | EN | SS | NS |
| REF | C011 | C041 | C071 | C072 | C073 | C074 | 0061 | 0071 |
| A00 | 70000 | 00000 | 70000 | 00000 | -0000 | | 40000 | |
| A43 | | 0C231 | | | | | | |
| A61 | 50000 | | | | | | | |
| B00 | D0001 | 1C231 | | | | | | |
| B11 | 20001 | | | | | | | |
| C00 | θ0018 | 1C231 | | | | | | |
| C21 | 30018 | | | | | | | |
| D00 | B018θ | 1C231 | | | | | | |
| D22 | 3018θ | | | | | | | |
| E00 | B18θ2 | 1C231 | 70000 | 00000 | -0000 | | 40000 | |
| E39 | | | 11009 | | | | | |
| E44 | | | | 018θ2 | | | | |
| E45 | 10000 | | | | | | | |
| E49 | | | | | -0000 | | | |
| E51 | | | | | | 1C231 | | |
| E52 | | 0E071 | | | | | | |

| | REG. #1 | | SENDER #1 | | | | ANI #1 | |
|---|---|---|---|---|---|---|---|---|
| REF | DN | EN | IS | DS1 | DS2 | EN | SS | NS |
| E63 | | | 11049 | | | | | |
| E68 | | | | | | | 8C071 | |
| E70 | | | | | | | | 00174 |
| F00 | 10000 | 0E071 | 11049 | 01802 | -0000 | 1C231 | 8C071 | DNTBLE |
| F09 | | | | | | | | DNTBLE+1 |
| G00 | 10000 | 0E071 | 11049 | 01802 | -0000 | 1C231 | 8C071 | DNTBLE+1 |
| C20 | | | | | | | | 01234 |
| G22 | | | | | | | CC071 | |
| G27 | | | 11009 | | | | | |
| H00 | 90004 | 0E071 | 11009 | 01802 | -0000 | 1C231 | CC071 | 01234 |
| H31 | | | 11008 | | | | | |
| H37 | | | 91008 | | | | | |
| H41 | | | | | -4000 | | | |
| H43 | | | 11008 | | | | | |
| H45 | 10000 | | | | | | | |
| I00 | 90006 | 0E071 | 11008 | 01802 | -4000 | 1C231 | CC071 | 01234 |
| I31 | | | 11011 | | | | | |
| I37 | | | 91011 | | | | | |
| I41 | | | | | -4600 | | | |
| I43 | | | 11011 | | | | | |
| I45 | 10000 | | | | | | | |
| J00 | 90002 | 0E071 | 11011 | 01802 | -4600 | 1C231 | CC071 | 01234 |
| J31 | | | 11012 | | | | | |
| J37 | | | 91012 | | | | | |
| J41 | | | | | -4620 | | | |
| J43 | | | 11012 | | | | | |
| J45 | 10000 | | | | | | | |
| K00 | 90007 | 0E071 | 11012 | 01802 | -4620 | 1C231 | CC071 | 01234 |
| K31 | | | 11013 | | | | | |
| K55 | 10007 | | | | | | | |

| | REG. #1 | | SENDER #1 | | | | ANI #1 | |
|---|---|---|---|---|---|---|---|---|
| REF | DN | EN | IS | DS1 | DS2 | EN | SS | NS |
| L00 | 90073 | 0E071 | 11013 | 018θ2 | -4620 | 1C231 | CC071 | 01234 |
| L31 | | | 11014 | | | | | |
| L55 | 10073 | | | | | | | |
| M00 | 90732 | 0E071 | 11014 | 018θ2 | -4620 | 1C231 | CC071 | 01234 |
| M31 | | | 11015 | | | | | |
| M55 | 10732 | | | | | | | |
| N00 | 97321 | 0E071 | 11015 | 018θ2 | -4620 | 1C231 | CC071 | 01234 |
| N31 | | | 11016 | | | | | |
| N60 | | | 11006 | | | | | |
| N62 | | | 91006 | | | | | |
| N88 | | | B1806 | | | | | |
| N92 | | | | 008θ2 | | | | |
| N95 | | | | 0008θ | | | | |
| N101 | | | | | -2462 | | | |
| P00 | 17321 | 0E071 | B1806 | 0008θ | -2462 | 1C231 | CC071 | 01234 |
| P06 | | | 31806 | | | | | |
| ↓ | | | | | | | | |
| P20 | | | 31806 | | | 0C9C7 | | |
| Q00 | 97321 | 0E071 | θ1806 | 00000 | -0000 | 0C9C7 | CC071 | 01234 |
| Q06 | | | 21806 | | | | | |
| Q18 | | | | | -7321 | | | |
| Q20 | | | 21816 | | | | | |
| R00 | 97321 | 0E071 | θ1816 | 00000 | -0000 | 0C9C7 | CC071 | 01234 |
| R06 | | | 21816 | | | | | |
| R34 | | | | θ3420 | | | | |
| R36 | | | | | -1234 | | | |
| R38 | | | | | | | 40000 | |
| R40 | | | 20816 | | | | | |

| | REG. #1 | | SENDER #1 | | | | ANI #1 | |
|---|---|---|---|---|---|---|---|---|
| REF | DN | EN | IS | DS1 | DS2 | EN | SS | NS |
| S00 | 97321 | 0E071 | θ0816 | 00000 | -0000 | 0C9C7 | 40000 | 01234 |
| S61 | 00000 | | | | | | | |
| S63 | | 00000 | | | | | | |
| S64 | | | 00000 | | | | | |

LIST 3

| | MARKER | | | |
|---|---|---|---|---|
| | MA | MB | MC | MD |
| REF | 0011 | 0012 | 0013 | 0014 |
| A00 | 8C129 | ---C4 | 0C342 | 200-- |
| A11 | 8C211 | | | |
| A31 | | | | 000-- |
| A32 | | | 00000 | |
| A46 | | | 000B2 | |
| A47 | | ---B2 | | |
| A62 | | | 8C011 | |
| A63 | | | | 000-- |
| A64 | 0C231 | | | |
| N00 | | | | |
| N80 | 8XXXX | ---B4 | 00000 | XXX-- |
| N81 | | | DDDRT | |
| N83 | 8C071 | | | |
| N93 | | | 0008θ | |
| N98 | | | θ2000 | |
| N102 | | | 8C071 | |
| N103 | | | | 000-- |
| N104 | 0C921 | | | |

| REF | MA | MB | MC | MD |
|---|---|---|---|---|
| P09 | | | | 008-- |
| ↓ | | | | |
| P20 | 0C231 | ---C7 | 8C921 | 040-- |
| S52 | | ---C7 | 0C900 | |
| S53 | | | | |
| S54 | | | | 0C0-- |
| S55 | 00000 | | | |

What is claimed is:

1. In a communication switching system, common control apparatus comprising; a central processing unit, a plurality of dialing registers, a plurality of senders separate from the dialing registers, and a plurality of automatic-number-identification units separate from the dialing registers and the senders;

wherein each dialing register, each sender and each automatic-number-identification unit includes individual storage means;

data bus means coupled in common between the central processing unit and the storage means of each of the dialing registers, senders and automatic-number-identification units;

address means coupled to the said storage means of the dialing registers, the senders and the automatic-number-identification units and operative to select at least part of one of said storage means to read data from the selected storage means into the central processing units or to write data from the central processing unit into the selected storage means;

means to associate a register and a sender for a call by placing an identity of one in the storage means of the other;

and means to transfer data from the dialing register to the associated sender by using said address means to select the dialing-register storage means and read the data into the central processing unit, and then using the address means to select the storage means of the associated sender and to write the data from the central processing unit into the storage means of that sender.

2. In a communication switching system the combination as claimed in claim 1, wherein each dialing register, each sender and each automatic-number-identification unit has part of its storage means for an instruction including its status, part for storing an equipment number of other equipment associated with a call, and part for call digits for a call, and each said part being adapted for selection using said address means to read data therefrom or to write data therein from the central processing unit;

the equipment number part of the storage means of each dialing register being used initially for storing the equipment number identity of a calling line, and after selection of a sender for storing the identity of the sender, and the equipment number part of the storage means of each sender being used initially after its selection for storage of the calling line equipment number, and the equipment number part of the storage means of each automatic-number-identification unit being used after its selection to store the identity of the associated sender.

3. In a communication switching system, the combination as claimed in claim 2, wherein the storage means of each dialing register, each sender and each automatic-number-identification unit comprises a plurality of stores, wherein each store comprises a plurality of bistable devices each of which stores a bit of data having value 0 or 1, and each store has an individual address in said address means.

4. In a communication switching system, the combination as claimed in claim 3, wherein each dialing register and each sender includes sequence control means comprising a plurality of bistable devices and a plurality of logic devices interconnected with pulsing means, with timing means, and with said storage means to control the sequencing and timing of pulsing and manipulation of call digits while receiving in a dialing register and outpulsing in a sender, and means to change the state of at least one of the bistable devices of said part of the storage means for an instruction to thereby change the status indication of the instruction to call for service to the central processing unit.

5. In a communication switching system, the combination as claimed in claim 4, wherein in each sender the part of the storage means for an instruction comprises one of said stores designated an instruction store having its own individual address;

part of the instruction store being for commands in which codes comprising different combinations of bit values represent respective states including idle, dedicated for a call, requests for connections, timing, activate outpulsing, call for service because call digit part of sender storage means is empty, and releasing;

other parts of the instruction store being for indicating the type of outpulsing, for indicating whether automatic-number-identification is required for a call, and for indicating the type of interoffice signaling;

and another part of the instruction store comprising a plurality of said bistable devices for a tally indication which is incremented each time a called digit is received in the associated register, the tally indication being used to indicate when dialing is complete, and for other indications of the progress of processing a call;

wherein the data in the instruction store is changed during progress of a call by the central processing unit using said address means, and wherein each sender includes logic means to change at least some bits of its instruction store.

6. In a communication switching system, the combination as claimed in claim 5, wherein in each sender the part of the storage means for call digits comprises a plurality of said stores for digits to be outpulsed, these stores having their bistable devices interconnected as a shift register for digits controlled by the sequence control means so that the next digit to be outpulsed is shifted into a given digit position of one of the stores, the shifting and outpulsing of the digits being controlled independently of the central processor.

7. In a communication switching system, the combination as claimed in claim 5, wherein the instruction part of the storage means of each automatic-number-identification unit comprises a plurality of bistable devices for indicating unit statuses, the statuses being idle, calling for service which indicates that the unit is dedicated to a call to process the calling number translation, and dedicated to a call with the number translation processing completed;

wherein the part of the storage means for call digits is used to store a number which is the starting point of a number translation scan, and after the number translation is completed to store the directory number identification of the calling line.

8. In a communication switching system, the combination as claimed in claim 7, wherein part of the storage means of each automatic-number-identification unit is used for a control digit which as a result of the call processing relating to identification of the directory number of a calling line may indicate that operator-number-identification is required for the call, that the processing has failed to find a calling line directory number, or that automatic number identification of a calling line is available.

9. In a communication switching system, the combination as claimed in claim 1, further including a main memory of a read only type which comprises a plurality of word stores for program words and data words;

wherein said storage means of each dialing register, each sender and each automatic number identification unit comprises a plurality of stores;

wherein said address means is coupled to said main memory, the address means being arranged to have a set of addresses with each address being individual either to a word store of the main memory or a store of said storage means, the address means being operative to select the store from either the main memory or the storage means in accordance with the individual address and to read the contents of that store into the central processing unit.

10. In a communication switching system having a plurality of terminations and a switching network for interconnecting them, each termination having an individual equipment number identity, common control apparatus comprising: a central processing unit, a main memory, a plurality of dialing registers, a plurality of senders separate from the dialing registers, a plurality of common store registers, and connections of the central processing unit to the other said common control apparatus;

wherein each dialing register and each sender includes a line terminal connected to an individual one of said terminations, and each includes individual storage means comprising a plurality of store registers;

line call-for-service means including the central processing unit effective responsive to a calling condition at a calling termination to select an idle dialing register to cause establishment of a connection via the switching network between said calling termination and the termination of the selected dialing register and means including the central processing unit to place the equipment number identity of the calling termination into the storage means of the selected dialing register;

register control means independent of the central processor to receive called-number digits via its line terminal and to store them into its storage means;

digit analysis means including the central processing unit for analyzing said called-number digits, which for some predetermined digit combinations produces a sender-required indication, and sender selection means including the central processing unit responsive to said indication to select an idle sender, means including the central processing unit to place an identity of the selected sender into the dialing register storage means to thereby associate the dialing register and sender;

and digit loading means including the central processing unit operative to take called-number digits from the storage means of the dialing register and to place them into the storage means of said sender associated therewith.

11. In a communication switching system, the combination as claimed in claim 10, wherein said main memory comprises a plurality of word stores for program words and data words;

wherein said connections include data bus means coupled in common between the central processing unit and said store registers;

wherein there is a memory input register for addresses designating the individual word stores and store registers, read access means connected to read out a word from a word store or store register corresponding to the address in the memory input register and to supply data signals representing the word to a set of memory output conductors, the data signals from the store registers being supplied via said data bus means;

and wherein there is write access means connected from the central processing unit via said bus means to inputs of said store registers to write data from the central processing unit into a selected store register in accordance with its address.

12. In a communication switching system, the combination as claimed in claim 11, wherein each sender includes sender control means independent of the central processor to outpulse digits, the digit loading means being used during outpulsing to take additional digits from the register storage means and to place them into the storage means of said sender associated therewith.

13. In a communication switching system, the combination as claimed in claim 12, wherein said sender selection means includes means to place the said equipment number identity of the calling termination into the storage means of the selected sender;

and further including means including the central processing unit operative during the call subsequent to the operation of said sender selection means to cause selection of one of said terminations which is a trunk termination, and to cause connections to be established between the calling termination and trunk termination and between the sender termination and trunk termination via said switching network, with a split mode in which the connection is open at one point between the calling line and trunk, to place an identity of the calling line-to-trunk connection path into the storage means of the sender in place of the identity of the calling termination;

the sender control means being effective after said connections to the trunk are established to outpulse digits;

and means including the central processing unit effective after completion of outpulsing to use said identity of the calling line-to-trunk connection path to cause said split mode to be changed to a switch-through mode, and to release the dialing register and sender.

14. In a communication switching system, the combination as claimed in claim 12, further including a plurality of automatic-number-identification units separate from the dialing registers and from the senders;

wherein said sender-required indication may for some calls include an indication that an automatic-number-identification unit is required, and wherein there is further included automatic-number-identification dedication means effective after said sender selection means and responsive to the last said indication to select an idle automatic-number-identification unit, and means to place the identity of the selected sender into the storage means of the selected automatic-number-identification unit to thereby associate it with the sender for the call; and wherein said sender-selection means includes means to place the said equipment number identity of the calling termination into the storage means of the selected sender.

15. In a communication switching system, the combination as claimed in claim 14, wherein each of said automatic-number-identification units include means effective after its selection for a call to call for service to the central processing unit and in combination therewith to use the equipment number identity of a calling termination as stored in the sender storage means to determine the directory number associated with the calling termination and to place that number into the storage means of the automatic-number-identification unit;

and wherein each sender includes means effective during a call responsive to the completion of outpulsing of digits in its storage means to call for the service of the central processing unit to cause said digit loading means to take additional digits if there are any from the storage means of the dialing register and to place them into the storage means of the sender for outpulsing, and wherein subsequent to their being no more digits to be obtained from the dialing register to take the calling line directory number digits from the automatic-number-identification unit and place them into the storage means of the sender for outpulsing, and to release the automatic-number-identification unit.

16. In a communication switching system, the combination as claimed in claim 15, further including means including the central processing unit, operative during the call subsequent to the operation of said sender selection means, to cause selection of one of said terminations which is a trunk termination, and to cause connections between the calling termination and trunk termination and between the sender termination and trunk termination via said switching network, with a split mode in which the connection is open at one point between the calling line and trunk, to place an identity of the calling line-to-trunk connection path into the storage means of the sender in place of the identiy of the calling termination;

the sender control means being effective after said connections to the trunk are established to outpulse digits;

and means including the central processing unit effective after completion of outpulsing to use said identity of the calling line-to-trunk connection path to cause said split mode to be changed to a switch-through mode, and to release the dialing register and sender.

17. In a communication switching system, the combination as claimed in claim 12, wherein said sender selection means include means to place the said equipment number identity of the calling termination into the storage means of the selected sender;

and further including means including the central processing unit operative during the call subsequent to the operation of said sender selection means to cause selection of one of said terminations which is a trunk termination and, to cause a connection to be esstablished via said switching network between the calling termination and selected trunk termination, wherein one of said common store registers (SD) is used to store information relating to the identity of the selected trunk termination, means including the central processing unit operative after the connection between the calling termination and trunk termination has been completely established to cause a connection to be established via said switching network between the sender termination and the trunk termination identified by the information stored in the last said common store register.

18. In a communication switching system, the combination as claimed in claim 17, wherein said connection between the calling termination and trunk termination is established with a split mode in which the connection is open at one point between the calling line and trunk, and the identity of the calling line-to-trunk connection path is placed into storage means of the sender in place of the identity of the calling termination;

the sender control means being effective after said connections to the trunk are established to outpulse digits;

and means including the central processing unit effective after completion of outpulsing to use said identity of the calling line-to-trunk connection path to cause said split mode to be changed to a switch-through mode, and to release the dialing register and sender.

19. In a communication switching system having a plurality of terminations and a switching network for interconnecting them, each termination having an individual equipment number identity, common control apparatus comprising: a central processing unit, a main memory, a plurality of dialing registers, a plurality of senders separate from the dialing registers, and a plurality of common store registers, wherein the main memory comprises a plurality of word stores for program words and data words, the program words having a first part for an operation code and a second part for an operand, a memory input register for addresses designating the individual word stores, read access means connected to read out a word from a store corresponding to the address in the memory input register and to supply data signals representing the word to a set of memory output conductors;

wherein the central processing unit comprises memory output register means, an accumulator, an instruction register, arithmetic circuits, and interconnections among them and to the memory input register and memory output conductors, operation cycling means providing operation cycles;

operation means effective during each cycle using said read access means to read out one program word from memory with the operation code into the instruction register and the operand into the memory output register means, means using the arithmetic circuits to perform an operation designated by the operation code, which for some operation codes includes placing a data word address into the memory input register and using the read access means to read out a corresponding data word into the memory output register means, and in some cases into the accumulator, and means effective during the cycle to place an address of a program word into the memory input register for the next operation;

wherein each dialing register and each sender includes a line terminal connected to an individual one of said terminations, and each includes storage means comprising a plurality of store registers individual thereto;

wherein each of said store registers comprises a plurality of bistable devices with outputs coupled to said read access means, with each store register having an individual address so that a word therein may be read out when its address is in the memory input register;

write access means connected from the central processing unit to inputs of said store registers to write data from the accumulator into a selected store register in accordance with its address;

line call-for-service means including a sequence of program words and said operation means effective responsive to a calling condition at a calling termination to select an idle dialing register, to cause establishment of a connection via the switching network between said calling termination and the termination of the selected dialing register, and using said write access means to place the equipment number identity of the calling termination into the storage means of the selected dialing register;

register control means independent of the central processor to receive called number digits via its line terminal and to store them into its storage means;

register call-for-service means including a sequence of program words and said operation means to analyze the called number digits in the storage means of a dialing register; and sender-selection means including a sequence of program words and the operation means effective responsive to an analysis of the called number digits indicating a sender required to select an idle sender, and using said read access means and write access means to read the calling equipment number identity from the dialing register storage means and place it into the sender storage means, and to place an address of the selected sender storage means into the dialing register storage means to thereby associate the dialing register and the sender;

digit loading means including a sequence of program words, the operation means, the read access means and the write access means to read called number digits from the storage means of the dialing register and place them into the storage means of the sender;

sender Zconnect means including a sequence of program words and the operation means to select a termination and to cause the switching network to connect the sender termination thereto;

sender control means independent of the central processor to outpulse digits via its line terminal, the digit loading means being used during outpulsing to read additional called number digits from the register storage means and place them into the sender storage means.

20. In a communication switching system, the combination as claimed in claim 19, further including a plurality of automatic-number-identification units separate from the dialing registers and from the senders, wherein each automatic-number-identification unit includes individual storage means comprising a plurality of store registers, each store register comprising a plurality of bistable devices with outputs coupled to said read access means, and inputs connected to said write access means, with each store register having an individual address;

automatic-number-identification dedication means including a sequence of program words and the operation means effective responsive to an analysis of the called number digits indicating automatic-number-identification required to select an idle automatic-number-identification unit, and using said read access means and write access means to place an address of the selected sender storage means into the storage means of the automatic-number-identification unit to associate the automatic-number-identification unit with the sender;

automatic-number-identification call-for-service means including a sequence of program words and said operation means to search data words in a translation section of the main memory to determine the calling directory number corresponding to the calling equipment number which is stored in the sender storage means, and to place the calling directory number into the automatic-number-identification storage means;

and automatic-number-identification search means including a sequence of program words and said operation means effective responsive to a given condition in a sender control means to find the automatic-number-identification unit associated with the sender, and to read the calling line directory number digits from the automatic-number-identification storage means and to place them into the sender storage means for outpulsing.

* * * * *